United States Patent
Swaminathan et al.

(10) Patent No.: US 11,140,503 B2
(45) Date of Patent: Oct. 5, 2021

(54) TIMER-BASED ACCESS FOR AUDIO STREAMING AND RENDERING

(71) Applicant: QUALCOMM Incorporated, San Diego, CA (US)

(72) Inventors: Siddhartha Goutham Swaminathan, San Diego, CA (US); Isaac Garcia Munoz, San Diego, CA (US); Nils Günther Peters, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/918,465

(22) Filed: Jul. 1, 2020

(65) Prior Publication Data
US 2021/0006922 A1   Jan. 7, 2021

Related U.S. Application Data

(60) Provisional application No. 62/870,599, filed on Jul. 3, 2019.

(51) Int. Cl.
*H04S 7/00* (2006.01)
*G10L 19/008* (2013.01)

(52) U.S. Cl.
CPC ............ *H04S 7/302* (2013.01); *G10L 19/008* (2013.01)

(58) Field of Classification Search
CPC ................................. H04S 7/00; G10L 19/008
USPC .......... 700/94; 381/20, 22, 23; 704/501, 500
See application file for complete search history.

(56) References Cited

U.S. PATENT DOCUMENTS

| | | | |
|---|---|---|---|
| 2005/0100320 A1* | 5/2005 | Haas | H04N 5/76 386/295 |
| 2006/0142740 A1* | 6/2006 | Sherman | A61B 90/36 606/1 |
| 2009/0019553 A1* | 1/2009 | Narayanaswami | H04L 63/0428 726/28 |
| 2010/0103196 A1* | 4/2010 | Kumar | G06T 19/006 345/633 |
| 2010/0142327 A1* | 6/2010 | Kepesi | G01S 3/786 367/124 |

(Continued)

FOREIGN PATENT DOCUMENTS

| EP | 3264801 A1 | 1/2018 |
|---|---|---|
| WO | 2018064528 A1 | 4/2018 |

OTHER PUBLICATIONS

Audio: "Call for Proposals for 3D Audio", International Organisation for Standardisation Organisation Internationale De Normalisation ISO/IEC JTC1/SC29/WG11 Coding of Moving Pictures and Audio, ISO/IEC JTC1/SC29/WG11/N13411, Geneva, Jan. 2013, pp. 1-20.

(Continued)

*Primary Examiner* — Melur Ramakrishnaiah
(74) *Attorney, Agent, or Firm* — Shumaker & Sieffert, P.A.

(57) ABSTRACT

Example devices and methods are presented for timer-based access for audio streaming and rendering. For example, a device configured to play one or more of a plurality of audio streams includes a memory configured to store timing information and the plurality of audio streams. The device also includes one or more processors coupled to the memory. The one or more processors are configured to control access to at least one of the plurality of audio streams based on the timing information.

41 Claims, 32 Drawing Sheets

(56) References Cited

U.S. PATENT DOCUMENTS

| | | | |
|---|---|---|---|
| 2011/0238853 A1* | 9/2011 | Paul | H04N 21/4307 709/231 |
| 2011/0249821 A1 | 10/2011 | Jaillet et al. | |
| 2014/0277645 A1 | 9/2014 | Thirumale | |
| 2017/0366914 A1* | 12/2017 | Stein | H04S 7/303 |
| 2018/0352360 A1 | 12/2018 | Chen et al. | |
| 2019/0007781 A1 | 1/2019 | Peters et al. | |
| 2019/0108623 A1* | 4/2019 | Carey | G06F 3/033 |
| 2019/0198028 A1 | 6/2019 | Kim et al. | |

OTHER PUBLICATIONS

ETSI TS 103 589 V1.1.1, "Higher Order Ambisonics (HOA) Transport Format", Jun. 2018, 33 pages.

Herre J., et al., "MPEG-H 3D Audio—The New Standard for Coding of Immersive Spatial Audio," IEEE Journal of Selected Topics in Signal Processing, Aug. 1, 2015 (Aug. 1, 2015), vol. 9(5), pp. 770-779, XP055243182, US ISSN: 1932-4553, DOI: 10.1109/JSTSP.2015.2411578.

Hollerweger F., "An Introduction to Higher Order Ambisonic," Oct. 2008, pp. 13, Accessed online [Jul. 8, 2013].

"Information technology—High Efficiency Coding and Media Delivery in Heterogeneous Environments—Part 3: 3D Audio," ISO/IEC JTC 1/SC 29/WG11, ISO/IEC 23008-3, 201x(E), Oct. 12, 2016, 797 Pages.

"Information technology—High efficiency coding and media delivery in heterogeneous environments—Part 3: Part 3: 3D Audio, Amendment 3: MPEG-H 3D Audio Phase 2," ISO/IEC JTC 1/SC 29N, ISO/IEC 23008-3:2015/PDAM 3, Jul. 25, 2015, 208 pp.

ISO/IEC JTC 1/SC 29: "Information Technology—High Efficiency Coding and Media Delivery in Heterogeneous Environments—Part 3: 3D Audio", ISO/IEC DIS 23008-3, Apr. 4, 2014, 337 Pages.

ISO/IEC JTC 1/SC 29: "Information Technology—High Efficiency Coding and Media Delivery in Heterogeneous Environments—Part 3: 3D Audio", ISO/IEC DIS 23008-3, Jul. 25, 2014, 433 Pages.

Peterson J., et al., "Virtual Reality, Augmented Reality, and Mixed Reality Definitions," EMA, version 1.0, Jul. 7, 2017, 4 pp.

Poletti M.A., "Three-Dimensional Surround Sound Systems Based on Spherical Harmonics", The Journal of the Audio Engineering Society, vol. 53, No. 11, Nov. 2005, pp. 1004-1025.

Schonefeld V., "Spherical Harmonics," Jul. 1, 2005, XP002599101, 25 Pages, Accessed online [Jul. 9, 2013] at URL:http://heim.c-otto.de/~volker/prosem_paper.pdf.

Sen D., et al., "RM1-HOA Working Draft Text", 107. MPEG Meeting; Jan. 13, 2014-Jan. 17, 2014; San Jose; (Motion Picture Expert Group or ISO/IEC JTC1/SC29/WG11), No. m31827, Jan. 11, 2014 (Jan. 11, 2014), 83 Pages, XP030060280.

Sen D., et al., "Technical Description of the Qualcomm's HoA Coding Technology for Phase II", 109. MPEG Meeting; Jul. 7, 2014-Jul. 11, 2014; Sapporo; (Motion Picture Expert Group or ISO/IEC JTC1/SC29/WG11), No. m34104, Jul. 2, 2014 (Jul. 2, 2014), 4 Pages, XP030062477, figure 1.

Zheng X., "Soundfield Navigation Separation Compression and Transmission", University of Wollongong, 2013, 254 Pages.

International Search Report and Written Opinion—PCT/US2020/040643—ISA/EPO—dated Oct. 23, 2020, 14 pp.

* cited by examiner

TIMER-BASED ACCESS FOR AUDIO STREAMING AND RENDERING

This application claims priority to U.S. Provisional Application No. 62/870,599, filed Jul. 3, 2019, the entire contents of which is hereby incorporated by reference.

TECHNICAL FIELD

This disclosure relates to processing of media data, such as audio data.

BACKGROUND

Computer-mediated reality systems are being developed to allow computing devices to augment or add to, remove or subtract from, or generally modify existing reality experienced by a user. Computer-mediated reality systems (which may also be referred to as "extended reality systems," or "XR systems") may include, as examples, virtual reality (VR) systems, augmented reality (AR) systems, and mixed reality (MR) systems. The perceived success of computer-mediated reality systems are generally related to the ability of such computer-mediated reality systems to provide a realistically immersive experience in terms of both the video and audio experience where the video and audio experience align in ways expected by the user. Although the human visual system is more sensitive than the human auditory systems (e.g., in terms of perceived localization of various objects within the scene), ensuring an adequate auditory experience is an increasingly important factor in ensuring a realistically immersive experience, particularly as the video experience improves to permit better localization of video objects that enable the user to better identify sources of audio content.

SUMMARY

This disclosure relates generally to auditory aspects of the user experience of computer-mediated reality systems, including virtual reality (VR), mixed reality (MR), augmented reality (AR), computer vision, and graphics systems. Various aspects of the techniques may provide for adaptive audio capture, synthesis, and rendering for extended reality systems. As used herein, an acoustic environment is represented as either an indoor environment or an outdoor environment, or both an indoor environment and an outdoor environment. The acoustic environment may include one or more sub-acoustic spaces that may include various acoustic elements. An example of an outdoor environment could include a car, buildings, walls, a forest, etc. An acoustical space may be an example of an acoustical environment and may be an indoor space or an outdoor space. As used herein, an audio element is either a sound captured by a microphone (e.g., directly captured from near-field sources or reflections from far-field sources whether real or synthetic), or a sound field previously synthesized, or a mono sound synthesized from text to speech, or a reflection of a virtual sound from an object in the acoustic environment.

In one example, various aspects of the techniques are directed to a device a memory configured to store timing information and the plurality of audio streams; and one or more processors coupled to the memory, and configured to control access to at least one of the plurality of audio streams based on the timing information.

In another example, various aspects of the techniques are directed to a method of playing one or more of a plurality of audio streams comprising: storing, by a memory, timing information and the plurality of audio streams; and controlling access to at least one of the plurality of audio streams based on the timing information.

In another example, various aspects of the techniques are directed to a device configured to play one or more of a plurality of audio streams, the device comprising: means for storing the plurality of audio streams and means for controlling access to at least one of the plurality of audio streams based on the timing information.

In another example, various aspects of the techniques are directed to a non-transitory computer-readable storage medium having stored thereon instructions that, when executed, cause one or more processors to: store timing information and a plurality of audio streams; and control access to at least one of the plurality of audio streams based on the timing information.

The details of one or more examples of this disclosure are set forth in the accompanying drawings and the description below. Other features, objects, and advantages of various aspects of the techniques will be apparent from the description and drawings, and from the claims.

DETAILED DESCRIPTION

Figure 1A:
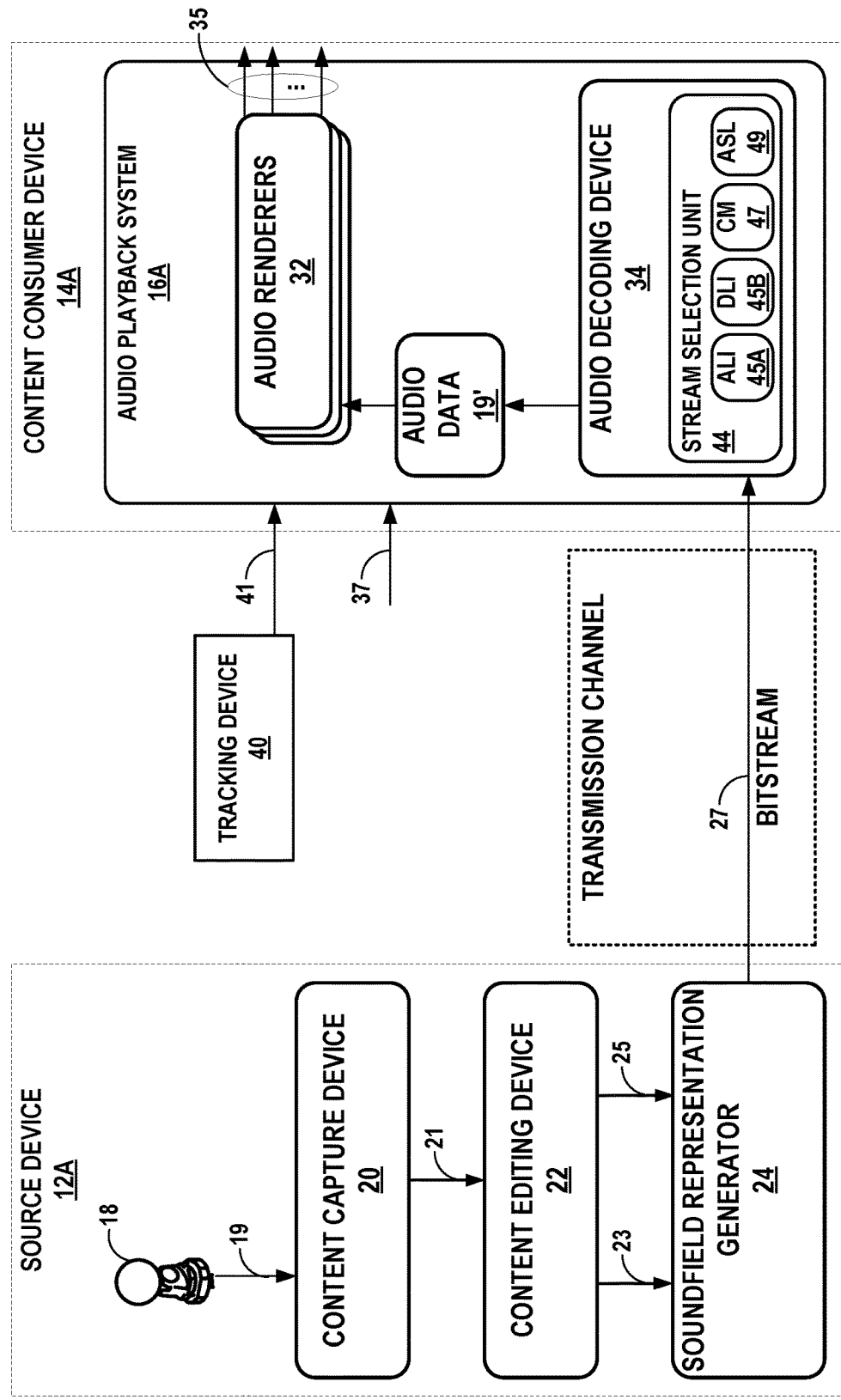
FIGS. 1A-1C are diagrams illustrating systems that may perform various aspects of the techniques described in this disclosure.

Currently, rendering an XR scene with many audio sources which may be obtained from audio capture devices, for example, in a live scene, may render audio sources containing sensitive information that would be better kept restricted, or if access were to be granted, the access should not be permanent. According to the techniques of this disclosure, individual audio streams may be restricted from rendering or may be rendered on a temporary basis based on timing information, such as a time or a duration. Certain individual audio streams or clusters of audio streams may be enabled or disabled for a fixed duration for better audio interpolation. Accordingly, the techniques of this disclosure provide for a flexible manner of controlling access to audio streams based on time.

There are a number of different ways to represent a soundfield. Example formats include channel-based audio formats, object-based audio formats, and scene-based audio formats. Channel-based audio formats refer to the 5.1 surround sound format, 7.1 surround sound formats, 22.2 surround sound formats, or any other channel-based format that localizes audio channels to particular locations around the listener in order to recreate a soundfield.

Object-based audio formats may refer to formats in which audio objects, often encoded using pulse-code modulation (PCM) and referred to as PCM audio objects, are specified in order to represent the soundfield. Such audio objects may include location information, such as location metadata, identifying a location of the audio object relative to a listener or other point of reference in the soundfield, such that the audio object may be rendered to one or more speaker channels for playback in an effort to recreate the soundfield. The techniques described in this disclosure may apply to any of the following formats, including scene-based audio formats, channel-based audio formats, object-based audio formats, or any combination thereof.

Scene-based audio formats may include a hierarchical set of elements that define the soundfield in three dimensions. One example of a hierarchical set of elements is a set of spherical harmonic coefficients (SHC). The following expression demonstrates a description or representation of a soundfield using SHC:

$$p_i(t, r_r, \theta_r, \varphi_r) = \sum_{\omega=0}^{\infty} \left[ 4\pi \sum_{n=0}^{\infty} j_n(kr_r) \sum_{m=-n}^{n} A_n^m(k) Y_n^m(\theta_r, \varphi_r) \right] e^{j\omega t},$$

The expression shows that the pressure $p_i$ at any point $\{r_r, \theta_r, \varphi_r\}$ of the soundfield, at time t, can be represented uniquely by the SHC, $A_n^m(k)$. Here, $$k = \frac{\omega}{c},$$

c is the speed of sound (~343 m/s), $\{r_r, \theta_r, \varphi_r\}$ is a point of reference (or observation point), $j_n(\bullet)$ is the spherical Bessel function of order n, and $Y_n^m(\theta_r, \varphi_r)$ are the spherical harmonic basis functions (which may also be referred to as a spherical basis function) of order n and suborder m. It can be recognized that the term in square brackets is a frequency-domain representation of the signal (e.g., $S(\omega, r_r, \theta_r, \varphi_r)$) which can be approximated by various time-frequency transformations, such as the discrete Fourier transform (DFT), the discrete cosine transform (DCT), or a wavelet transform. Other examples of hierarchical sets include sets of wavelet transform coefficients and other sets of coefficients of multiresolution basis functions.

The SHC $A_n^m(k)$ can either be physically acquired (e.g., recorded) by various microphone array configurations or, alternatively, they can be derived from channel-based or object-based descriptions of the soundfield. The SHC (which also may be referred to as ambisonic coefficients) represent scene-based audio, where the SHC may be input to an audio encoder to obtain encoded SHC that may promote more efficient transmission or storage. For example, a fourth-order representation involving $(1+4)^2$ (25, and hence fourth order) coefficients may be used.

As noted above, the SHC may be derived from a microphone recording using a microphone array. Various examples of how SHC may be physically acquired from microphone arrays are described in Poletti, M., "Three-Dimensional Surround Sound Systems Based on Spherical Harmonics," J. Audio Eng. Soc., Vol. 53, No. 11, 2005 November, pp. 1004-1025.

The following equation may illustrate how the SHCs may be derived from an object-based description. The coefficients $A_n^m(k)$ for the soundfield corresponding to an individual audio object may be expressed as:

$$A_n^m(k) = g(\omega)(-4\pi i k) h_n^{(2)}(kr_s) Y_n^{m*}(\theta_s, \varphi_s),$$

where i is $\sqrt{-1}$, $h_n^{(2)}(\bullet)$ is the spherical Hankel function (of the second kind) of order n, and $\{r_s, \theta_s, \varphi_s\}$ is the location of the object. Knowing the object source energy $g(\omega)$ as a function of frequency (e.g., using time-frequency analysis techniques, such as performing a fast Fourier transform on the pulse code modulated—PCM—stream) may enable conversion of each PCM object and the corresponding location into the SHC An (k). Further, it can be shown (since the above is a linear and orthogonal decomposition) that the $A_n^m(k)$ coefficients for each object are additive. In this manner, a number of PCM objects can be represented by the $A_n^m(k)$ coefficients (e.g., as a sum of the coefficient vectors for the individual objects). The coefficients may contain information about the soundfield (the pressure as a function of three dimensional (3D) coordinates), and the above represents the transformation from individual objects to a representation of the overall soundfield, in the vicinity of the observation point $\{r_r, \theta_r, \varphi_r\}$.

Computer-mediated reality systems (which may also be referred to as "extended reality systems," or "XR systems") are being developed to take advantage of many of the potential benefits provided by ambisonic coefficients. For example, ambisonic coefficients may represent a soundfield in three dimensions in a manner that potentially enables accurate 3D localization of sound sources within the soundfield. As such, XR devices may render the ambisonic coefficients to speaker feeds that, when played via one or more speakers, accurately reproduce the soundfield.

As another example, the ambisonic coefficients may be translated or rotated to account for user movement without overly complex mathematical operations, thereby potentially accommodating the low latency requirements of XR devices. In addition, the ambisonic coefficients are hierarchical and thereby naturally accommodate scalability through order reduction (which may eliminate ambisonic coefficients associated with higher orders), and thereby potentially enable dynamic adaptation of the soundfield to accommodate latency and/or battery requirements of XR devices.

The use of ambisonic coefficients for XR devices may enable development of a number of use cases that rely on the more immersive soundfields provided by the ambisonic coefficients, particularly for computer gaming applications and live video streaming applications. In these highly dynamic use cases that rely on low latency reproduction of the soundfield, the XR devices may prefer ambisonic coefficients over other representations that are more difficult to manipulate or involve complex rendering. More information regarding these use cases is provided below with respect to FIGS. 1A-1C.

While described in this disclosure with respect to the VR device, various aspects of the techniques may be performed in the context of other devices, such as a mobile device. In this instance, the mobile device (such as a so-called smartphone) may present the acoustical space via a screen, which may be mounted to the head of the user 102 or viewed as would be done when normally using the mobile device. As such, any information on the screen can be part of the mobile device. The mobile device may be able to provide tracking information and thereby allow for both a VR experience (when head mounted) and a normal experience to view the acoustical space, where the normal experience may still allow the user to view the acoustical space providing a VR-lite-type experience (e.g., holding up the device and rotating or translating the device to view different portions of the acoustical space).

Figure 1B:
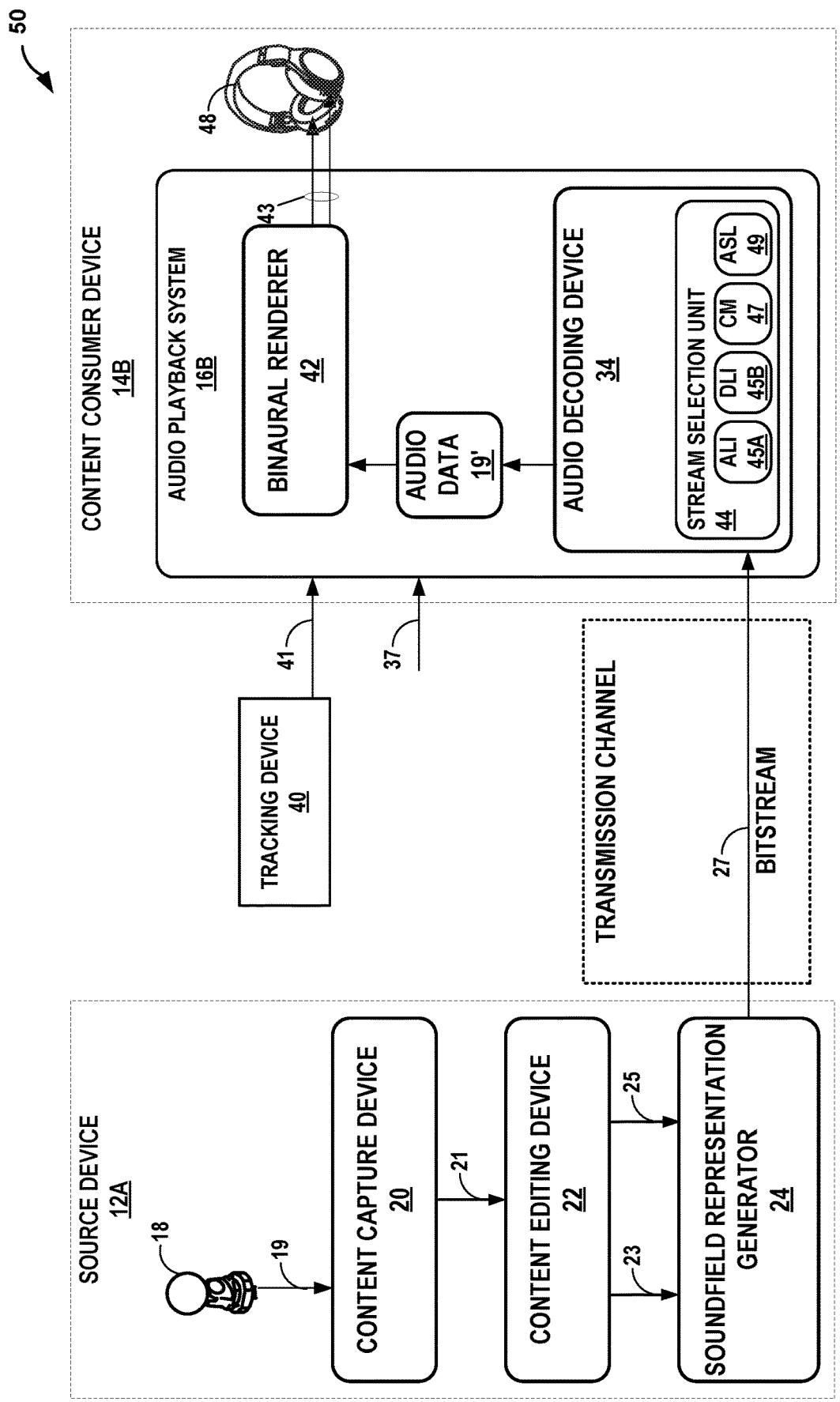
Figure 1C:
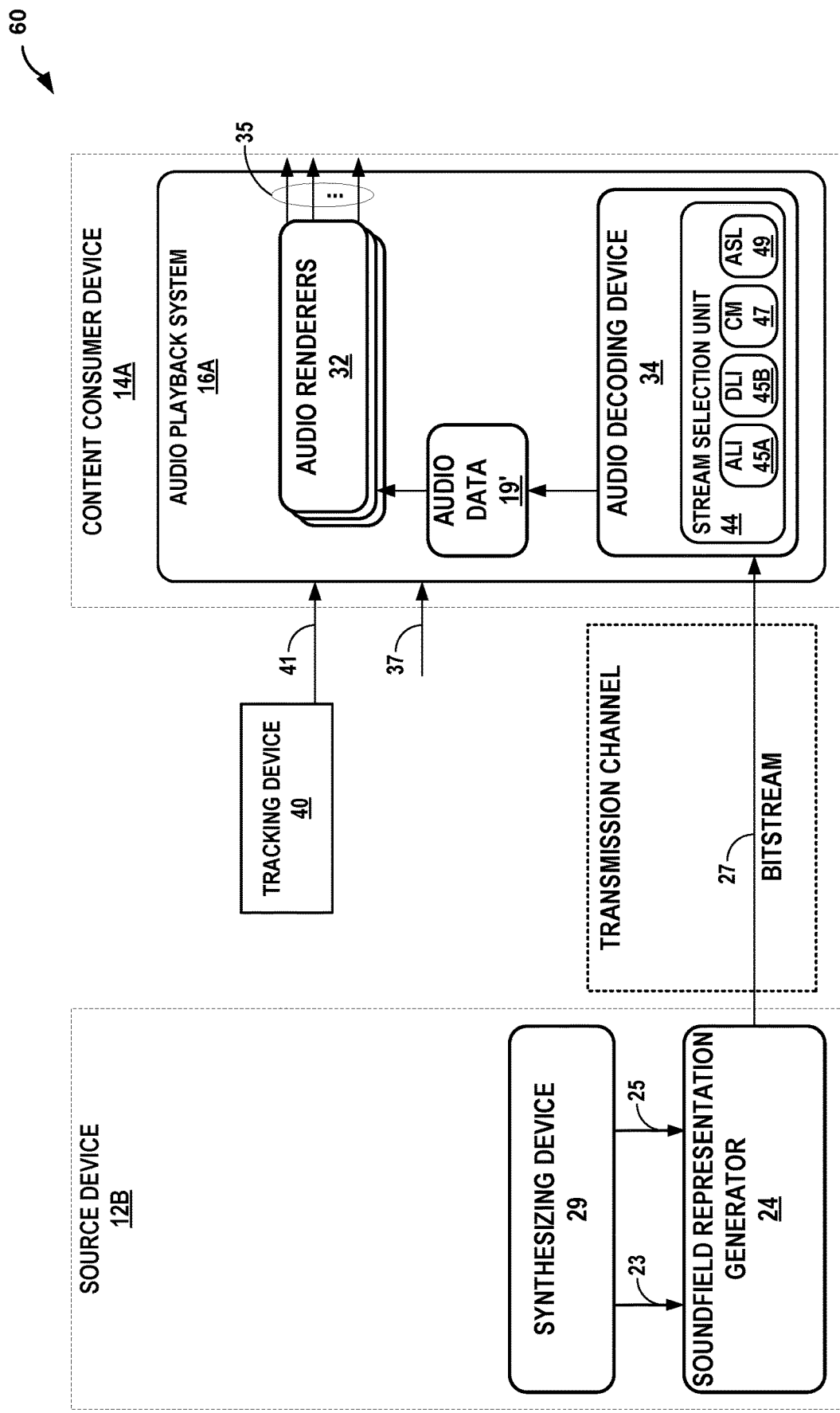

FIGS. 1A-1C are diagrams illustrating systems that may perform various aspects of the techniques described in this disclosure. As shown in the example of FIG. 1A, system 10 includes a source device 12A and a content consumer device 14A. While described in the context of the source device 12A and the content consumer device 14A, the techniques may be implemented in any context in which any representation of a soundfield is encoded to form a bitstream representative of the audio data. Moreover, the source device 12A may represent any form of computing device capable of generating the representation of a soundfield, and is generally described herein in the context of being a VR content creator device. Likewise, the content consumer device 14A may represent any form of computing device capable of implementing rendering techniques described in this disclosure as well as audio playback, and is generally described herein in the context of being a VR client device.

The source device 12A may be operated by an entertainment company or other entity that may generate mono and/or multi-channel audio content for consumption by operators of content consumer devices, such as the content consumer device 14A. In some VR scenarios, the source device 12A generates audio content in conjunction with video content. The source device 12A includes a content capture device 20, a content editing device 22, and a soundfield representation generator 24. The content capture device 20 may be configured to interface or otherwise communicate with a microphone 18.

The microphone 18 may represent an Eigenmike® or other type of 3D audio microphone capable of capturing and representing the soundfield as audio data 19, which may refer to one or more of the above noted scene-based audio data (such as ambisonic coefficients), object-based audio data, and channel-based audio data. Although described as being 3D audio microphones, the microphone 18 may also represent other types of microphones (such as omni-directional microphones, spot microphones, unidirectional microphones, etc.) configured to capture the audio data 19. Audio data 19 may represent an audio stream or include an audio stream.

The content capture device 20 may, in some examples, include an integrated microphone 18 that is integrated into the housing of the content capture device 20. The content capture device 20 may interface wirelessly or via a wired connection with the microphone 18. Rather than capture, or in conjunction with capturing, the audio data 19 via microphone 18, the content capture device 20 may process the audio data 19 after the audio data 19 is input via some type of removable storage, wirelessly and/or via wired input processes. As such, various combinations of the content capture device 20 and the microphone 18 are possible in accordance with this disclosure.

The content capture device 20 may also be configured to interface or otherwise communicate with the content editing device 22. In some instances, the content capture device 20 may include the content editing device 22 (which in some instances may represent software or a combination of software and hardware, including the software executed by the content capture device 20 to configure the content capture device 20 to perform a specific form of content editing). The content editing device 22 may represent a unit configured to edit or otherwise alter content 21 received from content capture device 20, including the audio data 19. The content editing device 22 may output edited content 23 and associated metadata 25 to the soundfield representation generator 24.

The soundfield representation generator 24 may include any type of hardware device capable of interfacing with the content editing device 22 (or the content capture device 20). Although not shown in the example of FIG. 1A, the soundfield representation generator 24 may use the edited content 23, including the audio data 19, and metadata 25 provided by the content editing device 22 to generate one or more bitstreams 27. In the example of FIG. 1A, which focuses on the audio data 19, the soundfield representation generator 24 may generate one or more representations of the same soundfield represented by the audio data 19 to obtain a bitstream 27 that includes the representations of the soundfield and the audio metadata 25.

For instance, to generate the different representations of the soundfield using ambisonic coefficients (which again is one example of the audio data 19), soundfield representation generator 24 may use a coding scheme for ambisonic representations of a soundfield, referred to as Mixed Order Ambisonics (MOA) as discussed in more detail in U.S. application Ser. No. 15/672,058, entitled "MIXED-ORDER AMBISONICS (MOA) AUDIO DATA FOR COMPUTER-MEDIATED REALITY SYSTEMS," filed Aug. 8, 2017, and published as U.S. patent publication no. 20190007781 on Jan. 3, 2019.

To generate a particular MOA representation of the soundfield, the soundfield representation generator 24 may generate a partial subset of the full set of ambisonic coefficients. For instance, each MOA representation generated by the soundfield representation generator 24 may provide precision with respect to some areas of the soundfield, but less precision in other areas. In one example, an MOA representation of the soundfield may include eight (8) uncompressed ambisonic coefficients, while the third order ambisonic representation of the same soundfield may include sixteen (16) uncompressed ambisonic coefficients. As such, each MOA representation of the soundfield that is generated as a partial subset of the ambisonic coefficients may be less storage-intensive and less bandwidth intensive (if and when transmitted as part of the bitstream 27 over the illustrated transmission channel) than the corresponding third order ambisonic representation of the same soundfield generated from the ambisonic coefficients.

Although described with respect to MOA representations, the techniques of this disclosure may also be performed with respect to first-order ambisonic (FOA) representations in which all of the ambisonic coefficients associated with a first order spherical basis function and a zero order spherical basis function are used to represent the soundfield. In other words, rather than represent the soundfield using a partial, non-zero subset of the ambisonic coefficients, the soundfield representation generator 302 may represent the soundfield using all of the ambisonic coefficients for a given order N, resulting in a total of ambisonic coefficients equaling $(N+1)^2$.

In this respect, the ambisonic audio data (which is another way to refer to the ambisonic coefficients in either MOA representations or full order representation, such as the first-order representation noted above) may include ambisonic coefficients associated with spherical basis functions having an order of one or less (which may be referred to as "$1^{st}$ order ambisonic audio data"), ambisonic coefficients associated with spherical basis functions having a mixed order and suborder (which may be referred to as the "MOA representation" discussed above), or ambisonic coefficients associated with spherical basis functions having an order greater than one (which is referred to above as the "full order representation").

The content capture device 20 or the content editing device 22 may, in some examples, be configured to wirelessly communicate with the soundfield representation generator 24. In some examples, the content capture device 20 or the content editing device 22 may communicate, via one or both of a wireless connection or a wired connection, with the soundfield representation generator 24. Via the connection between the content capture device 20 or the content editing device 22 and the soundfield representation generator 24, the content capture device 20 or the content editing device 22 may provide content in various forms of content, which, for purposes of discussion, are described herein as being portions of the audio data 19.

In some examples, the content capture device 20 may leverage various aspects of the soundfield representation generator 24 (in terms of hardware or software capabilities of the soundfield representation generator 24). For example, the soundfield representation generator 24 may include dedicated hardware configured to (or specialized software that when executed causes one or more processors to) perform psychoacoustic audio encoding (such as a unified speech and audio coder denoted as "USAC" set forth by the Moving Picture Experts Group (MPEG), the MPEG-H 3D audio coding standard, the MPEG-I Immersive Audio standard, or proprietary standards, such as AptX™ (including various versions of AptX such as enhanced AptX-E-AptX, AptX live, AptX stereo, and AptX high definition—AptX-HD), advanced audio coding (AAC), Audio Codec 3 (AC-3), Apple Lossless Audio Codec (ALAC), MPEG-4 Audio Lossless Streaming (ALS), enhanced AC-3, Free Lossless Audio Codec (FLAC), Monkey's Audio, MPEG-1 Audio Layer II (MP2), MPEG-1 Audio Layer III (MP3), Opus, and Windows Media Audio (WMA).

The content capture device 20 may not include the psychoacoustic audio encoder dedicated hardware or specialized software and instead may provide audio aspects of the content 21 in a non-psychoacoustic-audio-coded form. The soundfield representation generator 24 may assist in the capture of content 21 by, at least in part, performing psychoacoustic audio encoding with respect to the audio aspects of the content 21.

The soundfield representation generator 24 may also assist in content capture and transmission by generating one or more bitstreams 27 based, at least in part, on the audio content (e.g., MOA representations and/or first order ambisonic representations) generated from the audio data 19 (in the case where the audio data 19 includes scene-based audio data). The bitstream 27 may represent a compressed version of the audio data 19 and any other different types of the content 21 (such as a compressed version of spherical video data, image data, or text data).

The soundfield representation generator 24 may generate the bitstream 27 for transmission, as one example, across a transmission channel, which may be a wired or wireless channel, a data storage device, or the like. The bitstream 27 may represent an encoded version of the audio data 19, and may include a primary bitstream and another side bitstream, which may be referred to as side channel information or metadata. In some instances, the bitstream 27 representing the compressed version of the audio data 19 (which again may represent scene-based audio data, object-based audio data, channel-based audio data, or combinations thereof) may conform to bitstreams produced in accordance with the MPEG-H 3D audio coding standard and/or the MPEG-I Immersive Audio standard.

The content consumer device 14 may be operated by an individual, and may represent a VR client device. Although described with respect to a VR client device, content consumer device 14 may represent other types of devices, such as an augmented reality (AR) client device, a mixed reality (MR) client device (or other XR client device), a standard computer, a headset, headphones, a mobile device (including a so-called smartphone), or any other device capable of tracking head movements and/or general translational movements of the individual operating the content consumer device 14. As shown in the example of FIG. 1A, the content consumer device 14 includes an audio playback system 16A, which may refer to any form of audio playback system capable of rendering the audio data for playback as mono and/or multi-channel audio content.

While shown in FIG. 1A as being directly transmitted to the content consumer device 14, the source device 12A may output the bitstream 27 to an intermediate device positioned between the source device 12A and the content consumer device 14A. The intermediate device may store the bitstream 27 for later delivery to the content consumer device 14A, which may request the bitstream 27. The intermediate device may include a file server, a web server, a desktop computer, a laptop computer, a tablet computer, a mobile phone, a smart phone, or any other device capable of storing the bitstream 27 for later retrieval by an audio decoder. The intermediate device may reside in a content delivery network capable of streaming the bitstream 27 (and possibly in conjunction with transmitting a corresponding video data bitstream) to subscribers, such as the content consumer device 14, requesting the bitstream 27.

Alternatively, the source device 12A may store the bitstream 27 to a storage medium, such as a compact disc, a digital video disc, a high definition video disc or other storage media, most of which are capable of being read by a computer and therefore may be referred to as computer-readable storage media or non-transitory computer-readable storage media. In this context, the transmission channel may refer to the channels by which content (e.g., in the form of one or more bitstreams 27) stored to the mediums are transmitted (and may include retail stores and other store-based delivery mechanism). In any event, the techniques of this disclosure should not therefore be limited in this respect to the example of FIG. 1A.

As noted above, the content consumer device 14 includes the audio playback system 16A. The audio playback system 16A may represent any system capable of playing back mono and/or multi-channel audio data. The audio playback system 16A may include a number of different renderers 32. The audio renderers 32 may each provide for a different form of rendering, where the different audio forms of rendering may include one or more of the various ways of performing vector-base amplitude panning (VBAP), and/or one or more of the various ways of performing soundfield synthesis. As used herein, "A and/or B" means "A or B", or "both A and B".

The audio playback system 16A may further include an audio decoding device 34. The audio decoding device 34 may represent a device configured to decode bitstream 27 to output audio data 19' (where the prime notation may denote that the audio data 19' differs from the audio data 19 due to lossy compression, such as quantization, of the audio data 19). Again, the audio data 19' may include scene-based audio data that, in some examples, may form the full first (or higher) order ambisonic representation or a subset thereof that forms an MOA representation of the same soundfield, decompositions thereof, such as a predominant audio signal, ambient ambisonic coefficients, and the vector based signal described in the MPEG-H 3D Audio Coding Standard, or other forms of scene-based audio data.

Other forms of scene-based audio data include audio data defined in accordance with an HOA (Higher Order Ambisonic) Transport Format (HTF). More information regarding the HTF can be found in a Technical Specification (TS) by the European Telecommunications Standards Institute (ETSI) entitled "Higher Order Ambisonics (HOA) Transport Format," ETSI TS 103 589 V1.1.1, dated June 2018 (2018-06), and also in U.S. Patent Publication No. 2019/0918028, entitled "PRIORITY INFORMATION FOR HIGHER ORDER AMBISONIC AUDIO DATA," filed Dec. 20, 2018. In any event, the audio data 19' may be similar to a full set or a partial subset of the audio data 19', but may differ due to lossy operations (e.g., quantization) and/or transmission via the transmission channel.

The audio data 19' may include, as an alternative to, or in conjunction with the scene-based audio data, channel-based audio data. The audio data 19' may include, as an alternative to, or in conjunction with the scene-based audio data, object-based audio data, or channel-based audio data. As such, the audio data 19' may include any combination of scene-based audio data, object-based audio data, and channel-based audio data.

The audio renderers 32 of audio playback system 16A may, after audio decoding device 34 has decoded the bitstream 27 to obtain the audio data 19', render the audio data 19' to output speaker feeds 35. The speaker feeds 35 may drive one or more speakers (which are not shown in the example of FIG. 1A for ease of illustration purposes). Various audio representations, including scene-based audio data (and possibly channel-based audio data and/or object-based audio data) of a soundfield may be normalized in a number of ways, including N3D, SN3D, FuMa, N2D, or SN2D.

To select the appropriate renderer or, in some instances, generate an appropriate renderer, the audio playback system 16A may obtain speaker information 37 indicative of a number of speakers (e.g., loudspeakers or headphone speakers) and/or a spatial geometry of the speakers. In some instances, the audio playback system 16A may obtain the speaker information 37 using a reference microphone and may drive the speakers (which may refer to the output of electrical signals to cause a transducer to vibrate) in such a manner as to dynamically determine the speaker information 37. In other instances, or in conjunction with the dynamic determination of the speaker information 37, the audio playback system 16A may prompt a user to interface with the audio playback system 16A and input the speaker information 37.

The audio playback system 16A may select one of the audio renderers 32 based on the speaker information 37. In some instances, the audio playback system 16A may, when none of the audio renderers 32 are within some threshold similarity measure (in terms of the speaker geometry) to the speaker geometry specified in the speaker information 37, generate the one of audio renderers 32 based on the speaker information 37. The audio playback system 16A may, in some instances, generate one of the audio renderers 32 based on the speaker information 37 without first attempting to select an existing one of the audio renderers 32.

When outputting the speaker feeds 35 to headphones, the audio playback system 16A may utilize one of the renderers 32 that provides for binaural rendering using head-related transfer functions (HRTF) or other functions capable of rendering to left and right speaker feeds 35 for headphone speaker playback, such as binaural room impulse response renderers. The terms "speakers" or "transducer" may generally refer to any speaker, including loudspeakers, headphone speakers, bone-conducting speakers, earbud speakers, wireless headphone speakers, etc. One or more speakers may then playback the rendered speaker feeds 35 to reproduce a soundfield.

Although described as rendering the speaker feeds 35 from the audio data 19', reference to rendering of the speaker feeds 35 may refer to other types of rendering, such as rendering incorporated directly into the decoding of the audio data from the bitstream 27. An example of the alternative rendering can be found in Annex G of the MPEG-H 3D Audio standard, where rendering occurs during the predominant signal formulation and the background signal formation prior to composition of the soundfield. As such, reference to rendering of the audio data 19' should be understood to refer to both rendering of the actual audio data 19' or decompositions or representations of the audio data 19' (such as the above noted predominant audio signal, the ambient ambisonic coefficients, and/or the vector-based signal—which may also be referred to as a V-vector or as a multi-dimensional ambisonic spatial vector).

The audio playback system 16A may also adapt the audio renderers 32 based on tracking information 41. That is, the audio playback system 16A may interface with a tracking device 40 configured to track head movements and possibly translational movements of a user of the VR device. The tracking device 40 may represent one or more sensors (e.g., a camera—including a depth camera, a gyroscope, a magnetometer, an accelerometer, light emitting diodes—LEDs, etc.) configured to track the head movements and possibly translational movements of a user of the VR device. The audio playback system 16A may adapt, based on the tracking information 41, the audio renderers 32 such that the speaker feeds 35 reflect changes in the head and possibly translational movements of the user to correct reproduce the soundfield that is responsive to such movements.

FIG. 1B is a block diagram illustrating another example system 50 configured to perform various aspects of the techniques described in this disclosure. The system 50 is similar to the system 10 shown in FIG. 1A, except that the audio renderers 32 shown in FIG. 1A are replaced with a binaural renderer 42 capable of performing binaural rendering using one or more head-related transfer functions (HRTFs) or the other functions capable of rendering to left and right speaker feeds 43.

The audio playback system 16B may output the left and right speaker feeds 43 to headphones 48, which may represent another example of a wearable device and which may be coupled to additional wearable devices to facilitate reproduction of the soundfield, such as a watch, the VR headset noted above, smart glasses, smart clothing, smart rings, smart bracelets or any other types of smart jewelry (including smart necklaces), and the like. The headphones 48 may couple wirelessly or via wired connection to the additional wearable devices.

Additionally, the headphones 48 may couple to the audio playback system 16B via a wired connection (such as a standard 3.5 mm audio jack, a universal system bus (USB) connection, an optical audio jack, or other forms of wired connection) or wirelessly (such as by way of a Bluetooth™ connection, a wireless network connection, and the like). The headphones 48 may recreate, based on the left and right speaker feeds 43, the soundfield represented by the audio data 19'. The headphones 48 may include a left headphone speaker and a right headphone speaker which are powered (or, in other words, driven) by the corresponding left and right speaker feeds 43.

FIG. 1C is a block diagram illustrating another example system 60. The example system 60 is similar to the example system 10 of FIG. 1A, but source device 12B of system 60 does not include a content capture device. Source device 12B contains synthesizing device 29. Synthesizing device 29 may be used by a content developer to generate synthesized audio sources. The synthesized audio sources may have location information associated therewith that may identifying a location of the audio source relative to a listener or other point of reference in the soundfield, such that the audio source may be rendered to one or more speaker channels for playback in an effort to recreate the soundfield.

For example, a content developer may generate synthesized audio streams for a video game. While the example of FIG. 1C is shown with the content consumer device 14 of the example of FIG. 1A, the source device 12B of the example of FIG. 1C may be used with the content consumer device 14B of FIG. 1B. In some examples, the source device 12B of FIG. 1C may also include a content capture device, such that bitstream 27 may contain captured audio streams and synthesized audio streams.

Figure 2:
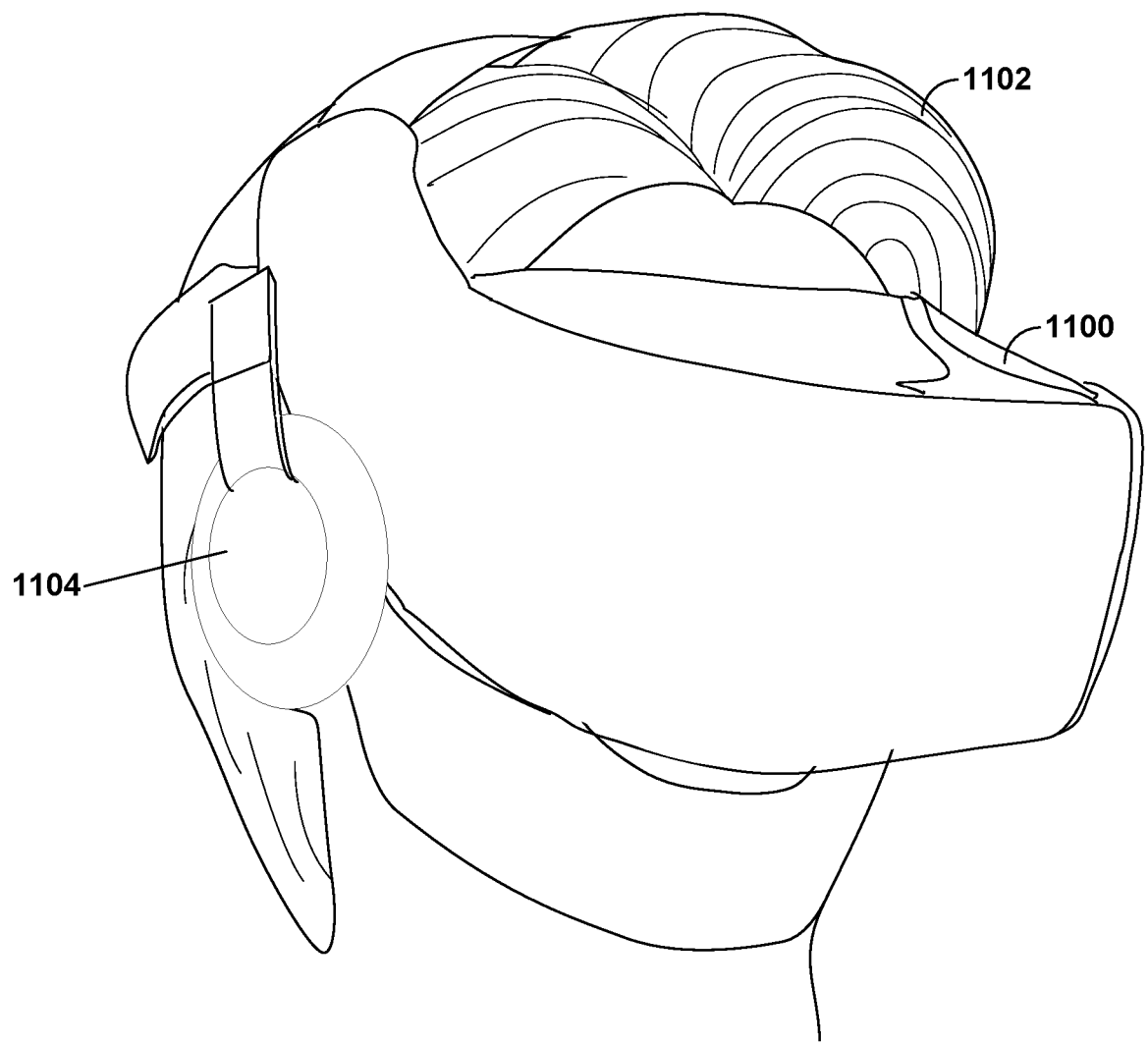
FIG. 2 is a diagram illustrating an example of a VR device worn by a user.

As described above, the content consumer device 14A or 14B (either of which may be hereinafter referred to as content consumer device 14) may represent a VR device in which a human wearable display (which may also be referred to a "head mounted display") is mounted in front of the eyes of the user operating the VR device. FIG. 2 is a diagram illustrating an example of a VR device 1100 worn by a user 1102. The VR device 1100 is coupled to, or otherwise includes, headphones 1104, which may reproduce a soundfield represented by the audio data 19' through playback of the speaker feeds 35. The speaker feeds 35 may represent an analog or digital signal capable of causing a membrane within the transducers of headphones 104 to vibrate at various frequencies, where such process is commonly referred to as driving the headphones 1104.

Video, audio, and other sensory data may play important roles in the VR experience. To participate in a VR experience, the user 1102 may wear the VR device 1100 (which may also be referred to as a VR client device 1100) or other wearable electronic device. The VR client device (such as the VR device 1100) may include a tracking device (e.g., the tracking device 40) that is configured to track head movement of the user 1102, and adapt the video data shown via the VR device 1100 to account for the head movements, providing an immersive experience in which the user 1102 may experience an acoustical space shown in the video data in visual three dimensions. The acoustical space may refer to a virtual world (in which all of the world is simulated), an augmented world (in which portions of the world are augmented by virtual objects), or a physical world (in which a real world image is virtually navigated).

While VR (and other forms of AR and/or MR) may allow the user 1102 to reside in the virtual world visually, often the VR device 1100 may lack the capability to place the user in the acoustical space audibly. In other words, the VR system (which may include a computer responsible for rendering the video data and audio data—that is not shown in the example of FIG. 2 for ease of illustration purposes, and the VR device 1100) may be unable to support full three-dimension immersion audibly (and in some instances realistically in a manner that reflects the displayed scene presented to the user via the VR device 1100).

While described in this disclosure with respect to the VR device, various aspects of the techniques may be performed in the context of other devices, such as a mobile device. In this instance, the mobile device (such as a so-called smartphone) may present the acoustical space via a screen, which may be mounted to the head of the user 1102 or viewed as would be done when normally using the mobile device. As such, any information on the screen can be part of the mobile device. The mobile device may be able to provide tracking information 41 and thereby allow for both a VR experience (when head mounted) and a normal experience to view the acoustical space, where the normal experience may still allow the user to view the acoustical space providing a VR-lite-type experience (e.g., holding up the device and rotating or translating the device to view different portions of the acoustical space).

In any event, returning to the VR device context, the audio aspects of VR have been classified into three separate categories of immersion. The first category provides the lowest level of immersion, and is referred to as three degrees of freedom (3DOF). 3DOF refers to audio rendering that accounts for movement of the head in the three degrees of freedom (yaw, pitch, and roll), thereby allowing the user to freely look around in any direction. 3DOF, however, cannot account for translational head movements in which the head is not centered on the optical and acoustical center of the soundfield.

The second category, referred to 3DOF plus (3DOF+), provides for the three degrees of freedom (yaw, pitch, and roll) in addition to limited spatial translational movements due to the head movements away from the optical center and acoustical center within the soundfield. 3DOF+ may provide support for perceptual effects such as motion parallax, which may strengthen the sense of immersion.

The third category, referred to as six degrees of freedom (6DOF), renders audio data in a manner that accounts for the three degrees of freedom in term of head movements (yaw, pitch, and roll) but also accounts for translation of the user in space (x, y, and z translations). The spatial translations may be induced by sensors tracking the location of the user in the physical world or by way of an input controller.

3DOF rendering is the current state of the art for the audio aspects of VR. As such, the audio aspects of VR are less immersive than the video aspects, thereby potentially reducing the overall immersion experienced by the user. However, VR is rapidly transitioning and may develop quickly to supporting both 3DOF+ and 6DOF that may expose opportunities for additional use cases.

For example, interactive gaming application may utilize 6DOF to facilitate fully immersive gaming in which the users themselves move within the VR world and may interact with virtual objects by walking over to the virtual objects. Furthermore, an interactive live streaming application may utilize 6DOF to allow VR client devices to experience a live stream of a concert or sporting event as if present at the concert themselves, allowing the users to move within the concert or sporting event.

There are a number of difficulties associated with these use cases. In the instance of fully immersive gaming, latency may need to remain low to enable gameplay that does not result in nausea or motion sickness. Moreover, from an audio perspective, latency in audio playback that results in loss of synchronization with video data may reduce the immersion. Furthermore, for certain types of gaming applications, spatial accuracy may be important to allow for accurate responses, including with respect to how sound is perceived by the users as that allows users to anticipate actions that are not currently in view.

In the context of live streaming applications, a large number of source devices 12A or 12B (either of which may hereinafter be referred to as source device 12) may stream content 21, where the source devices 12 may have widely different capabilities. For example, one source device may be a smartphone with a digital fixed-lens camera and one or more microphones, while another source device may be production level television equipment capable of obtaining video of a much higher resolution and quality than the smartphone. However, all of the source devices, in the context of the live streaming applications, may offer streams of varying quality from which the VR device may attempt to select an appropriate one to provide an intended experience.

Moreover, similar to the gaming applications, latency in audio data such that loss of synchronization occurs with the video data may result in less immersion. Moreover, spatial accuracy may also be important such that the users may better understand the context or location of different audio sources. Further, when users are live streaming using cameras and microphones, privacy may become an issue, as users may not want to live streams fully available to the public.

In the context of streaming application (live or recorded), there may be a large number of audio streams associated with varying levels of quality and/or content. The audio streams may represent any type of audio data, including scene-based audio data (e.g., ambisonic audio data, including FOA audio data, MOA audio data and/or HOA audio data), channel-based audio data, and object-based audio data. Selecting only one of a potentially large number of audio streams from which to recreate a soundfield may not provide an experience that ensures an adequate level of immersion. However, selecting multiple audio streams may create distractions due to different spatial localization between the multiple audio streams, thereby potentially reducing immersion.

In accordance with the techniques described in this disclosure, the audio decoding device 34 may adaptively select between audio streams available via the bitstream 27 (which are represented by the bitstream 27 and hence the bitstream 27 may also be referred to as "audio streams 27"). The audio decoding device 34 may select between different audio streams of the audio streams 27 based on audio location information (ALI) (e.g., 45A in FIGS. 1A-1C), which, in some examples, may be included as metadata accompanying the audio streams 27, where the audio location information may define coordinates in the acoustical space for the microphones that capture the respective audio streams 27 or virtual coordinates where the audio streams were synthesized. The ALI 45A may be representative of a capture location in an acoustical space at which the corresponding one of the audio streams 27 was captured or virtual coordinates where the corresponding one of the audio streams was synthesized. The audio decoding device 34 may select, based on the ALI 45A, a subset of the audio streams 27, where the subset of the audio streams 27 excludes at least one of the audio streams 27. The audio decoding device 34 may output the subset of audio streams 27 as audio data 19' (which may also be referred to as "audio data 19").

In addition, the audio decoding device 34 may obtain the tracking information 41, which the content consumer device 14 may translate into device location information (DLI) (e.g., 45B in FIGS. 1A-1C). The DLI 45B may represent a virtual location or an actual location of the content consumer device 14 in the acoustical space, which may be defined as one or more device coordinates in the acoustical space. The content consumer device 14 may provide the DLI 45B to the audio decoding device 34. The audio decoding device 34 may then select, based on the ALI 45A and the DLI 45B, the audio data 19' from the audio streams 27. The audio playback system 16A may then reproduce, based on the audio data 19', the corresponding soundfields.

In this respect, the audio decoding device 34 may adaptively select a subset of the audio streams 27 to obtain the audio data 19' that may result in a more immersive experience (compared to selecting a single audio stream or all of the audio data 19'). As such, various aspects of the techniques described in this disclosure may improve operation of the audio decoding device 34 (and the audio playback system 16A or 16B and the content consumer device 14) itself by possibly enabling the audio decoding device 34 to better spatialize sound sources within the soundfield and thereby improve immersion.

In operation, the audio decoding device 34 may interface with one or more source devices 12 to determine the ALI 45A for each of the audio streams 27. As shown in the example of FIG. 1A, the audio decoding device 34 may include a stream selection unit 44, which may represent a unit configured to perform various aspects of the audio stream selection techniques described in this disclosure.

The stream selection unit 44 may generate, based on the ALI 45A, a constellation map (CM) 47. The CM 47 may define the ALI 45A for each of the audio streams 27. The stream selection unit 44 may also perform an energy analysis with respect to each of the audio streams 27 to determine an energy map for each of the audio streams 27, storing the energy map along with the ALI 45A in the CM 47. The energy maps may jointly define an energy of a common soundfield represented by the audio streams 27.

The stream selection unit 44 may next determine distance(s) between the device location represented by the DLI 45B and the capture location(s) or synthesis location(s) represented by the ALI 45A associated with at least one and possibly each of the audio streams 27. The stream selection unit 44 may then select, based on the distance(s), the audio data 19' from the audio streams 27 as discussed in more detail below with respect to FIGS. 3A-3F.

Further, in some examples, the stream selection unit 44 may also select, based on the energy maps stored to the CM 47, the ALI 45A, and the DLI 45B (jointly where the ALI 45A and the DLI 45B are presented in the form of the above noted distances, which may also be referred to as "relative distances"), the audio data 19' from the audio streams 27. For example, the stream selection unit 44 may analyze the energy maps presented in the CM 47 to determine an audio source location (ASL) 49 of an audio source in the common soundfield emitting sound that is captured by microphones (such as the microphone 18) and represented by the audio streams 27. The stream selection unit 44 may then determine, based on ALI 45A, the DLI 45B, and the ASL 49, the audio data 19' from the audio streams 27. More information regarding how the stream selection unit 44 may select the streams is discussed below with respect to FIGS. 3A-3F.

Figure 3A:
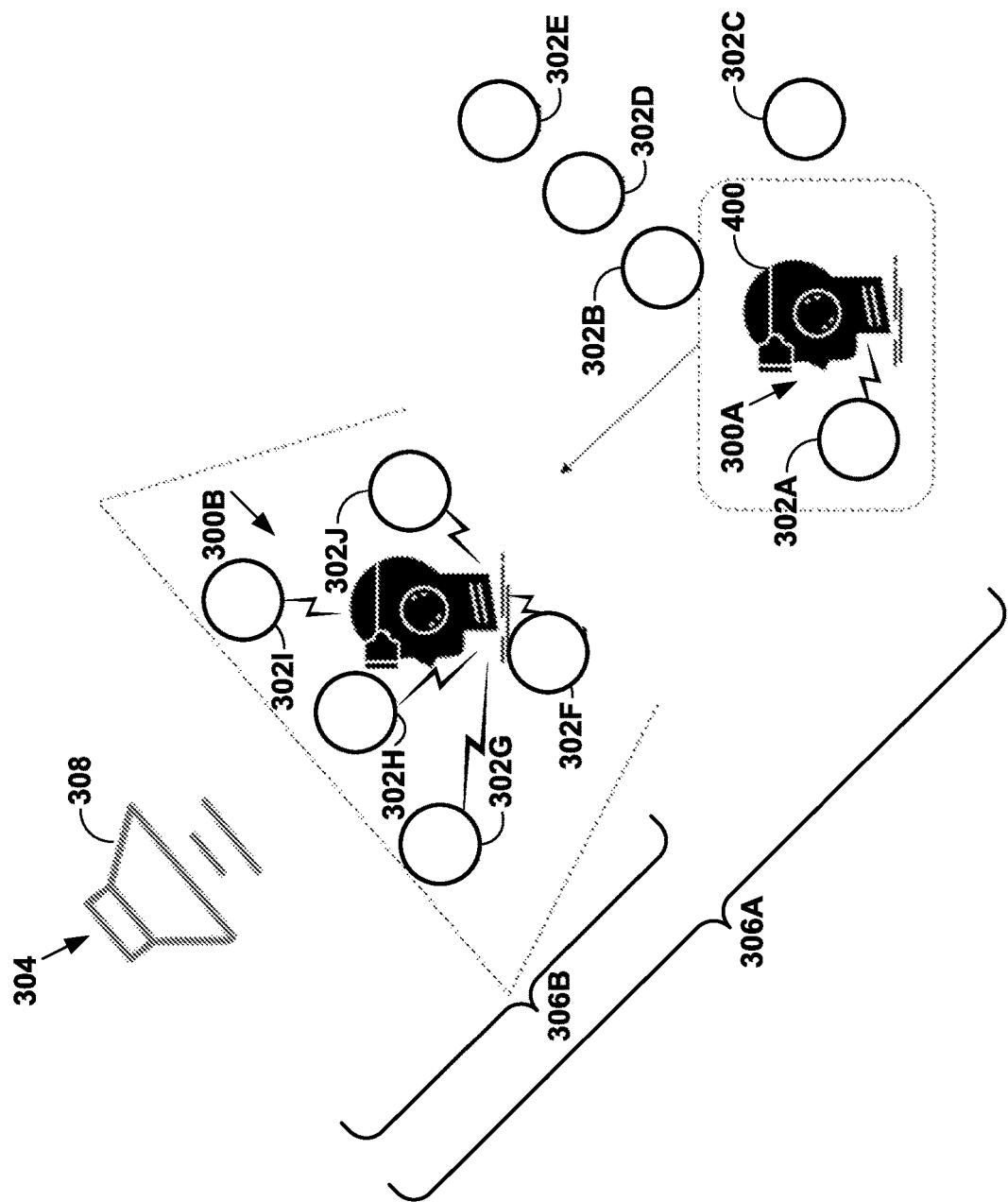
FIGS. 3A-3E are diagrams illustrating, in more detail, example operation of the stream selection unit shown in the examples of FIGS. 1A-1C.

FIGS. 3A-3F are diagrams illustrating, in more detail, example operation of the stream selection unit 44 shown in the example of FIGS. 1A-1C. As shown in the example of FIG. 3A, the stream selection unit 44 may determine that the DLI 45B indicates that the content consumer device 14 (shown as the VR device 1100) is at virtual location 300A. The stream selection unit 44 may next determine the ALI 45A for one or more of audio elements 302A-302J (collectively referred to as audio elements 302), which may represent not just microphones, such as the microphone 18 shown in FIG. 1A, but other types of capture devices, including other XR devices, mobile phones—including so-called smartphones—and the like, or synthesized soundfield, etc.).

As described above, the stream selection unit 44 may obtain the audio streams 27. The stream selection unit 44 may interface with audio elements 302A-302J to obtain the audio streams 27. In some examples, the stream selection unit 44 may interact with an interface (such as a receiver, a transmitter and/or a transceiver) to obtain the audio streams 27 in accordance with a fifth generation (5G) cellular standard, a personal area network (PAN), such as Bluetooth™, or some other open-source, proprietary or standardized communication protocol. Wireless communication of the audio streams is denoted as a lightning bolt in the examples of FIGS. 3A-3E, where the selected audio data 19' is shown as communication from the selected one or more of the audio elements 302 to the VR device 1100.

In any event, the stream selection unit 44 may next obtain energy maps in the manner described above, analyzing the energy maps to determine the audio source location 304, which may represent one example of the ASL 49 shown in the example of FIG. 1A. The energy maps may denote audio source location 304 as the energy at the audio source location 304 may be higher than the surrounding area. Given that each of the energy maps may denote this higher energy, the stream selection unit 44 may triangulate, based on the higher energy in the energy maps, the audio source location 304.

Next, the stream selection unit 44 may determine an audio source distance 306A as a distance between the audio source location 304 and the virtual location 300A of the VR device 1100. The stream selection unit 44 may compare the audio source distance 306A to an audio source distance threshold. The stream selection unit 44 may, in some examples, derive the audio source distance threshold based on the energy of the audio source 308. That is, when the audio source 308 has a higher energy (or, in other words, when the audio source 308 is louder), the stream selection unit 44 may increase the audio source distance threshold. When the audio source 308 has a lower energy (or, in other words, when the audio source 308 is quieter), the stream selection unit 44 may decrease the audio source distance threshold. In other examples, the stream selection unit 44 may obtain a statically defined audio source distance threshold, which may be statically defined or specified by the user 1102.

In any event, the stream selection unit 44 may select, when the audio source distance 306A is greater than the audio source distance threshold (which is assumed in this example for purposes of illustration), a single audio stream of the audio streams 27 captured by the audio elements 302A-302J ("audio elements 302"). The stream selection unit 44 may output the corresponding one of the audio streams 27, which the audio decoding device 34 may decode and output as the audio data 19'.

Assuming that the user 1102 moves from the virtual location 300A to the virtual location 300B, the stream selection unit 44 may determine an audio source distance 306B as a distance between the audio source location 304 and the virtual location 300B. In some examples, the stream selection unit 44 may only update after some configurable release time, which may refer to a time until the receiver region increases after the listener stops moving.

In any event, the stream selection unit 44 may again compare the audio source distance 306B to the audio source distance threshold. The stream selection unit 44 may select, when the audio source distance 306B is less than or equal to the audio source distance threshold (which is assumed in this example for purposes of illustration), multiple audio streams of the audio streams 27 captured by the audio elements 302A-302J ("audio elements 302"). The stream selection unit 44 may output the corresponding ones of the audio streams 27, which the audio decoding device 34 may decode and output as the audio data 19'.

The stream selection unit 44 may also determine one or more proximity distances between the virtual location 300B and one or more (and possibly each) of the capture locations represented by the ALI 45A. The stream selection unit 44 may then compare the one or more proximity distances to a threshold proximity distance. The stream selection unit 44 may select, when the one or more proximity distances are greater than the threshold proximity distance, a smaller number of the audio streams 27 compared to when the one or more proximity distances are less than or equal to the threshold proximity distance to obtain the audio data 19'. However, the stream selection unit 44 may select, when the one or more of the proximity distances are less than or equal to the threshold proximity distance, a larger number of the audio streams 27 compared to when the one or more proximity distances are less than or equal to the threshold proximity distance to obtain the audio data 19'.

In other words, the stream selection unit 44 may attempt to select those of the audio streams 27 such that the audio data 19' are most closely aligned to the virtual location 300B and surround the virtual location 300B. The proximity distance threshold may define such a threshold, which the user 1102 of the VR device 1100 may set or the stream selection unit 44 may again determine dynamically based on a quality of the audio elements 302F-302J, the gain or loudness of the audio source 308, tracking information 41 (e.g., to determine whether the user 1102 is facing the audio source 308), or any other factors.

In this respect, the stream selection unit 44 may increase audio spatialization accuracy when the listener is at the location 300B. Furthermore, when at the listener is at the location 300A, the stream selection unit 44 may reduce a bitrate, as only the audio stream captured by audio element 302A is used to reproduce the soundfield rather than multiple audio streams of audio elements 302B-302J.

Figure 3B:
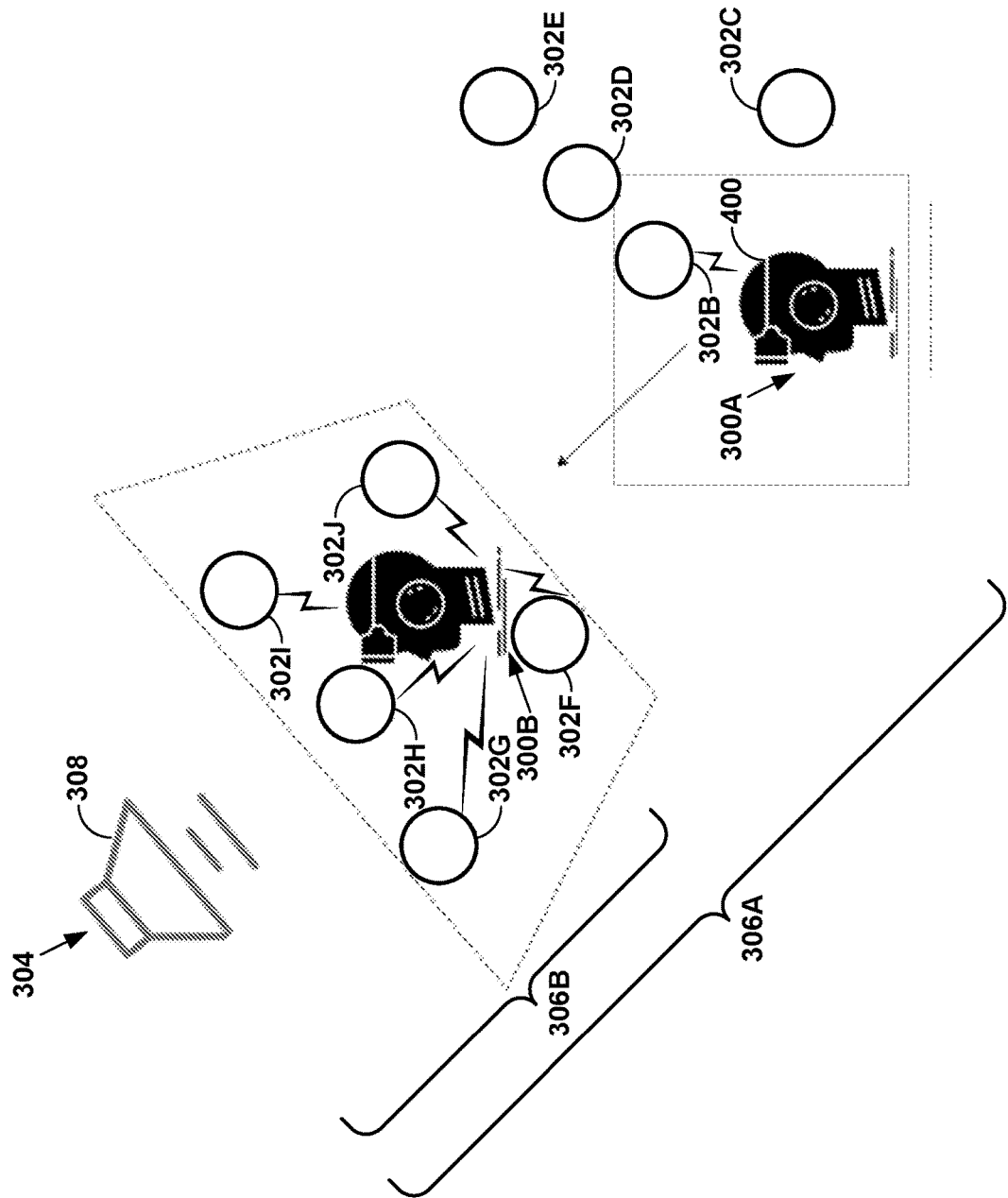

Referring next to the example of FIG. 3B, the stream selection unit 44 may determine that the audio stream of the audio element 302A is corrupted, noisy, or unavailable. The stream selection unit 44 may remove the audio stream from the CM 47 and reiterate through the audio streams 27 in accordance with the techniques described in more detail above to select a single one of the audio streams 27 (e.g., the audio stream captured by the microphone 302B in the example of FIG. 3B) given that the audio source distance 306A is greater than the audio source distance threshold.

Figure 3C:
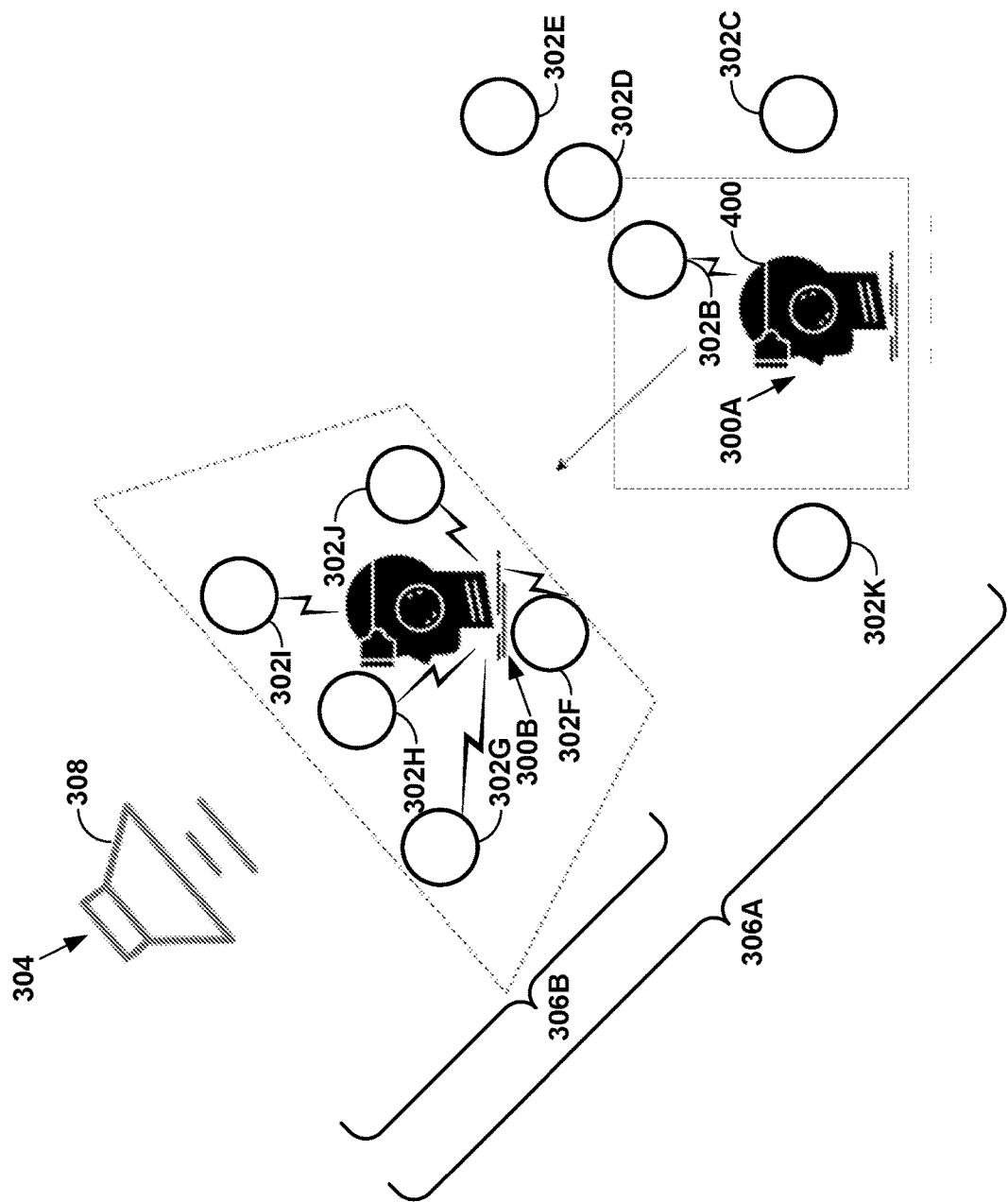

Referring next to the example of FIG. 3C, the stream selection unit 44 may obtain a new audio stream (the audio stream of the audio element 302K) and corresponding new audio information, e.g., metadata, that includes ALI 45A. The stream selection unit 44 may add the new audio stream to the CM 47 representative of the audio streams 27. The stream selection unit 44 may then reiterate through the audio streams 27 in accordance with the techniques described in more detail above to select a single one of the audio streams 27 (e.g., the audio stream captured by the of audio element 302B example of FIG. 3C) given that the audio source distance 306A is greater than the audio source distance threshold.

Figure 3D:
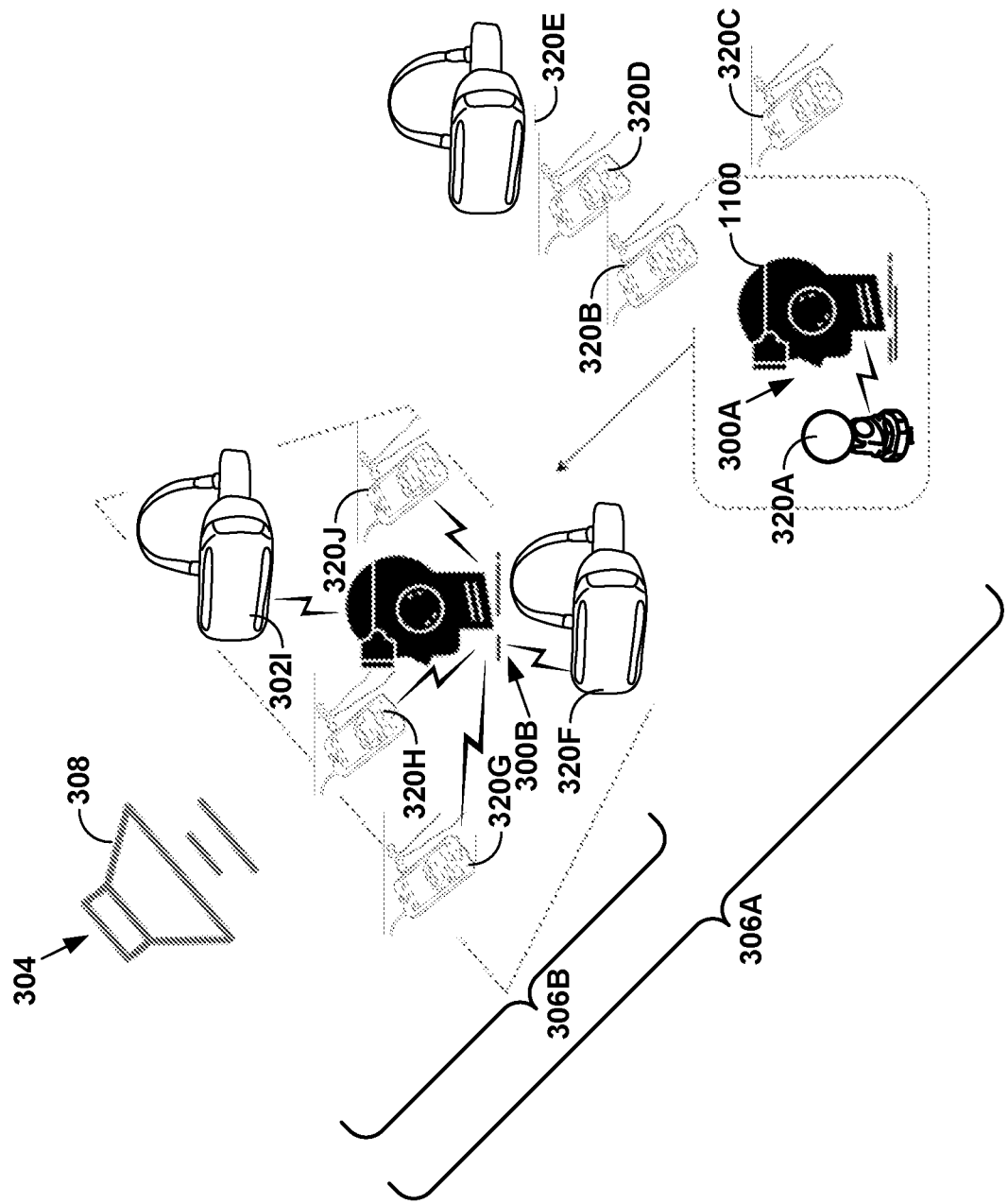

In the example of FIG. 3D, the audio elements 302 are replaced with specific example devices 320A-320J ("devices 320"), where device 320A represents a dedicated microphone 320A, while devices 320B, 320C, 320D, 320G, 320H, and 320J represent smartphones. The devices 320E, 320F, and 320I may represent VR devices. Each of devices 320 may include the audio elements 302, which capture audio streams 27 that are to be selected in accordance with various aspects of the stream selection techniques described in this disclosure.

Figure 3E:
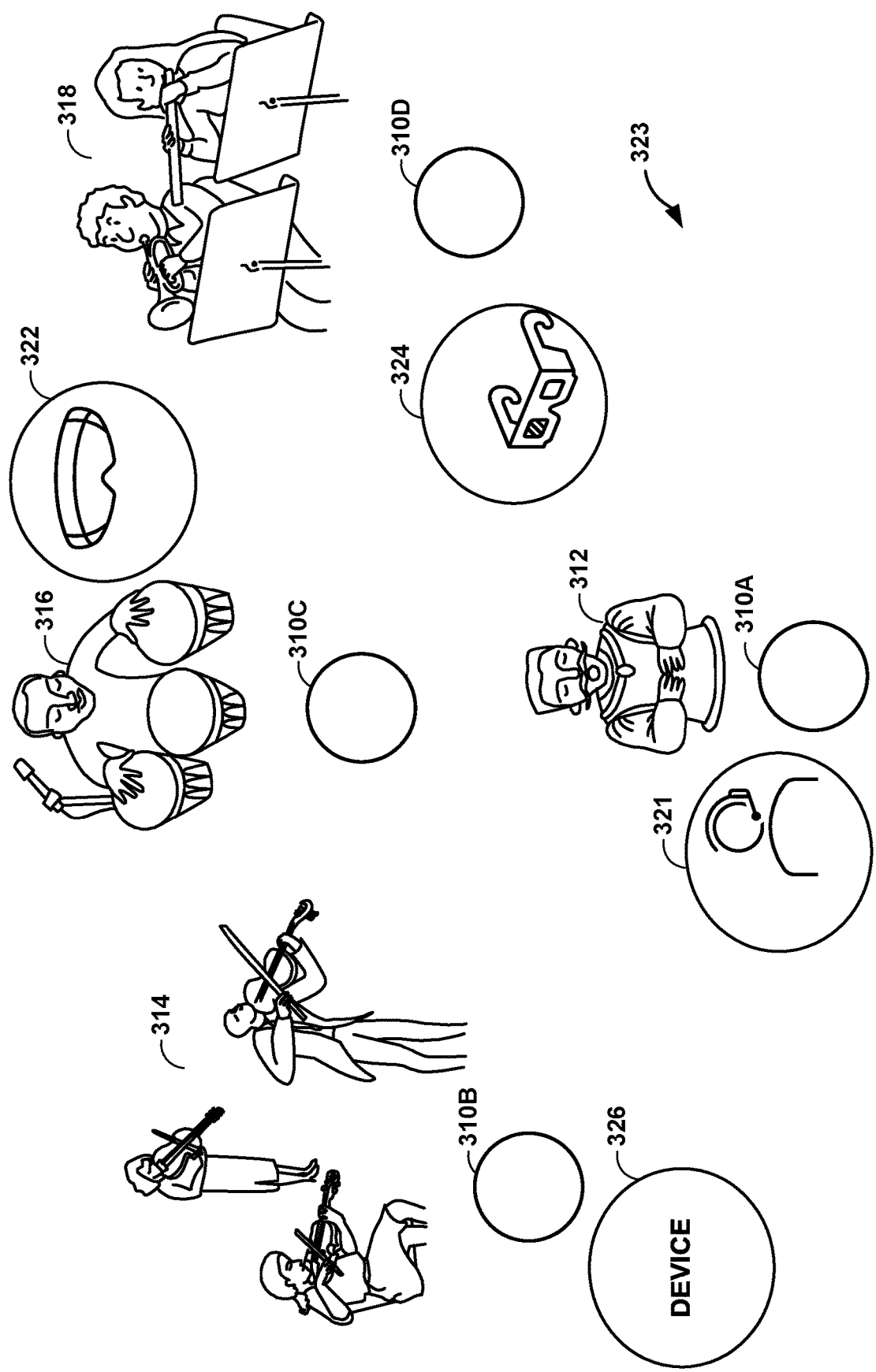

FIG. 3E is a conceptual diagram illustrating an example concert with three or more audio elements. In the example of FIG. 3E, a number of musicians are depicted on stage 323. Singer 312 is positioned behind audio element 310A. A string section 314 is depicted behind audio element 310B. Drummer 316 is depicted behind audio element 310C. Other musicians 318 are depicted behind audio element 310D. Audio elements 310A-301D may represent captured audio streams that correspond to the sounds received by microphones. In some examples, microphones 310A-310D may represent synthesized audio streams. For example, audio element 310A may represent a captured audio stream(s) primarily associated with singer 312, but the audio stream(s) may also include sounds produced by other band members, such as the string section 314, the drummer 316 or the other musicians 318, while the audio element 310B may represent a captured audio stream(s) primarily associated with string section 314, but include sounds produced by other band members. In this manner, each of audio elements 310A-310D, may represent a different audio stream(s).

Also, a number of devices are depicted. These devices represent user devices located at a number of different listening positions. Headphones 321 are positioned near audio element 310A, but between audio element 310A and audio element 310B. As such, according to the techniques of this disclosure, stream selection unit 44 may select at least one of the audio streams to produce an audio experience for the user of the headphones 321 similar to the user being located where the headphones 321 are located in FIG. 3F. Similarly, VR goggles 322 are shown located behind the audio element 310C and between the drummer 316 and the other musicians 318. The stream selection unit 44 may select at least one audio stream to produce an audio experience for the user of the VR goggles 322 similar to the user being located where the VR goggles 322 are located in FIG. 3F.

Smart glasses 324 are shown located fairly centrally between the audio elements 310A, 310C and 310D. The stream selection unit 44 may select at least one audio stream to produce an audio experience for the user of the smart glasses 324 similar to the user being located where the smart glasses 324 are located in FIG. 3F. Additionally, device 326 (which may represent any device capable of implementing the techniques of this disclosure, such as a mobile handset, a speaker array, headphones, VR goggles, smart glasses, etc.) is shown located in front of audio element 310B. Stream selection unit 44 may select at least one audio stream to produce an audio experience for the user of the device 326 similar to the user being located where the device 325 is located in FIG. 3E. While specific devices where discussed with respect to particular locations, a used of any of the devices depicted may provide an indication of a desired listening position that is different than depicted in FIG. 3E.

Figure 4A:
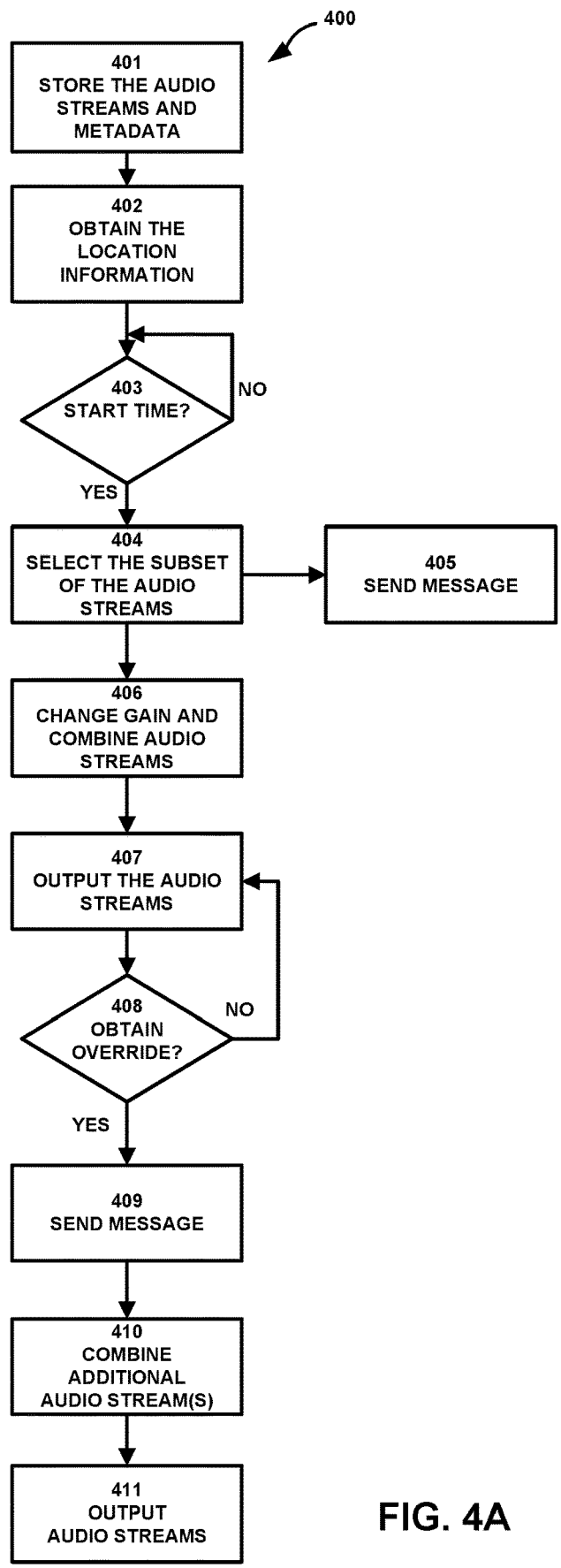
FIGS. 4A-4C are flowcharts illustrating example operation of the stream selection unit shown in the examples of FIGS. 1A-1C to control access to at least one of the plurality of audio streams based on timing information.
Figure 4B:
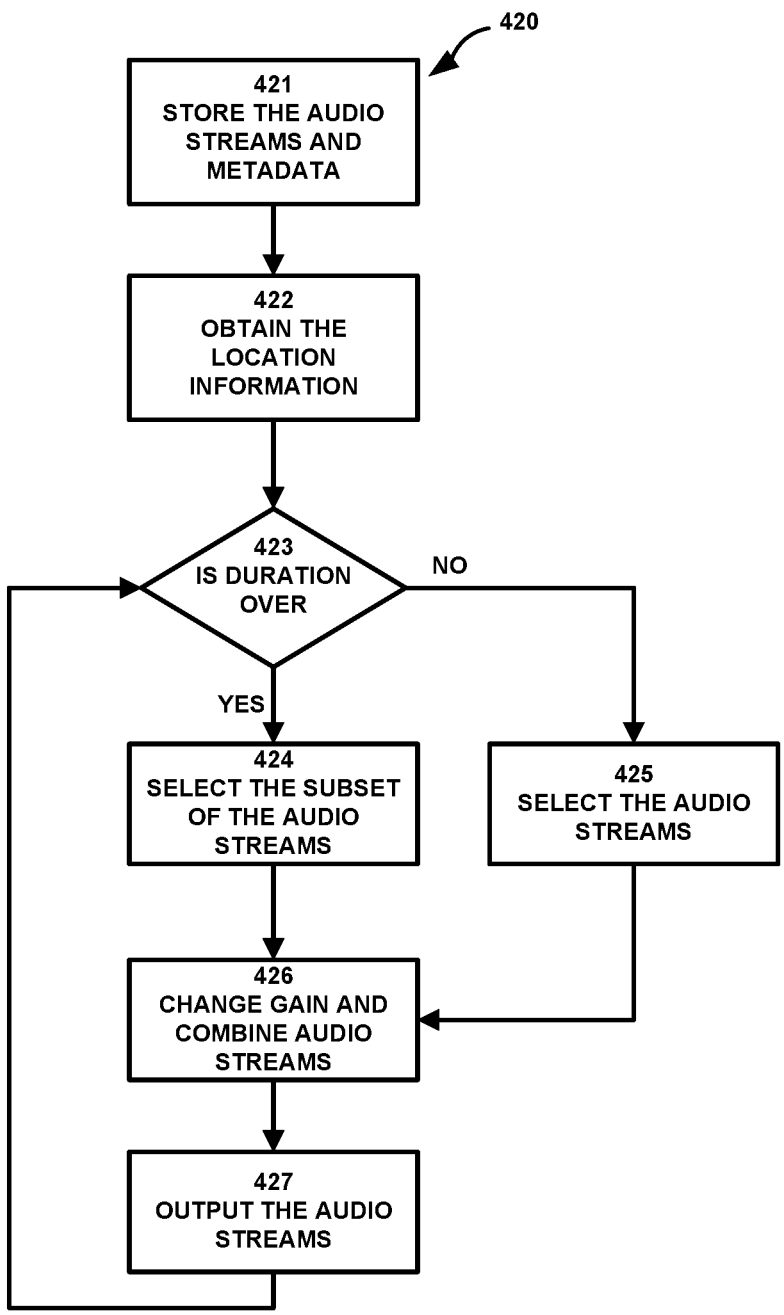
Figure 4C:
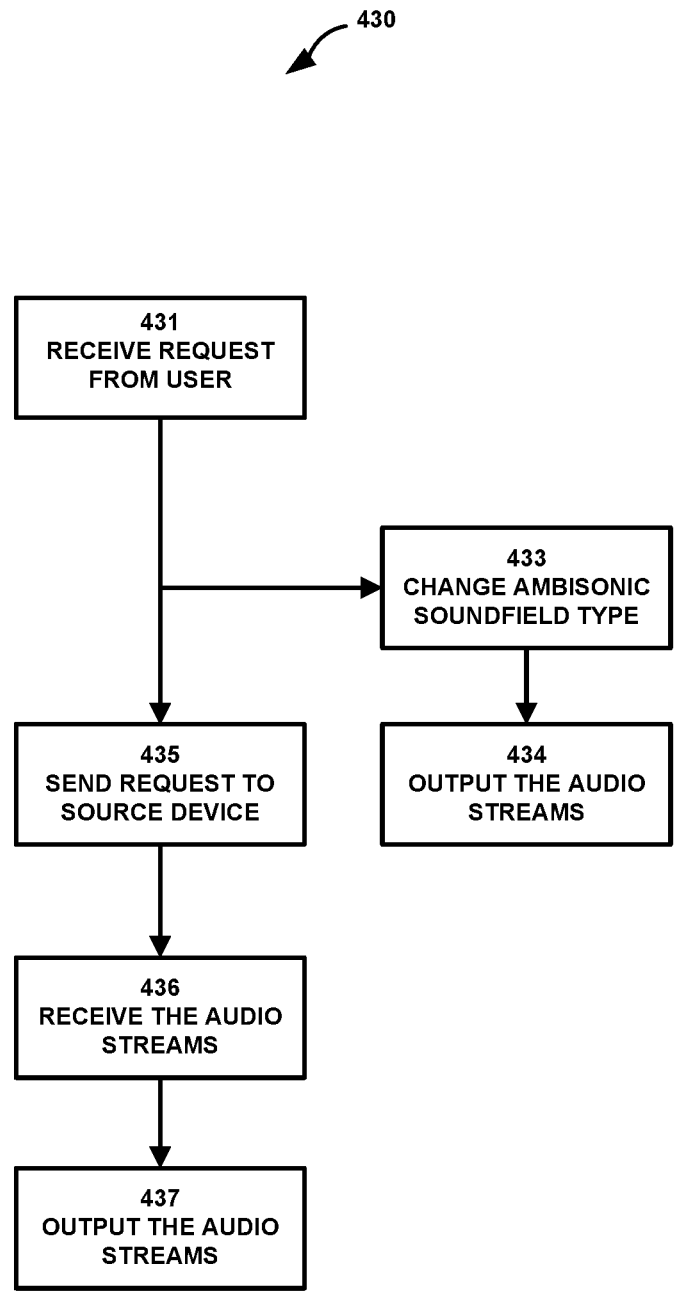

FIGS. 4A-4C are flowcharts illustrating an example of operation of the stream selection unit 44 shown in the examples of FIGS. 1A-1C to control access to at least one of the plurality of audio streams based on timing information. In some examples, the timing information may be timing metadata. In some examples, the timing metadata may be included in audio metadata. In the example of FIG. 4A, the use of a start time is discussed.

In many contexts, there are audio streams that may be inappropriate or offensive for some people. For example, at a live sporting event, there may be people using offensive language in the venue. The same may be true in some video games. At other live events, like a convention, there may be sensitive discussions occurring. With the use of a start time, the stream selection unit 44 of the content consumer device 14 may screen out the undesired or sensitive audio streams and exclude them from playback to the user. The timing information, such as timing metadata, may be associated with individual audio streams or with privacy zones (discussed in more detail with respect to FIGS. 4H and 4J).

In some cases, the source device 12 may apply the start time. For example, at a convention where sensitive discussions are going to occur at a given time, the content creator or source may create and apply the start time when the discussions are going to begin so that only certain people with appropriate privileges are able to hear the discussions. For other people without the appropriate privileges, the stream selection unit 44 may screen out or otherwise exclude the audio stream(s) for the discussions.

In other cases, such as the sporting event example, the content consumer device 14 may create and apply the start time. As such, a user may exclude the offensive language during audio playback.

The use of the start time information, such as start time metadata, is now discussed (400). The stream selection unit 44 may take the incoming audio streams and metadata associated with the audio streams, including location information, and start time information and stores them in the memory of the content consumer device 14 (401). The stream selection unit 44 may obtain location information (402). This location information may be associated with capture coordinates in the acoustical space, as discussed above. Start time information may be associated with each stream or with privacy zones (to be discussed more thoroughly with respect to FIG. 4F). For instance, at a live event, there may be sensitive discussions occurring, or there may be inappropriate language being used or topics being discussed for certain audiences. For instance, if a sensitive meeting at a convention is going to be held at 1:00 PM GMT, the content creator or source may set the start time for the audio stream(s) or privacy zone(s) containing the audio associated with that meeting to 1:00 PM GMT. In one example, the stream selection unit 44 may compare the start time to the current time (403) and if the start time is equal or later than the current time, the stream selection unit 44 may screen out or otherwise exclude those audio streams or privacy zones with the associated start time (404). In some examples, content consumer device 14 may stop downloading the excluded audio streams.

In another example, when the stream selection unit 44 screens out or excludes an audio stream or privacy zone, the content consumer device 14 may send a message to the source device 12 instructing the source device 12 to cease sending the excluded streams (405). This way content consumer device does not received the excluded streams and bandwidth within the transmission channel may be saved.

In one example, the audio playback system 16 (which may represent either audio playback system 16A or audio playback system 16B, for simplicity purposes) may change the gain based upon the start time associated with the audio stream or privacy zone, boosting or attenuating the audio output. In another example, the audio playback system 16 may not change the gain. The audio decoding device 34 may also combine two or more selected audio streams together (406). The combining of selected audio streams could be done by way of mixing or interpolation or another variant of soundfield manipulation, for example. The audio decoding device may output the subset of audio streams (407).

In one example, the audio playback system 16 may allow a user to override the start time. For example, content consumer device 14 may obtain, from user 1102, e.g., an override request to add at least one excluded audio stream of the plurality of audio streams (408). In the example where the content consumer device 14 sends a message to tell the source device to stop sending the excluded audio streams or privacy zones (405), the content consumer device 14 would send a new message to tell the source device restart the sending of those audio streams or privacy zones (409). If the start time is overridden, then the audio decoding device 34 may add or combine those respective streams or privacy zones with the subset of audio streams or privacy zones (410). The combining of selected audio streams could be done by way of mixing or interpolation or another variant of soundfield manipulation, for example. The audio decoding device 34 may include the selected streams in the audio output (411).

FIG. 4B is a flowchart illustrating an example of operation of the stream selection unit shown in the examples of FIGS. 1A-1C to control access to at least one of the plurality of audio streams based on timing information. In this example, the timing information is a duration. In some examples, the timing information may be timing metadata. In some examples, the timing metadata may be included in audio metadata. In some instances, a content creator or source may desire to provide a more complete experience for a temporary time period. For instance, a content provider or source may want to do so for an advertisement or a trial period when attempting to get a user to upgrade their level of service.

Stream selection unit 44 may store the incoming audio streams and information, such as metadata, associated with them, including location information, and start time metadata in the memory of the content consumer device 14 (421). The stream selection unit 44 may obtain location information (422). The stream selection unit 44 may do this by reading the location information from memory, for example in the case of a single audio stream, or calculating it, for example in the case of a privacy zone. This location information may be associated with capture coordinates in the acoustical space, as discussed above. Duration metadata may be associated with each stream or with privacy zones and may be set to any duration. For instance, in the example of offering a full experience for a limited time period, the source device or the content consumer device may set the duration to be an hour, for example only. The stream selection unit 44 may compare the duration with a timer (423). If the timer is equal or greater than the duration, the stream selection unit 44 may exclude the audio streams or privacy zones associated with the duration, thereby selecting a subset of the audio streams (424). If the timer is less than the duration, the stream selection unit 44 would not exclude those streams or privacy zones (425).

As with the example of FIG. 4A, the content consumer device 14 could send a message to the source device 12 telling it to cease sending the excluded streams and send another message to start resending the excluded streams if the duration is overridden (not shown for the sake of simplicity). This way bandwidth within the transmission channel could be saved.

In one example, the audio playback system 16 may change the gain based upon the duration associated with the audio stream or privacy zone, boosting or attenuating the audio output. In another example, the audio playback system may not change the gain. The audio decoding device 34 may combine two or more selected audio streams together (426). The combining of selected audio streams could be done by way of mixing or interpolation or another variant of soundfield manipulation, for example. The audio decoding device 34 may then output the subset of audio streams (427).

By using start time and/or duration as access controls, the stream selector unit 44 may maintain access control even when there is no connection to the source device. For example, when the content consumer device 14 is offline and is playing stored audio, the stream selector unit 44 may still compare the start time to the current time or the duration to the timer and effectuate offline access control.

FIG. 4C is a flowchart illustrating an example of operation of the stream selection unit shown in the examples of FIGS. 1A-1C in performing various aspects of the stream selection techniques (430). The source device 12 may make available different soundfields, such as FOA soundfields, higher order ambisonic soundfield (HOA) or MOA soundfields. A user of the content consumer device 14 may make a request on content consumer device 14 through a user interface to change the audio experience (431). For example, the user who is experiencing FOA soundfields may desire an enhanced experience and request HOA or MOA soundfields. If the content consumer device is in receipt of the necessary coefficients and is configured to change the ambisonic soundfield type (432), it may then change the ambisonic soundfield type (433) and the stream selection unit 44 may output the audio streams (434). If the content consumer device 14 is not in receipt of the necessary coefficients or is not configured to change the ambisonic soundfield type, the content consumer device 14 may send a request to the source device 12 to make the change (435). The source device may make the change and send the new soundfields to the content consumer device 14. The audio decoding device 34 may then receive the new soundfields (436) and output the audio streams (437). The use of different types of ambisonic soundfields could also be used with the start time example of FIG. 4A and the duration example of FIG. 4B. For example, the content consumer device 14 may use one ambisonic soundfield type until the start time is equal or greater than the current time and then another ambisonic soundfield type. Or the content consumer device 14 may use one ambisonic soundfield type until the timer is equal to or greater than the duration and then use another ambisonic soundfield type.

Figure 4D:
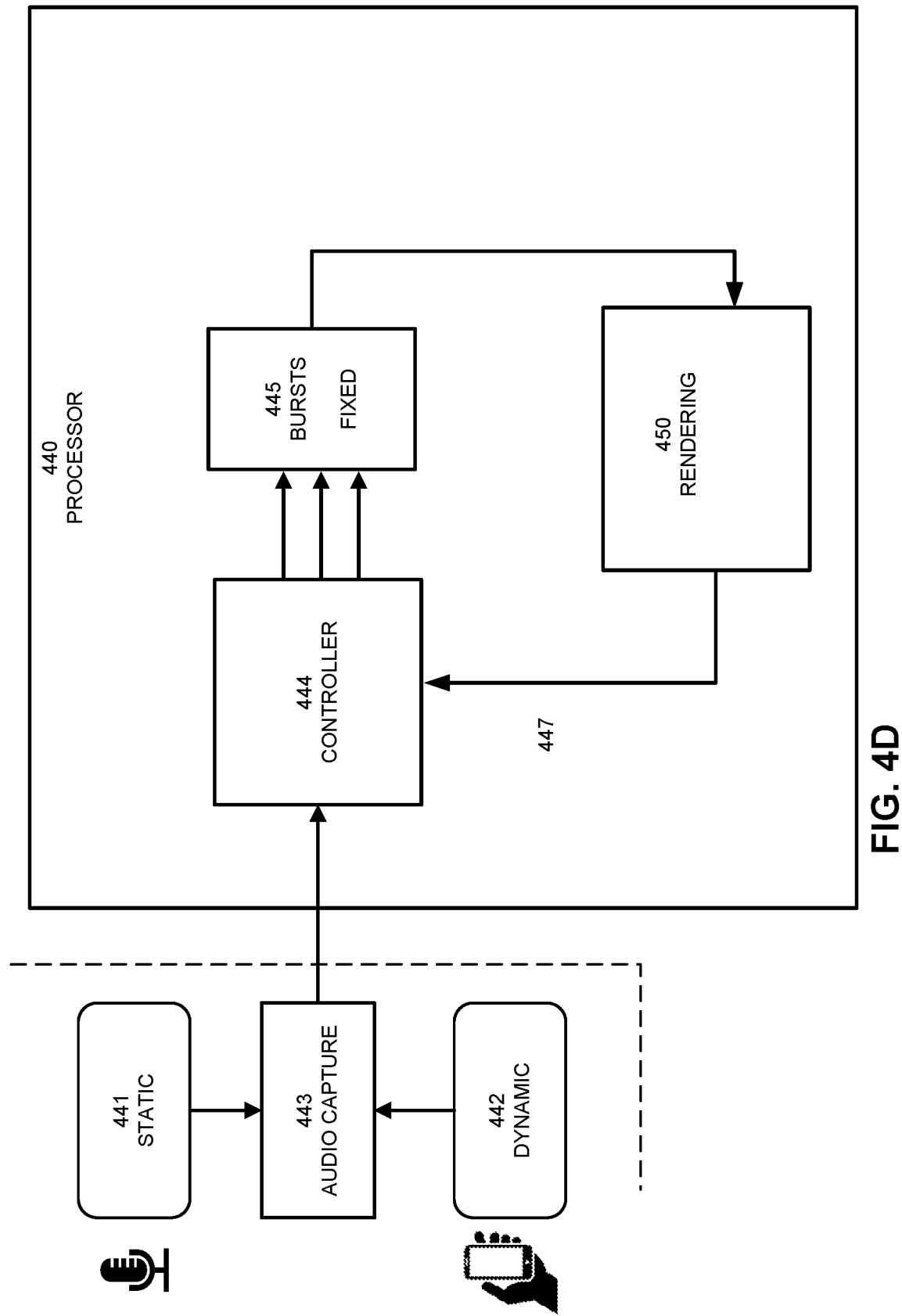
FIGS. 4D and 4E are diagrams further illustrating the use of timing information, such as timing metadata, in accordance with various aspects of the techniques described in this disclosure.
Figure 4E:
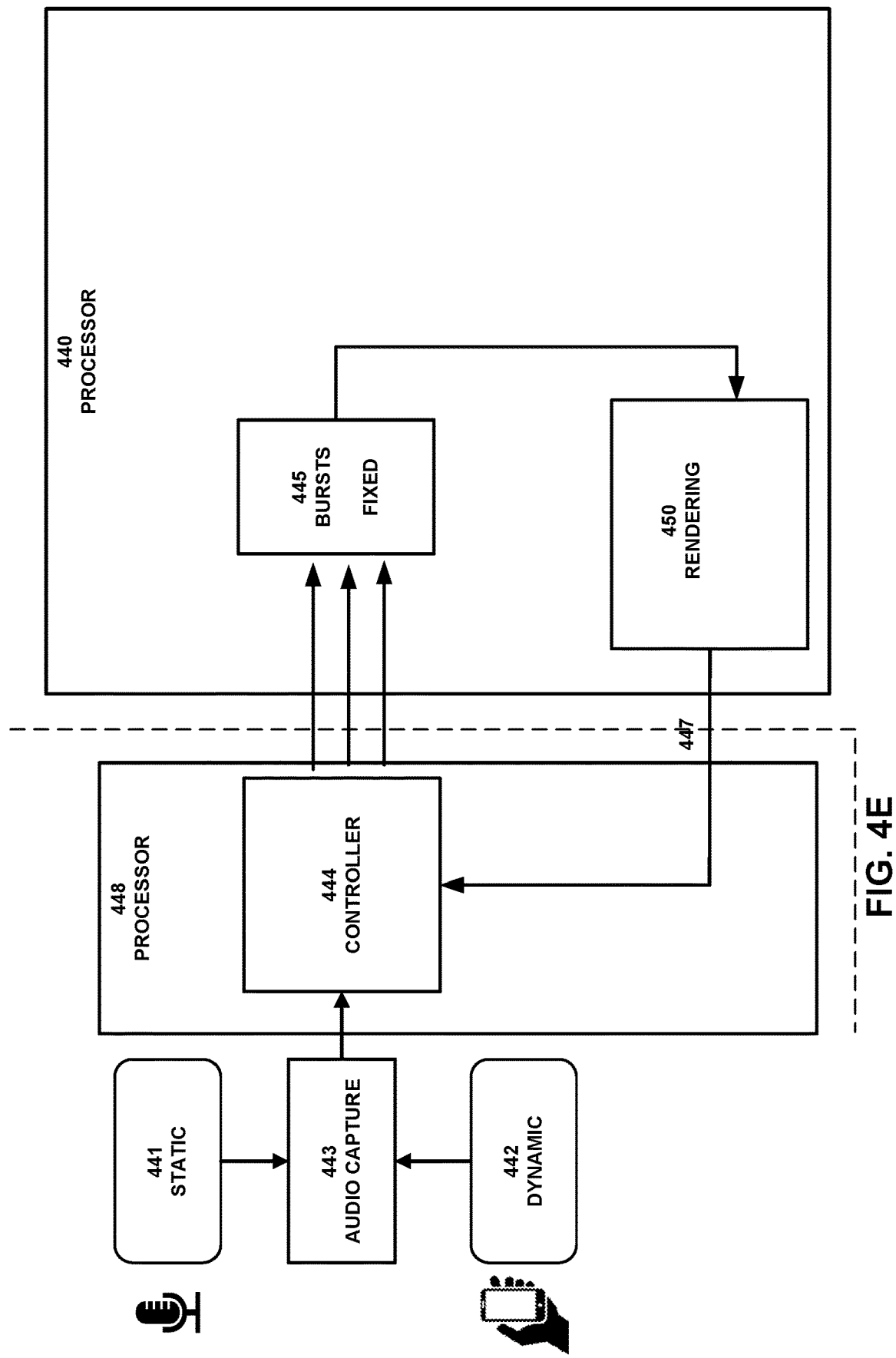

FIGS. 4D and 4E are diagrams further illustrating the use of timing information, such as timing metadata, in accordance with various aspects of the techniques described in this disclosure. A static audio source 441, such as an open microphone is shown. In some examples, the static audio source 441 may be a live audio source. In other examples, the static audio source 441 may be a synthetic audio source. A dynamic audio source 442, such as in a user operated mobile handset where the user sets when it is recording, is also shown. In some examples, the dynamic audio source may be a live audio source. In other examples, the dynamic audio source 442 may be a synthetic source. One or more of the static audio source 441 and/or the dynamic audio source 442 may capture audio information 443. A controller 444 may process the audio information 443. In FIG. 4D, the controller 444 may be implemented in one or more processors 440 in the content consumer device 14. In FIG. 4E, the controller 444 may be implemented in one or more processors 448 in the source device 12. The controller 444 may compartmentalize the audio information into zones, create audio streams and tag the audio streams with information, such as metadata, including location information regarding the location of the audio sources 441 and 442, and the zonal compartmentalization, including the boundaries of the zones, through centroid and radius data, for example. In some examples, controller 444 may provide the location information in a manner other than as metadata. The controller 444 may perform these functions online or offline. The controller 444 may also assign timing information, such as timing metadata, to each of the audio streams or zones, such as start time information or duration information. The controller 444 may provide burst (e.g., periodic) or fixed (e.g., sustained) audio streams and associated information, such as metadata, to the content consumer device 14. The controller 444 may also assign gains and/or nulling to be applied to the audio streams.

The stream selection unit 44 may use the timing metadata to provide bursts or fixed audio streams to the user during rendering. So the user's experience may change based upon the timing metadata. The user may request the controller 444 over the link 447 to override the timing metadata and change the user's access to the audio streams or privacy zones.

Figure 4F:
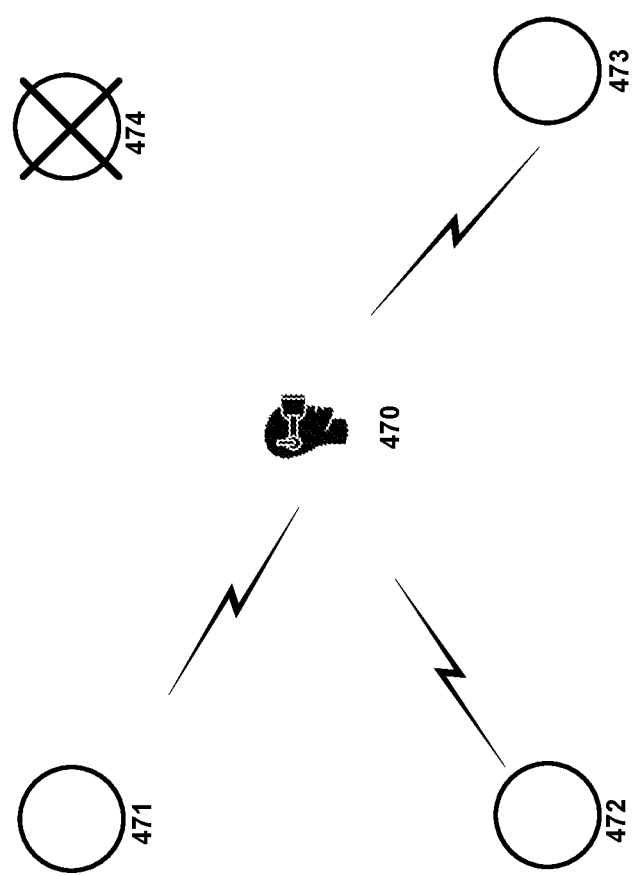
FIGS. 4F and 4G are diagrams illustrating the use of a temporary request for greater access in accordance with various aspects of the techniques described in this disclosure.
Figure 4G:
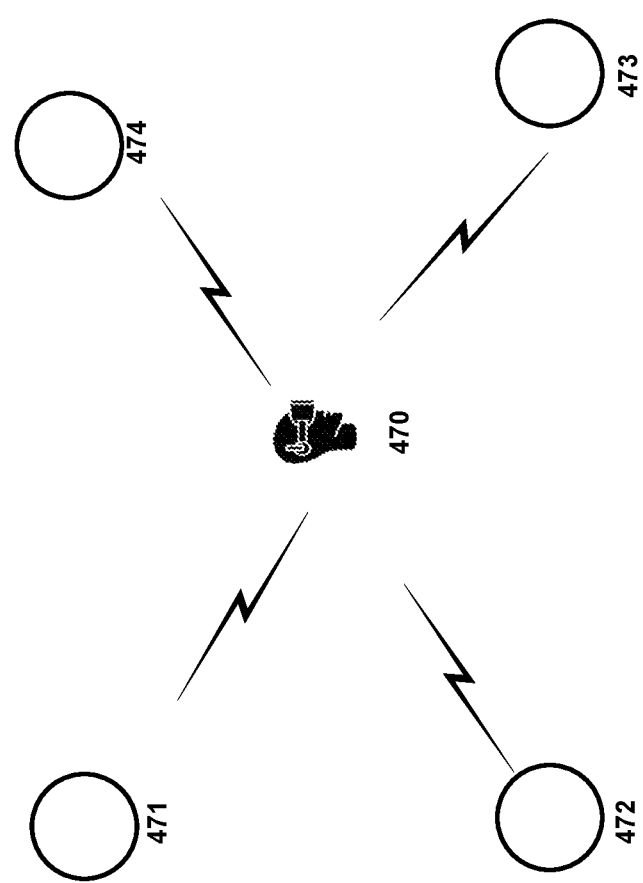

FIGS. 4F and 4G are diagrams illustrating the use of a temporary request for greater access in accordance with various aspects of the techniques described in this disclosure. In this example as shown in FIG. 4F, the content consumer device 14 is rendering to the user 470 audio streams 471, 472 and 473 which are represented by the depicted audio elements. The content consumer device 14 is not rendering the audio stream 474 also represented by an audio element. In this case if the user would like temporary elevation of their experience, they may send a request through a user interface to temporarily grant them access to the audio stream 474. The stream selector unit may then add in the audio stream 474 as shown in FIG. 4G. In some examples, the content consumer device 14 may send a message to the source device 12 asking for access. In other examples, the stream selection unit 44 may add in the audio stream 474 without sending a message to the source device 12.

Figure 4H:
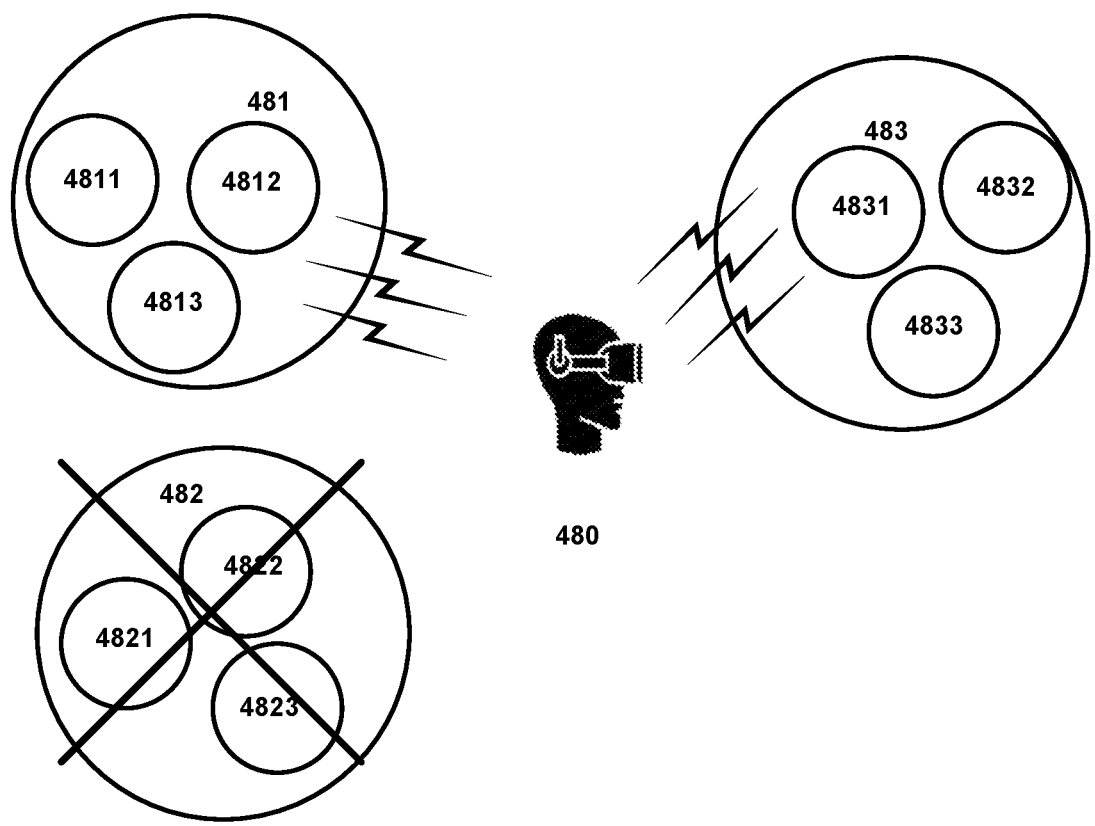
FIGS. 4H and 4I are diagrams illustrating an example of privacy zones provided in accordance with various aspects of the techniques described in this disclosure.
Figure 4I:
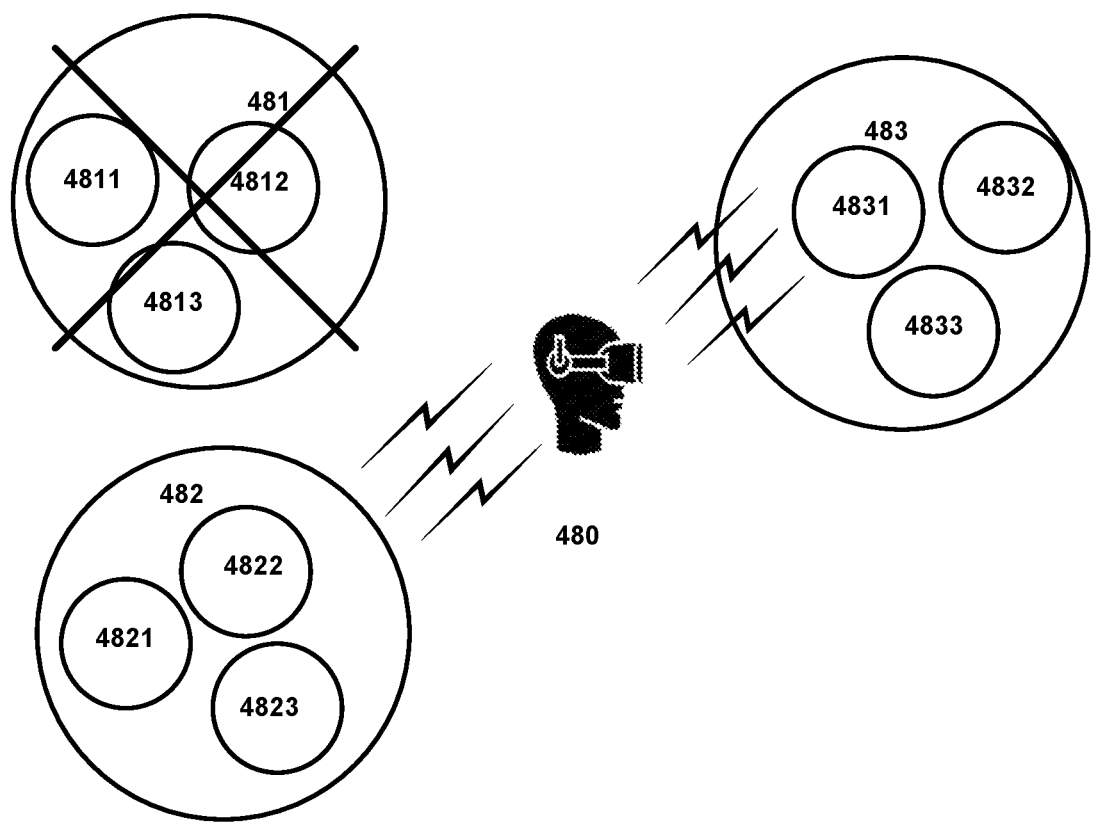

FIGS. 4H and 4I are diagrams illustrating the concept of privacy zones in accordance with various aspects of the techniques described in this disclosure. The user 480 is shown near several groups of audio elements each representing an audio stream. It may be useful to authorize which streams are used to create the audio experience of the user 480 in groups, rather than individually. For instance, in the example of the convention, multiple audio elements may be receiving the sensitive information. Therefore, privacy zones may be created.

The source device 12 or the content consumer device 14 may assign the user an authorization level (e.g., a rank), and an authorization level (e.g., a rank) for each privacy zone, respectively. The controller 444, for example, may assign gain and nulling metadata and, in this example, a rank for each privacy zone. For example, privacy zone 481 may contain audio streams 4811, 4812 and 4813. Privacy zone 482 may contain audio streams 4821, 4822 and 4823. Privacy zone 483 may contain audio streams 4831, 4832 and 4833. As shown in Table 1, the controller 444 may tag these audio streams as belonging to their respective privacy zones and may associate gain and nulling metadata with them as well. As represented in Table 1, G is gain and N is nulling or excluding. In this example, the user 480 has a rank of 2 with respect to privacy zones 481 and 483, but a rank of 3 with respect to privacy zone 482. As indicated in the table, the stream selection unit 44 would exclude or null zone 482 and it would be unavailable for rendering unless the user 480 were to override it. The resulting rendering is shown in FIG. 4H.

TABLE 1

| ZONE | TAG | METADATA | RANK |
|------|-----|----------|------|
| 461, 463 | 4611-4613, 4631-4633 | G – 20dB, N = 0 | 2 |
| 462 | 4621-4623 | G – N/A, N = 1 | 3 |

Timing information, such as timing metadata, may be used to temporarily change the rank of one or more of the privacy zones. For instance, the source device 12 may assign a duration for zone 462 that would raise the rank to a 2 for a period of time, 5 minutes for example. The stream selector unit 44 would then not exclude or null out the privacy zone 482 for that duration. In another example, source device 12 could assign a start time to privacy zone 461 of 12:00 pm GMT that would lower the rank to a 3. The stream selector unit 44 would then exclude privacy zone 461. If the stream selector unit 44 were to do both, the user would receive the audio streams from the privacy zones 462 and 463, but not 461 as shown in FIG. 4I.

Content consumer device 14 may use the timing information, such as timing metadata, and comparisons as time stamps and store them in memory as a way of maintaining a record of events for each zone.

Figure 4J:
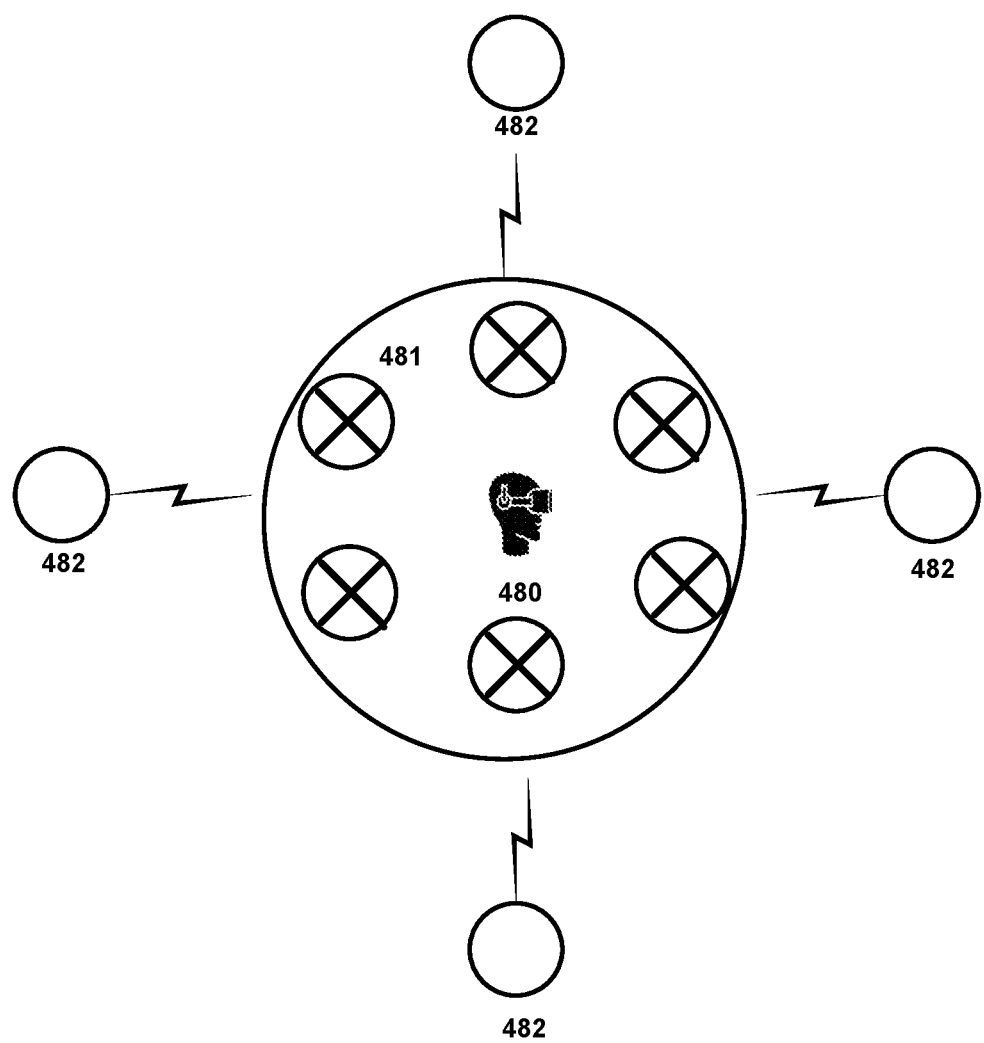
FIGS. 4J and 4K are diagrams illustrating the use of tiers of service of audio rendering in accordance with various aspects of the techniques described in this disclosure.
Figure 4K:
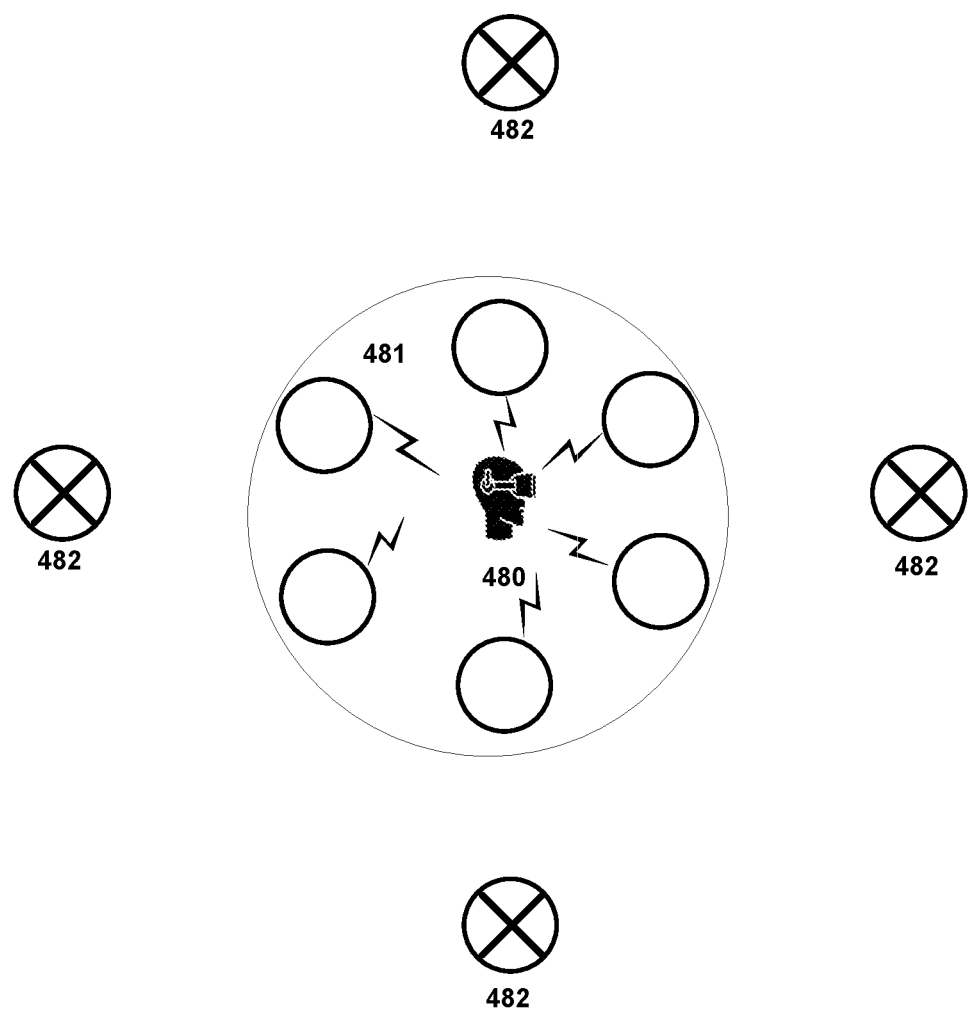

FIGS. 4J and 4K are diagrams illustrating the use of tiers of service in audio rendering according to aspects of this disclosure. A user 480 is depicted surrounded by audio elements. In this example, the audio elements in privacy zone 482 represent FOA soundfields. The audio elements inside the privacy zone 481 represent HOA or MOA soundfields. In FIG. 4J the content consumer device 14 is using FOA soundfields. In this example, certain individual streams or groups of streams may be enabled for better audio interpolation. The source device 12 may wish to make higher resolution rendering available for a temporary period of time, such as for an advertisement or a teaser for the higher resolution rendering. In another example, as discussed above with respect to FIG. 4C, the user may ask for the higher resolution rendering. The content consumer device 14 may then provide an enhanced experience as shown in FIG. 4K.

Figure 4L:
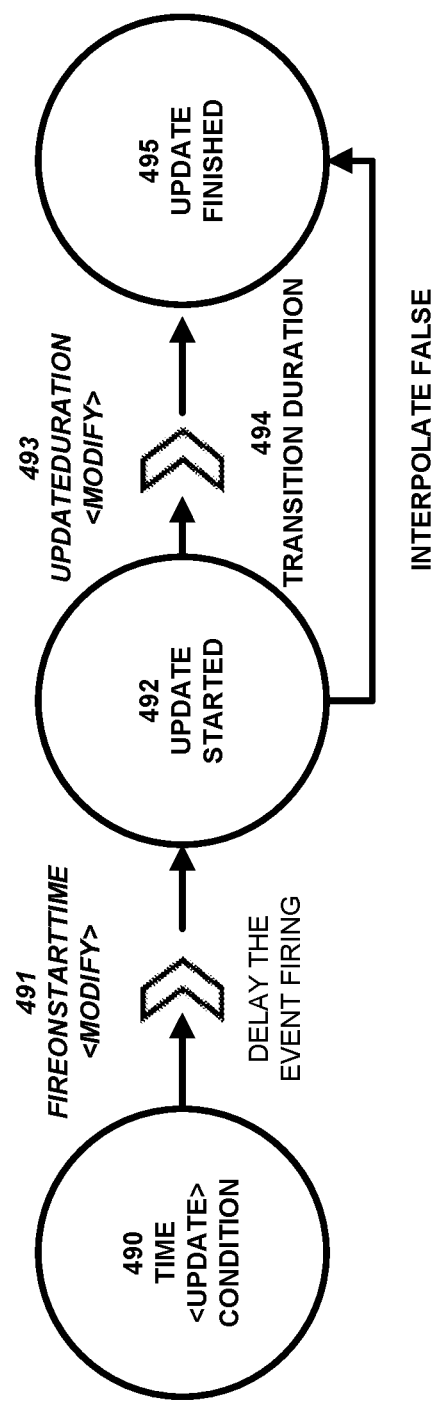
FIG. 4L is a state transition diagram illustrating state transitions in accordance with various aspects of the techniques described in this disclosure.

Another way to utilize timing information, such as timing metadata, is for node modification as part of audio scene updates for 6DOF use cases as described below. Currently, audio scene updates occur instantaneously and that is not always desirable. FIG. 4L is a state transition diagram illustrating state transitions in accordance with various aspects of the techniques described in this disclosure. In this case, the timing information is timing metadata and the timing metadata is a delay (fireOnStartTime) and a duration (updateDuration). This timing metadata may be included in the audio metadata.

It may be desirable to update the audio scene experienced by a user based upon a condition occurring, but not update it immediately upon that condition occurring. It also may be desirable to stretch out the time it takes the content consumer device 14 to make the update. As such, stream selection unit 44 may use a modifiable fireOnStartTime to delay the beginning of the update and use an updateDuration to change the time it takes to complete the update and thereby affect the selection of streams and update the audio scene in a controlled manner. The source device 12 or the content consumer device 14 may determine or modify the fireOnStartTime and/or the updateDuration.

A condition (490) may occur, such as a nearby car is started, that may make a delayed update in the audio scene desirable. The source device 12 or the content consumer device 14 may set the delay by setting the fireOnStartTime (491). The fireOnStartTime may be a time of delay or the time after the condition occurs that the audio scene update begins. The stream selection unit 44 may compare a timer to the fireOnStartTime and if the timer is equal or is greater than the fireOnStartTime begin the update of the audio scene (492). The stream selection unit 44 may update the audio scene during a transition duration (494) based upon the update duration (493) and finish the update (495) when the transition duration (494) passed. The stream selection unit 44 may modify the audio scene as discussed in Table 2 below:

TABLE 2

<Modify>
Declares a modification of modifiable parameters of a single entity. The target entity may be selected by the id attribute. Following attributes may be attributes of the corresponding entity. The attribute values may be assigned the entities property values.
Example:
<Modify id="src 1" position="1 2 3" orientation="−20 5 0" />
may ses the attributes position and orientation for the entity with ID src1

| Attribute | Type | Flags | Default | Description |
|---|---|---|---|---|
| id | ID | R | | Target entity to be modified |
| interpolate | Boolean | O | true | When true, interpolate to the new value, when false, set it immediately |
| fireOnStartTime | Value | O | none | Time after the condition is met to fire the update |
| updateDuration | Value | O | none | Duration for the update to be completed |
| * | * | * | * | Attribute of the target entity |

Figure 4M:
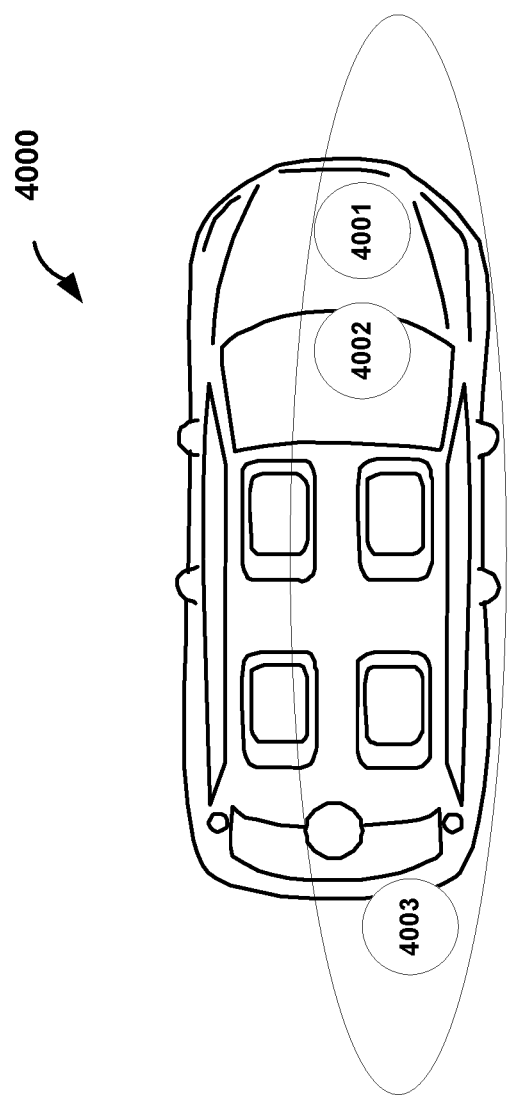
FIG. 4M is a diagram of a vehicle in accordance with various aspects of the techniques described in this disclosure.

FIG. 4M is an illustration of a vehicle 4000 in accordance with various aspects of the techniques described in this disclosure. The stream selection unit 44 may update sequentially three object sources (audio sources) of a vehicle based upon the modifiable timing parameters fireOnStartTime and updateDuration. The content consumer device 14 or the source device 12 may set or modify these parameters. In this example, the three object sources are the vehicle's 4000 engine 4001, radio 4002 and exhaust 4003. The source device 12 or the content consumer device 14 may assign each object source, engine 4001, radio 4002 and exhaust 4003, its own native trigger time (fireOnStartTime) and duration to finish transitioning (updateDuration). The stream selection unit 44 may apply a fireOnStartTime irrespective of the interpolate attribute mentioned in Table 2. The stream selection unit 44 may also treat updateDuration as an effect of the interpolate attribute. For example, if the attribute is set to "true" then the stream selection unit 44 may utilize updateDuration and make the update over the course of the updateDuration, or else the stream selection unit 44 may transition the audio scene immediately.

The following code provides an example according to various aspects of techniques described in this disclosure:

```
<!-- Define a condition for someone turning on a car when
the listener gets close. The car's audio element's were previously
inactive, for example the car is parked and turned off. -->
    <ListenerProximityCondition id="cond:listenerNearCar"
region="geo:region1"/>
        <Box id="geo:region1" position="5 0 −5"
        size="10 2 10" />
        <Update time="0.2">
            <Modify id="engine" position="2.2 1.7 −1.25" />
            <Modify id="radio" position="1.1 1.5 −0.55" />
            <Modify id="exhaust" position="2.2 1.5 −0.95" />
        </Update>
        <Update condition="cond:listenerNearCar" fireOn="true">
            <Modify id="engine" active="true" interpolate="true"
fireOnStartTime = 0.1 ,
            updateDuration = 0.05 />
        <Modify id="radio" active="true" interpolate="true"
fireOnStartTime = 0.2 ,
            updateDuration = 0.1 />
            <Modify id="exhaust" active="true"
```

```
interpolate="true" fireOnStartTime = 0.2,
        updateDuration = 0.1 />
        </Update>
    ...
```

Figure 4N:
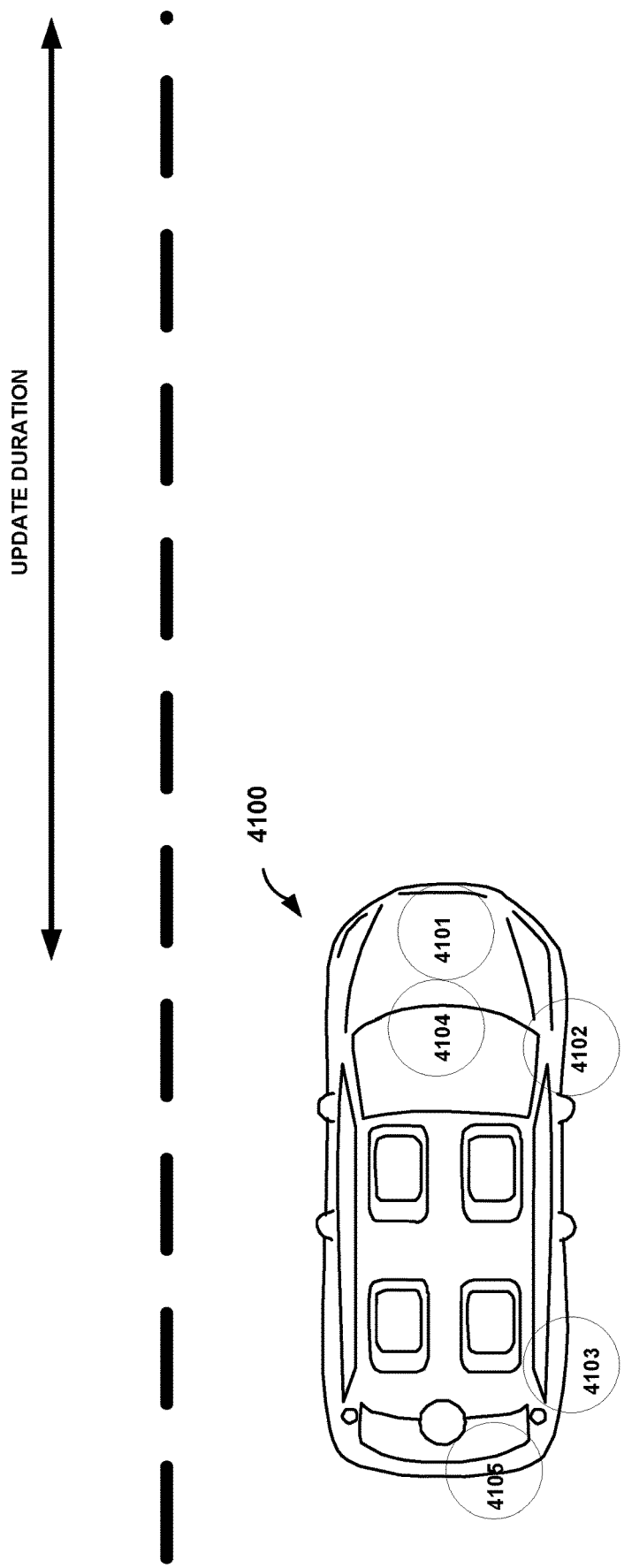
FIG. 4N is a diagram of a moving vehicle in accordance with various aspects of the techniques described in this disclosure.

FIG. 4N is an illustration of a moving vehicle 4100 in accordance with various aspects of the techniques described in this disclosure. This illustration represents a scenario where the stream selection unit 44 may update the audio scene positionally while the vehicle 4100 is navigating on a highway. In this example, there are five object sources: the engine 4101, the tire 1 4102, the tire 2 4103, the radio 4104 and the exhaust 4105. The positional update after the update duration is affected is the final position since the update time. The intermediate updates/interpolation between the update duration are applied as a part of the audio renderer and the different schemes of interpolation can be applied as a personal preference or can be situational. An example is given in the following code:

```
<!-Car moving along a highway...-->
<Update time="0.2">
    <Modify id="engine" position="2.2 1.7 –1.25" />
    <Modify id="tire1" position="2.1 0.4 0.75" />
    <Modify id="tire2" position="0.7 0.4 –0.95" />
    <Modify id="radio" position="2.0 1.7 –0.55" />
    <Modify id="exhaust" position="0.5 0.5 –0.95" />
</Update>
<Update condition="cond:listenerNearCar" fireOn="True">
    <Modify id="engine" position="32.2 31.7 –1.25"
interpolate="True", updateDuration = 30/>
    <Modify id="tire1" position="32.1 30.4 0.75"
interpolate="True"
    updateDuration = 30/>
        <Modify id="tire2" position="30.7 30.4 –0.95"
interpolate="True"
    , updateDuration = 30/>
        <Modify id="radio" position="32.0 31.7 –0.55"
interpolate="True"
    updateDuration = 30/>
        <Modify id="exhaust" position="30.5 30.5 –0.95"
interpolate="True"/>
</Update>
```

These techniques may be particularly useful in a virtual teleportation case. In such a case, an audio signal may be perceived by a user as emanating from the direction from where a virtual teleported image is located. The virtual image may be a different passenger or driver in another vehicle or other fixed environment (e.g., a school, office, or a home). The virtual image, e.g., virtual passenger may include either two-dimensional avatar data or three-dimensional avatar data. When the virtual passenger speaks, it sounds as if the virtual passenger(s) is in the location (e.g., orientation on the screen) projected on the digital display of the headset device, or digital display viewed by the camera(s) that may be coupled to the headset device. That is, the virtual passenger(s) may be coupled to a two-dimensional audio signal or three-dimensional audio signal. The two-dimensional audio signal or three-dimensional audio signal may include one or more audio objects (e.g., the person's voice) spatially located where the virtual image appears to be oriented relative to the position of the screen of the digital display on the headset device or the digital display coupled to the headset device. The loudspeakers that generate the two-dimensional or three-dimensional audio signal may be mounted and integrated into the headset device. In other embodiments, the loudspeakers may be distributed in different positions within the vehicle 4100, and the audio signal may be rendered such that the sound from the audio stream is perceived as being located where the virtual teleported image is located. In an alternate embodiment, a "teleportation" may be the sound being teleported but not the virtual image. As such, a person in a vehicle or wearing a headset device may hear a sound or voice of a person as if they are near them, e.g., next to them, in front of them, behind them, etc.

It may be useful to include a "Listener Event Trigger" in the audio metadata in virtual teleportation use cases, as the controller may control listener navigation between positions by means of a trigger. The controller could use this Listener Event Trigger to actuate teleportation.

Figure 4O:
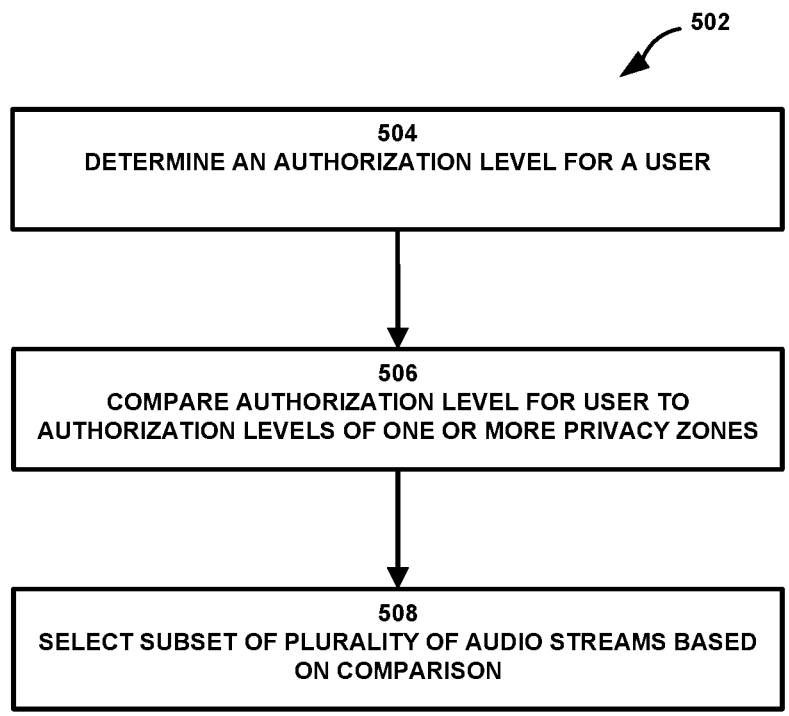
FIG. 4O is a flowchart illustrating example techniques of using authorization levels for controlling access to at least one of the plurality of audio streams based on timing information.

FIG. 4O is a flow diagram illustrating example techniques of using authorization levels for controlling access to at least one of the plurality of audio streams based on timing information. The use of authorization levels (430) is now discussed. Stream selection unit 44 may determine an authorization level for user 1102 (504). For example, user 1102 may have a rank associated with them, as discussed above with respect to FIGS. 4H and 4I. Stream selection unit 44 compare the authorization level for user 1102 to authorization levels of one or more privacy zones. For example, each privacy zone may have an associated authorization level, as discussed above with respect to FIGS. 4H and 4I. Stream selection unit 44 may select the subset of the plurality of audio streams based on the comparison. For example, stream selection unit 44 may determine that user 1102 is not authorized to access privacy zone 482 of FIG. 4H and may exclude or null zone 482. Thus, audio streams 4821, 4822 and 4823 would be excluded from the subset of the plurality of audio streams.

Figure 4P:
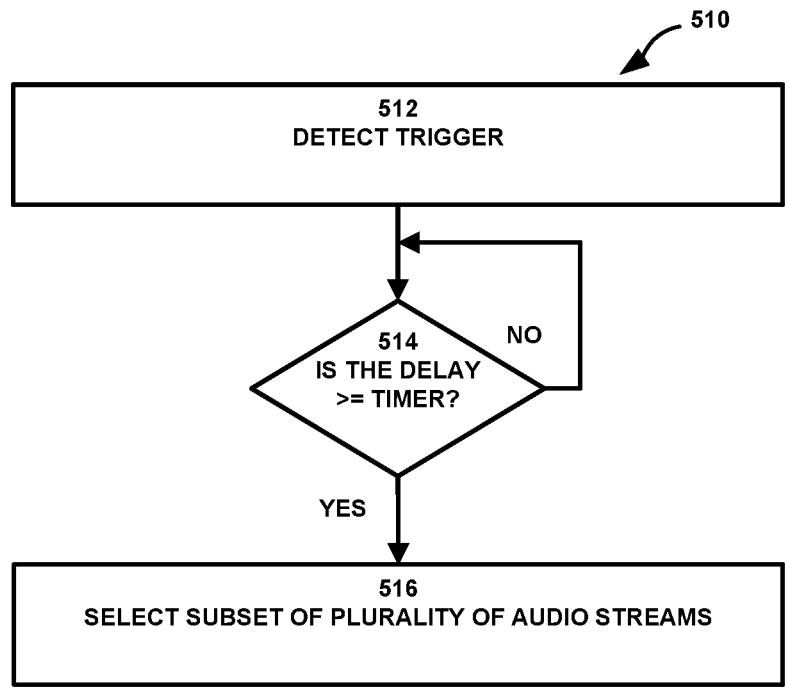
FIG. 4P is a flowchart illustrating example techniques of using a trigger and delay to control access to at least one of the plurality of audio streams based on timing information.

FIG. 4P is a flowchart illustrating example techniques of using a trigger and delay to control access to at least one of the plurality of audio streams based on timing information. The use of a trigger and delay (510) is now discussed. For example, stream selection unit 44 may detect a trigger (512). For example, stream selection unit 44 may detect a native trigger time, such as a fireOnStartTime, or a Listener Event Trigger. Stream selection unit 44 may compare the delay to a timer (514). For example, stream selection unit 44 may compare an updateDuration or other delay to the timer. If the delay is less than the timer (the "NO" path of FIG. 4P), stream selection unit 44 may continue to compare the delay to the timer. If the delay is greater than or equal to the timer, the stream selection unit may select a subset of the plurality of audio streams (516). In this manner, stream selection unit may wait until the delay is equal to or greater than the timer to select the subset of the plurality of audio streams.

Figure 5:
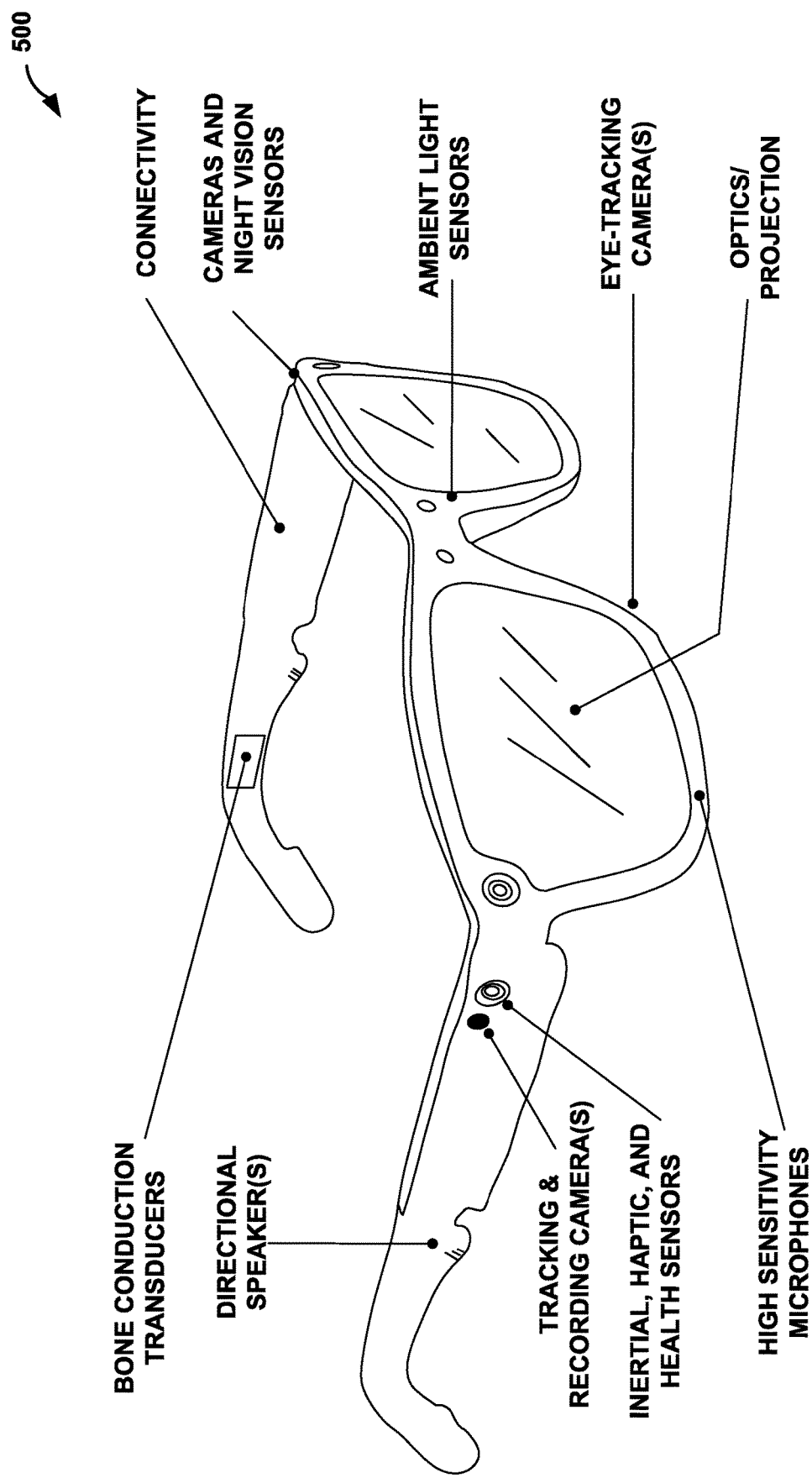
FIG. 5 is a diagram illustrating an example of a wearable device that may operate in accordance with various aspect of the techniques described in this disclosure.

FIG. 5 is a diagram illustrating an example of a wearable device 500 that may operate in accordance with various aspect of the techniques described in this disclosure. In various examples, the wearable device 500 may represent a VR headset (such as the VR device 1100 described above), an AR headset, an MR headset, or any other type of extended reality (XR) headset. Augmented Reality "AR" may refer to computer rendered image or data that is overlaid over the real world where the user is actually located. Mixed Reality "MR" may refer to computer rendered image or data that is world locked to a particular location in the real world, or may refer to a variant on VR in which part computer rendered 3D elements and part photographed real elements are combined into an immersive experience that simulates the user's physical presence in the environment. Extended Reality "XR" may represent a catchall term for VR, AR, and MR. More information regarding terminology for XR can be found in a document by Jason Peterson, entitled "Virtual Reality, Augmented Reality, and Mixed Reality Definitions," and dated Jul. 7, 2017.

The wearable device 500 may represent other types of devices, such as a watch (including so-called "smart watches"), glasses (including so-called "smart glasses"), headphones (including so-called "wireless headphones" and "smart headphones"), smart clothing, smart jewelry, and the like. Whether representative of a VR device, a watch, glasses, and/or headphones, the wearable device 500 may communicate with the computing device supporting the wearable device 500 via a wired connection or a wireless connection.

In some instances, the computing device supporting the wearable device 500 may be integrated within the wearable device 500 and as such, the wearable device 500 may be considered as the same device as the computing device supporting the wearable device 500. In other instances, the wearable device 500 may communicate with a separate computing device that may support the wearable device 500. In this respect, the term "supporting" should not be understood to require a separate dedicated device but that one or more processors configured to perform various aspects of the techniques described in this disclosure may be integrated within the wearable device 500 or integrated within a computing device separate from the wearable device 500.

For example, when the wearable device 500 represents the VR device 1100, a separate dedicated computing device (such as a personal computer including the one or more processors) may render the audio and visual content, while the wearable device 500 may determine the translational head movement upon which the dedicated computing device may render, based on the translational head movement, the audio content (as the speaker feeds) in accordance with various aspects of the techniques described in this disclosure. As another example, when the wearable device 500 represents smart glasses, the wearable device 500 may include the one or more processors that both determine the translational head movement (by interfacing within one or more sensors of the wearable device 500) and render, based on the determined translational head movement, the speaker feeds.

As shown, the wearable device 500 includes a rear camera, one or more directional speakers, one or more tracking and/or recording cameras, and may include one or more light-emitting diode (LED) lights. In some examples, the LED light(s) may be referred to as "ultra bright" LED light(s). In addition, the wearable device 500 includes one or more eye-tracking cameras, high sensitivity audio microphones, and optics/projection hardware. The optics/projection hardware of the wearable device 500 may include durable semi-transparent display technology and hardware.

The wearable device 500 also includes connectivity hardware, which may represent one or more network interfaces that support multimode connectivity, such as 4G communications, 5G communications, etc. The wearable device 500 also includes ambient light sensors, one or more cameras and night vision sensors, and one or more bone conduction transducers. In some instances, the wearable device 500 may also include one or more passive and/or active cameras with fisheye lenses and/or telephoto lenses. It will be appreciated that the wearable device 500 may exhibit a variety of different form factors.

Furthermore, the tracking and recording cameras and other sensors may facilitate the determination of translational distance. Although not shown in the example of FIG. 5, wearable device 500 may include other types of sensors for detecting translational distance.

Although described with respect to particular examples of wearable devices, such as the VR device 1100 discussed above with respect to the examples of FIG. 2 and other devices set forth in the examples of FIGS. 1A-1C, a person of ordinary skill in the art would appreciate that descriptions related to FIGS. 1A-1C, and 2 may apply to other examples of wearable devices. For example, other wearable devices, such as smart glasses, may include sensors by which to obtain translational head movements. As another example, other wearable devices, such as a smart watch, may include sensors by which to obtain translational movements. As such, the techniques described in this disclosure should not be limited to a particular type of wearable device, but any wearable device may be configured to perform the techniques described in this disclosure.

Figure 6A:
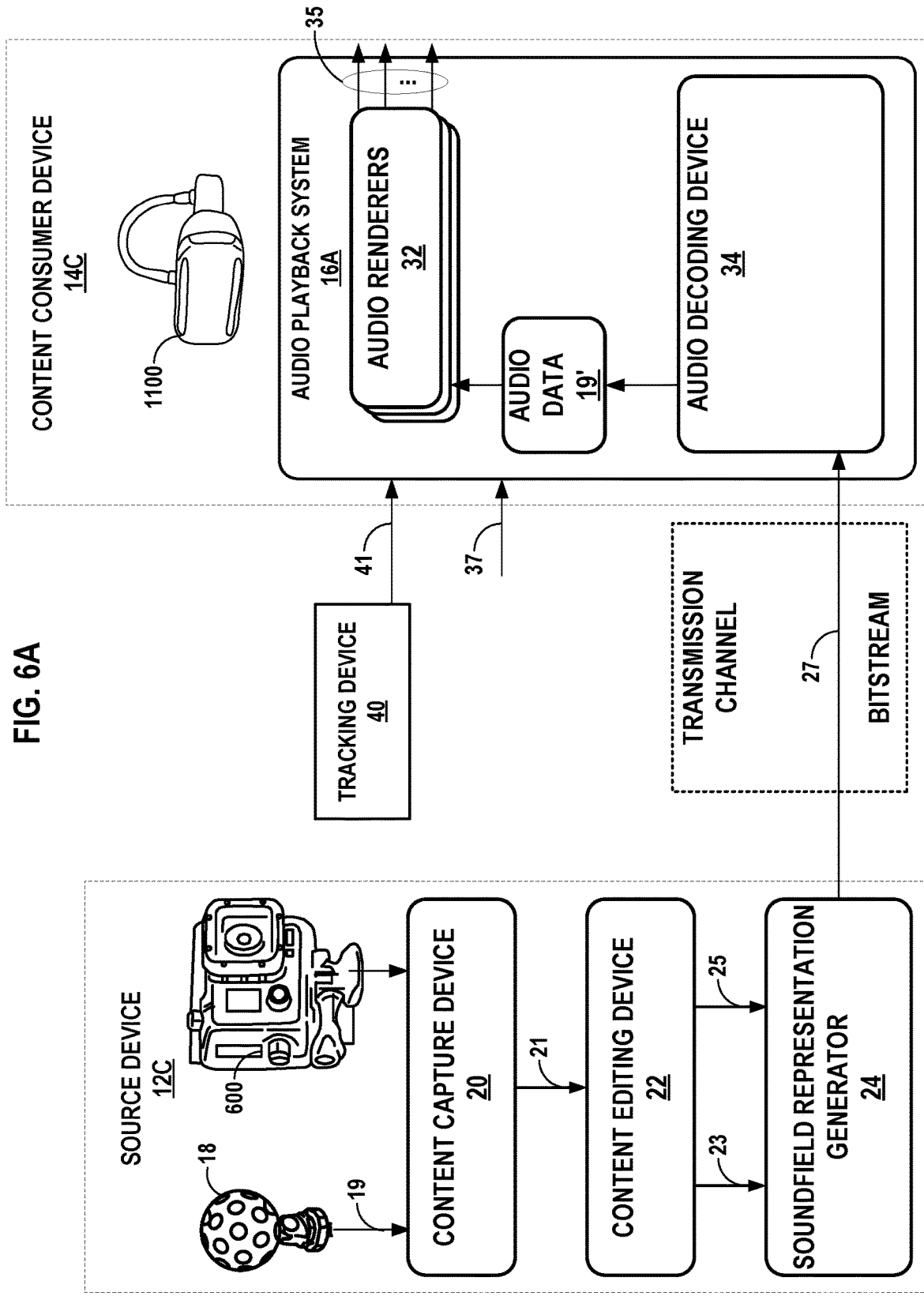
FIGS. 6A and 6B are diagrams illustrating other example systems that may perform various aspects of the techniques described in this disclosure.
Figure 6B:
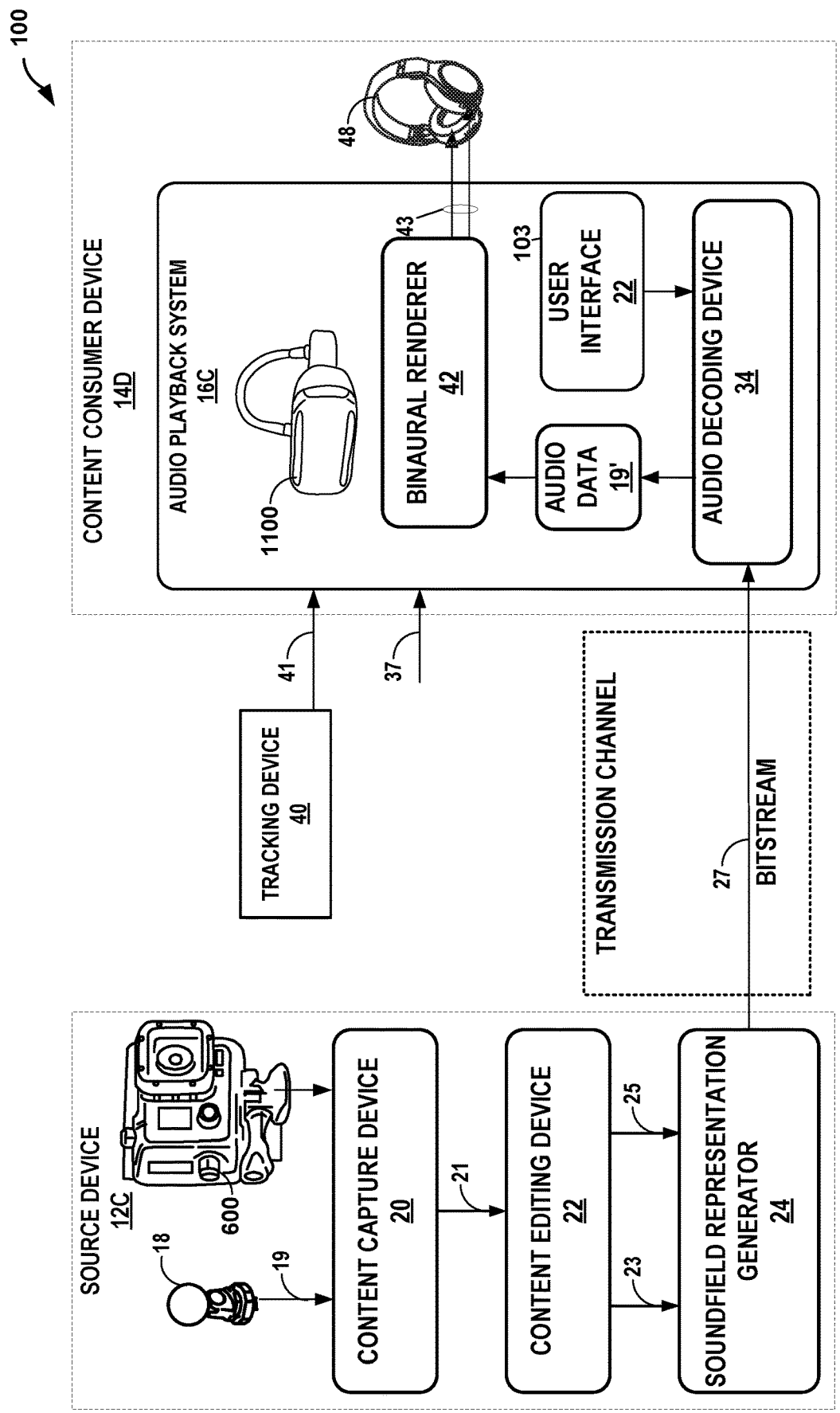

FIGS. 6A and 6B are diagrams illustrating example systems that may perform various aspects of the techniques described in this disclosure. FIG. 6A illustrates an example in which the source device 12C further includes a camera 600. The camera 600 may be configured to capture video data, and provide the captured raw video data to the content capture device 20. The content capture device 20 may provide the video data to another component of the source device 12C, for further processing into viewport-divided portions.

In the example of FIG. 6A, the content consumer device 14C also includes the VR device 1100. It will be understood that, in various implementations, the VR device 1100 may be included in, or externally coupled to, the content consumer device 14C. The VR device 1100 includes display hardware and speaker hardware for outputting video data (e.g., as associated with various viewports) and for rendering audio data.

FIG. 6B illustrates an example in which the audio renderers 32 shown in FIG. 6A are replaced with a binaural renderer 42 capable of performing binaural rendering using one or more HRTFs or the other functions capable of rendering to left and right speaker feeds 43. The audio playback system 16C of content consumer device 14D may output the left and right speaker feeds 43 to headphones 48.

The headphones 48 may couple to the audio playback system 16C via a wired connection (such as a standard 3.5 mm audio jack, a universal system bus (USB) connection, an optical audio jack, or other forms of wired connection) or wirelessly (such as by way of a Bluetooth™ connection, a wireless network connection, and the like). The headphones 48 may recreate, based on the left and right speaker feeds 43, the soundfield represented by the audio data 19'. The headphones 48 may include a left headphone speaker and a right headphone speaker which are powered (or, in other words, driven) by the corresponding left and right speaker feeds 43.

Figure 7:
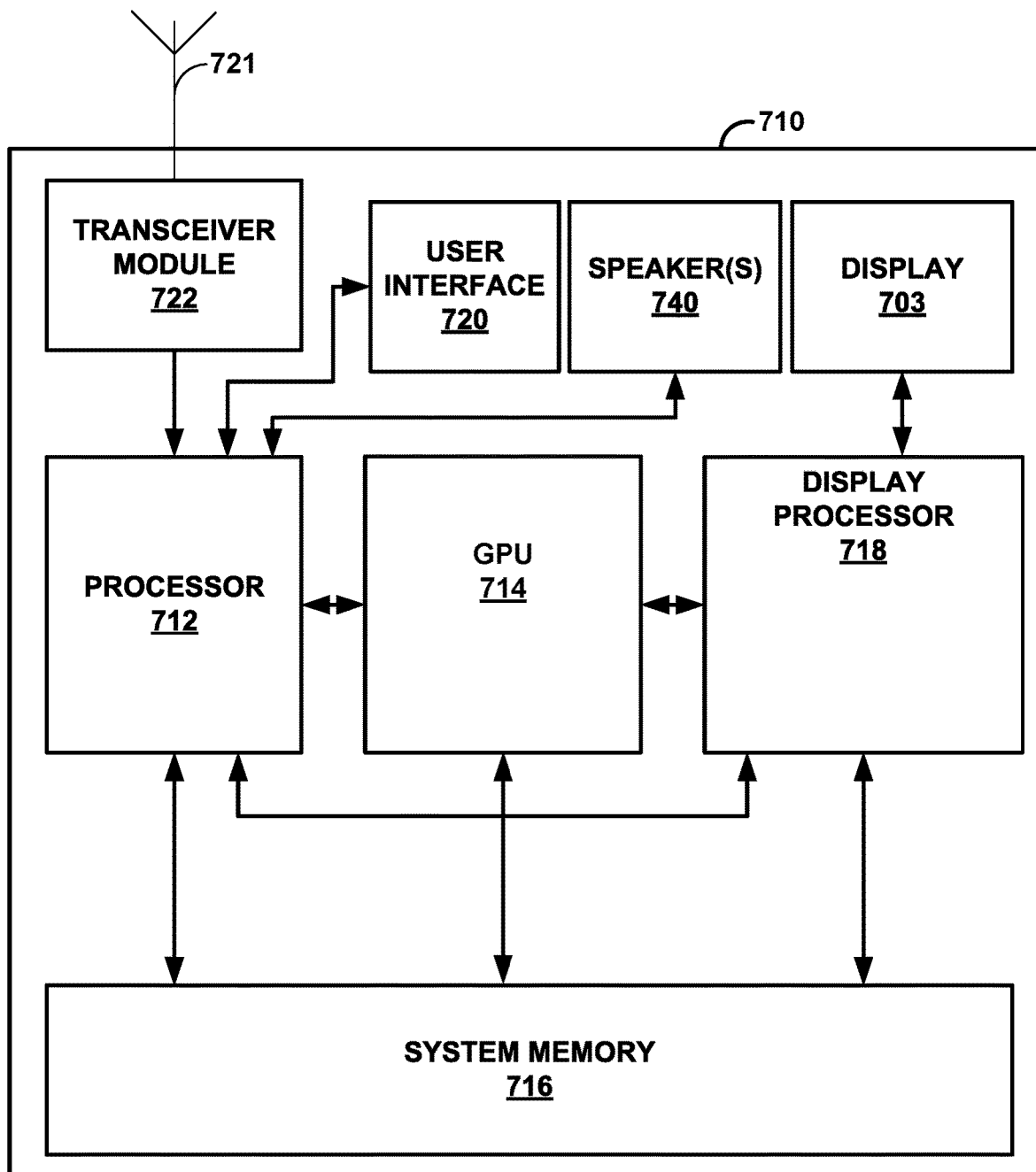
FIG. 7 is a block diagram illustrating example components of one or more of the source device and the content consumer device shown in the example of FIG. 1.

FIG. 7 is a block diagram illustrating example components of one or more of the source device 12 and the content consumer device 14 shown in the examples of FIGS. 1A-1C. In the example of FIG. 7, the device 710 includes a processor 712 (which may be referred to as "one or more processors" or "processor(s)"), a graphics processing unit (GPU) 714, system memory 716, a display processor 718, one or more integrated speakers 740, a display 703, a user interface 720, antenna 721, and a transceiver module 722. In examples where the device 710 is a mobile device, the display processor 718 is a mobile display processor (MDP). In some examples, such as examples where the device 710 is a mobile device, the processor 712, the GPU 714, and the display processor 718 may be formed as an integrated circuit (IC).

For example, the IC may be considered as a processing chip within a chip package and may be a system-on-chip (SoC). In some examples, two of the processors 712, the GPU 714, and the display processor 718 may be housed together in the same IC and the other in a different integrated circuit (e.g., different chip packages) or all three may be housed in different ICs or on the same IC. However, it may be possible that the processor 712, the GPU 714, and the display processor 718 are all housed in different integrated circuits in examples where the device 710 is a mobile device.

Examples of the processor 712, the GPU 714, and the display processor 718 include, but are not limited to, one or more digital signal processors (DSPs), general purpose microprocessors, application specific integrated circuits (ASICs), field programmable logic arrays (FPGAs), or other equivalent integrated or discrete logic circuitry. The processor 712 may be the central processing unit (CPU) of the device 710. In some examples, the GPU 714 may be specialized hardware that includes integrated and/or discrete logic circuitry that provides the GPU 714 with massive parallel processing capabilities suitable for graphics processing. In some instances, GPU 714 may also include general purpose processing capabilities, and may be referred to as a general-purpose GPU (GPGPU) when implementing general purpose processing tasks (e.g., non-graphics related tasks). The display processor 718 may also be specialized integrated circuit hardware that is designed to retrieve image content from the system memory 716, compose the image content into an image frame, and output the image frame to the display 703.

The processor 712 may execute various types of the applications. Examples of the applications include web browsers, e-mail applications, spreadsheets, video games, other applications that generate viewable objects for display, or any of the application types listed in more detail above. The system memory 716 may store instructions for execution of the applications. The execution of one of the applications on the processor 712 causes the processor 712 to produce graphics data for image content that is to be displayed and the audio data 19 that is to be played (possibly via integrated speaker 740). The processor 712 may transmit graphics data of the image content to the GPU 714 for further processing based on and instructions or commands that the processor 712 transmits to the GPU 714.

The processor 712 may communicate with the GPU 714 in accordance with a particular application processing interface (API). Examples of such APIs include the DirectX® API by Microsoft®, the OpenGL® or OpenGL ES® by the Khronos group, and the OpenCL™; however, aspects of this disclosure are not limited to the DirectX, the OpenGL, or the OpenCL APIs, and may be extended to other types of APIs. Moreover, the techniques described in this disclosure are not required to function in accordance with an API, and the processor 712 and the GPU 714 may utilize any process for communication.

The system memory 716 may be the memory for the device 710. The system memory 716 may include one or more computer-readable storage media. Examples of the system memory 716 include, but are not limited to, a random-access memory (RAM), an electrically erasable programmable read-only memory (EEPROM), flash memory, or other medium that can be used to carry or store desired program code in the form of instructions and/or data structures and that can be accessed by a computer or a processor.

In some examples, the system memory 716 may include instructions that cause the processor 712, the GPU 714, and/or the display processor 718 to perform the functions ascribed in this disclosure to the processor 712, the GPU 714, and/or the display processor 718. Accordingly, the system memory 716 may be a computer-readable storage medium having instructions stored thereon that, when executed, cause one or more processors (e.g., the processor 712, the GPU 714, and/or the display processor 718) to perform various functions.

The system memory 716 may include a non-transitory storage medium. The term "non-transitory" indicates that the storage medium is not embodied in a carrier wave or a propagated signal. However, the term "non-transitory" should not be interpreted to mean that the system memory 716 is non-movable or that its contents are static. As one example, the system memory 716 may be removed from the device 710 and moved to another device. As another example, memory, substantially similar to the system memory 716, may be inserted into the device 710. In certain examples, a non-transitory storage medium may store data that can, over time, change (e.g., in RAM).

The user interface 720 may represent one or more hardware or virtual (meaning a combination of hardware and software) user interfaces by which a user may interface with the device 710. The user interface 720 may include physical buttons, switches, toggles, lights or virtual versions thereof. The user interface 720 may also include physical or virtual keyboards, touch interfaces—such as a touchscreen, haptic feedback, and the like.

The processor 712 may include one or more hardware units (including so-called "processing cores") configured to perform all or some portion of the operations discussed above with respect to one or more of any of the modules, units or other functional components of the content creator device and/or the content consumer device. The antenna 721 and the transceiver module 722 may represent a unit configured to establish and maintain the connection between the source device 12 and the content consumer device 14. The antenna 721 and the transceiver module 722 may represent one or more receivers and/or one or more transmitters capable of wireless communication in accordance with one or more wireless communication protocols, such as a fifth generation (5G) cellular standard, a person area network (PAN) protocol, such as Bluetooth™, or other open-source, proprietary, or other communication standard. For example, the transceiver module 722 may receive and/or transmit a wireless signal. The transceiver module 722 may represent a separate transmitter, a separate receiver, both a separate transmitter and a separate receiver, or a combined transmitter and receiver. The antenna 721 and the transceiver module 722 may be configured to receive encoded audio data. Likewise, the antenna 721 and the transceiver module 722 may be configured to transmit encoded audio data.

Figure 8A:
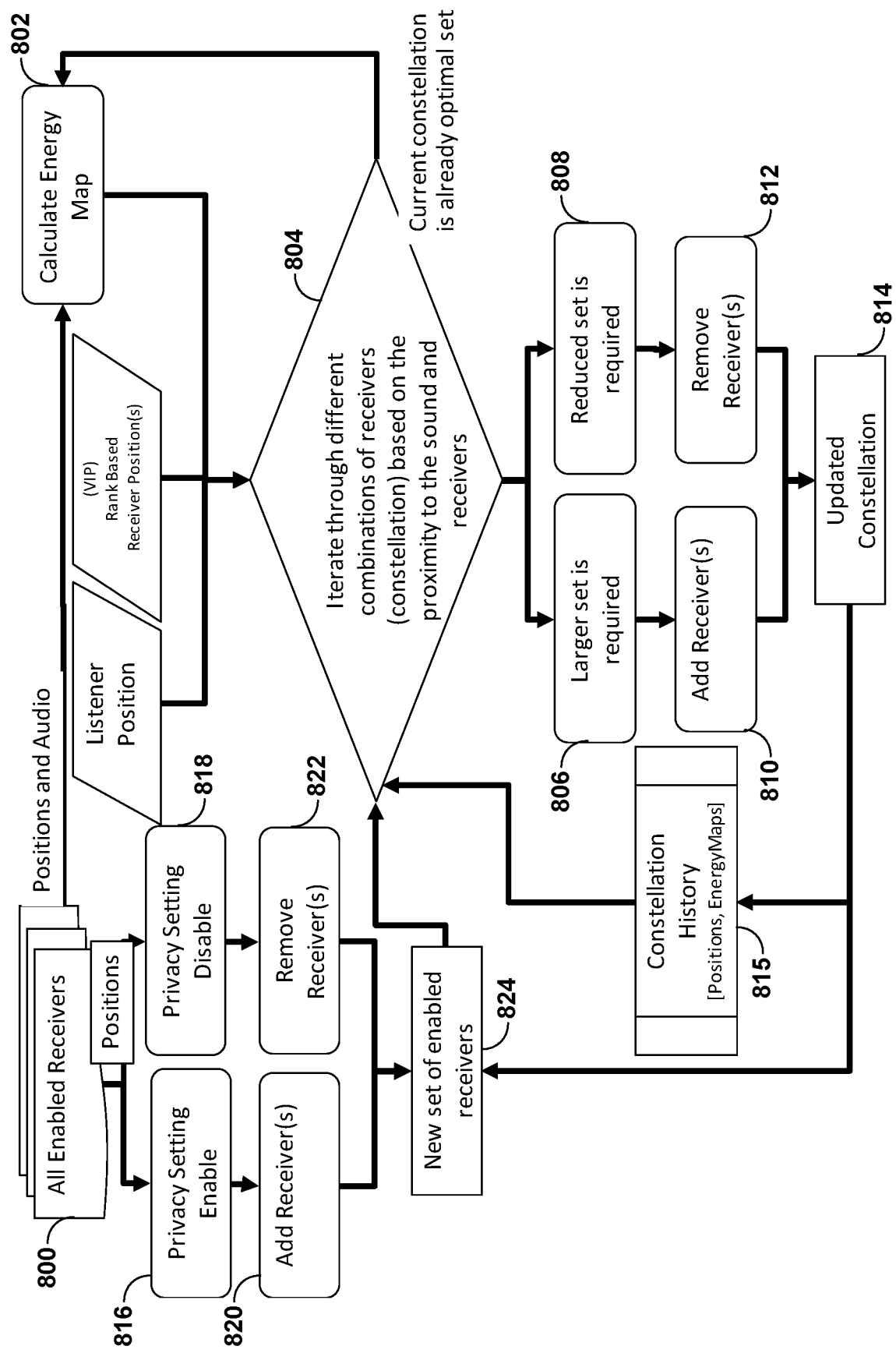
FIGS. 8A-8C are flowcharts illustrating example operation of the stream selection unit shown in the examples of FIGS. 1A-1C in performing various aspects of the stream selection techniques.
Figure 8B:
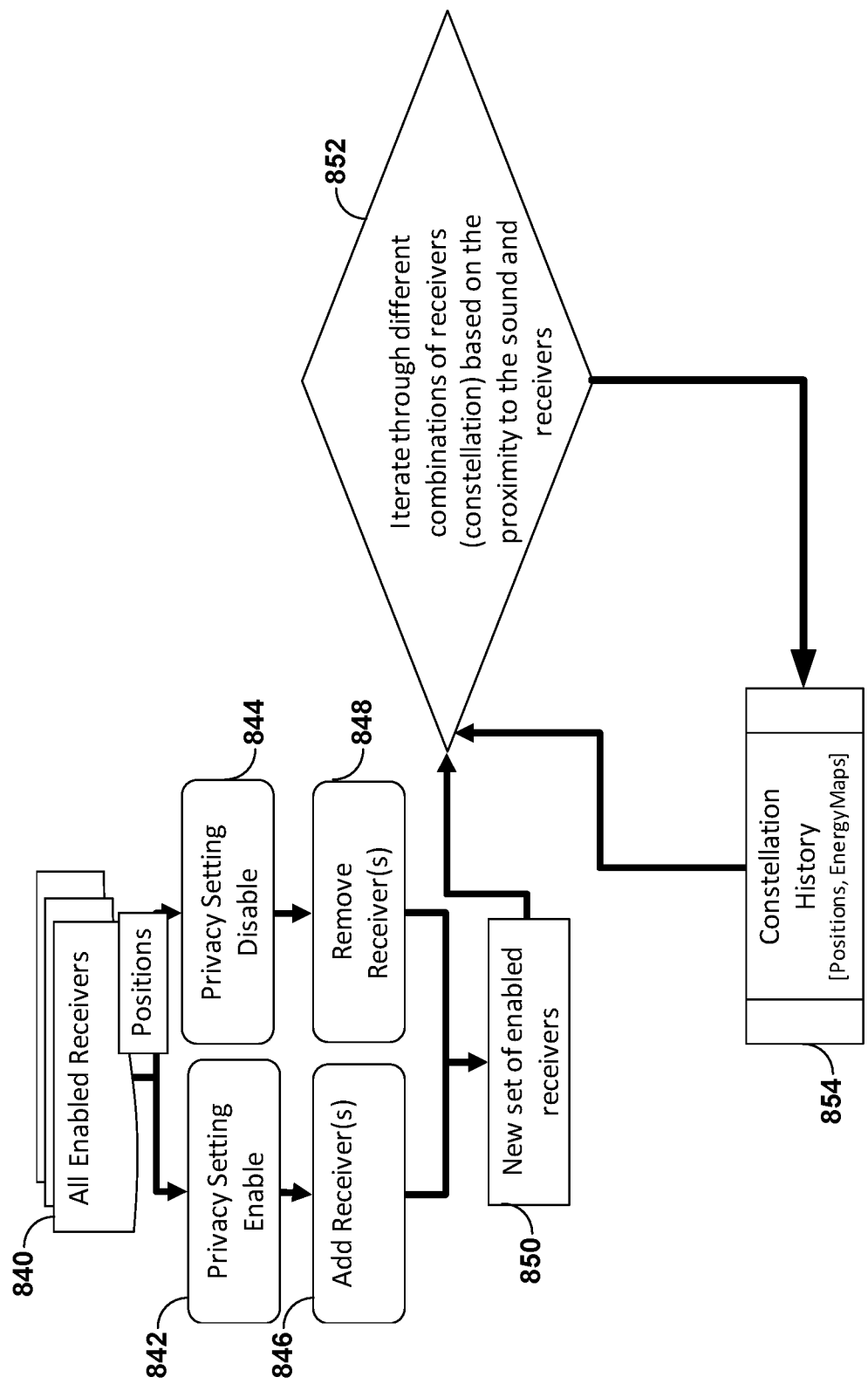
Figure 8C:
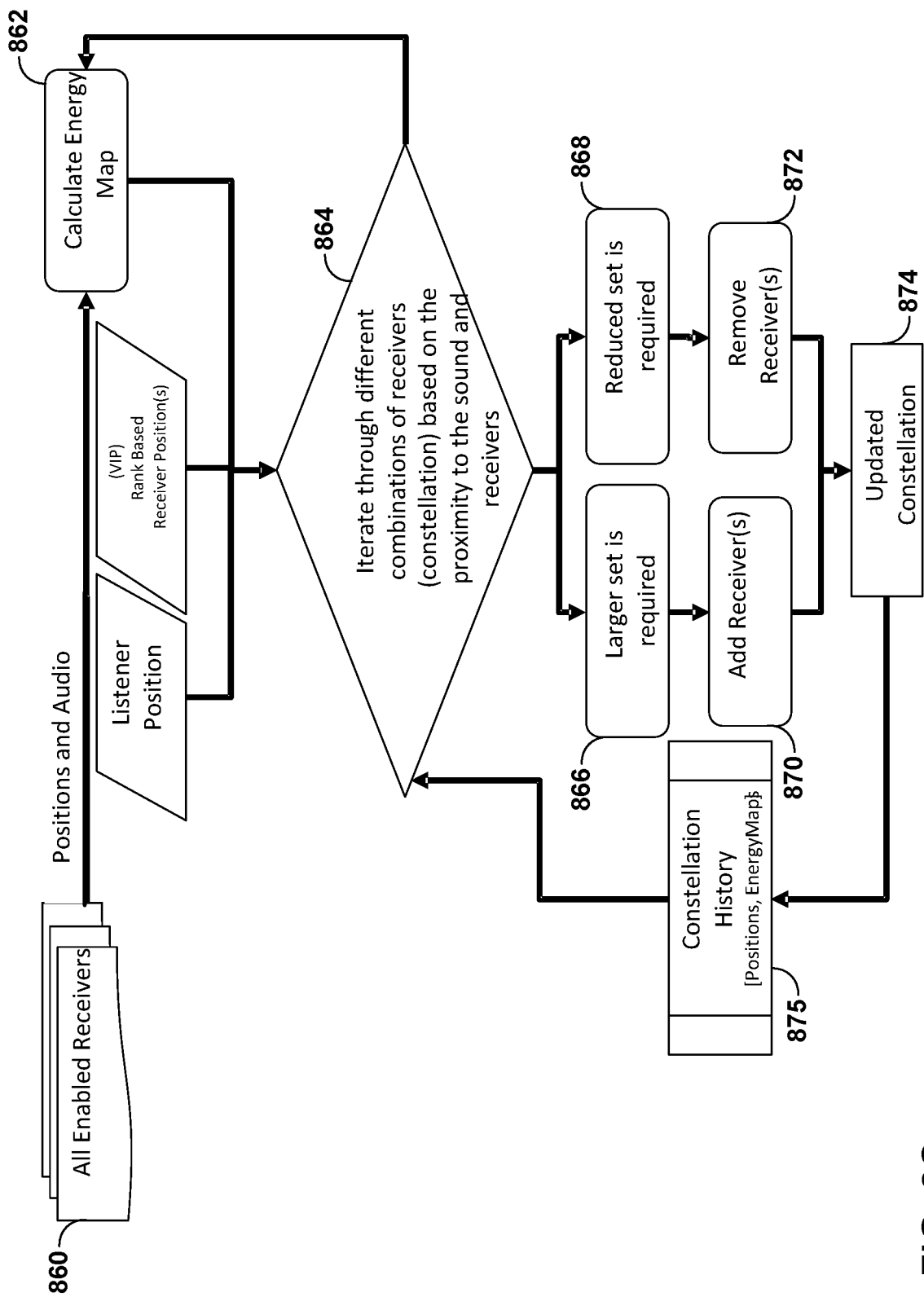

FIG. 8A-8C are flowcharts illustrating example operation of the stream selection unit 44 shown in the examples of FIGS. 1A-1C in performing various aspects of the stream selection techniques. Referring first to the example of FIG. 8A, the stream selection unit 44 may obtain audio stream 27 from all enabled audio elements, where the audio streams 27 may include corresponding audio information, e.g., metadata, such as the ALI 45A (800). The stream selection unit 44 may perform the energy analysis with respect to each of the audio streams 27 to calculate a respective energy map (802).

The stream selection unit 44 may next iterate through different combinations of the audio elements (defined in the CM 47) based on proximity to the audio source 308 (as defined by audio source distance 306A and/or 306B) and the audio elements (as defined by the proximity distances discussed above) (804). As shown in FIG. 8A, the audio elements may be ranked or otherwise associated with different access rights. The stream selection unit 44 may iterate, based on the listener position (which is another way to refer to the "virtual location" or "device location") represented by the DLI 45B, and the audio element positions represented by the ALI 45A, in the manner described above to identify whether a larger subset of the audio streams 27 or a reduced subset of the audio streams 27 is required (806, 808).

When a larger subset of the audio streams 27 is required, the stream selection unit 44 may add audio element(s), or in other words, additional audio stream(s) to the audio data 19' (such as when the user is closer to the audio source in the example of FIG. 3A) (810). When a reduced subset of the audio streams 27 is required, the stream selection unit 44 may remove audio element(s) or in other words existing audio stream(s) from the audio data 19' (such as when the user is farther from the audio source in the example of FIG. 3A) (812).

In some examples, the stream selection unit 44 may determine that the current constellation of audio elements is an optimal set (or, in other words, that the existing audio data 19' is to remain the same as the selection process described herein results in the same audio data 19') (804), and the process may return to 802. However, when audio streams are added or removed from the audio data 19', the stream selection unit 44 may update the CM 47 (814), generating a constellation history (815) (including positions, energy maps, etc.).

In addition, the stream selection unit 44 may determine whether privacy settings enable or disable addition of the audio elements (where the privacy settings may refer to digital access rights that limit access to one or more of the audio streams 27, e.g., by way of a password, an authorization level or rank, a time, etc.) (816, 818). When privacy settings enable addition of an audio element, the stream selection unit 44 may add audio element(s) to the updated CM 47 (which refers to addition of audio stream(s) to the audio data 19') (820). When privacy settings disable addition of an audio element, the stream selection unit 44 may remove audio element(s) from the updated CM 47 (which refers to removal of audio stream(s) from the audio data 19') (822). In this manner, the stream selection unit 44 may identify a new set of enabled audio elements (824).

The stream selection unit 44 may iterate in this fashion and update various inputs according to any given frequency. For example, the stream selection unit 44 may update privacy settings at a user interface rate (meaning that updates are driven by way of updates entered via the user interface). The stream selection unit 44, as another example, may update positions at sensor rate (meaning that positions are changed through movement of the audio element). The stream selection unit 44 may further update the energy maps at an audio frame rate (meaning that the energy maps are updated each frame).

Referring next to the example of FIG. 8B, the stream selection unit 44 may operate in the manner described above with respect to FIG. 8A, except that the stream selection unit 44 may not base the determination of the CM 47 on energy maps. As such, the stream selection unit 44 may obtain audio stream 27 from all enabled audio elements, where the audio streams 27 may include corresponding audio information, e.g., metadata, such as the ALI 45A (840). The stream selection unit 44 may determine whether privacy settings enable or disable addition of the audio elements (where the privacy settings may refer to digital access rights that limit access to one or more of the audio streams 27, e.g., by way of a password, an authorization level or rank, a time, etc.) (842, 844).

When privacy settings enable addition of an audio element, the stream selection unit 44 may add audio element(s) to the updated CM 47 (which refers to addition of audio stream(s) to the audio data 19') (846). When privacy settings disable addition of an audio element, the stream selection unit 44 may remove audio element(s) from the updated CM 47 (which refers to removal of audio stream(s) from the audio data 19') (848). In this manner, the stream selection unit 44 may identify a new set of enabled audio elements (850). The stream selection unit 44 may iterate (852) through the different combinations of audio elements in the CM 47 to determine the constellation history (854), which is representative of the audio data 19'.

The stream selection unit 44 may iterate in this fashion and update various inputs according to any given frequency. For example, the stream selection unit 44 may update privacy settings at a user interface rate (meaning that updates are driven by way of updates entered via the user interface). The stream selection unit 44, as another example, may update positions at sensor rate (meaning that positions are changed through movement of the audio element).

Referring next to the example of FIG. 8C, the stream selection unit 44 may operate in the manner described above with respect to FIG. 8A, except that the stream selection unit 44 may not base the determination of the CM 47 on privacy settings enabled audio elements. As such, the stream selection unit 44 may obtain audio stream 27 from all enabled audio elements, where the audio streams 27 may include corresponding audio information, e.g., metadata, such as the ALI 45A (860). The stream selection unit 44 may perform the energy analysis with respect to each of the audio streams 27 to calculate a respective energy map (862).

The stream selection unit 44 may next iterate through different combinations of the audio elements (defined in the CM 47) based on proximity to the audio source 308 (as defined by audio source distance 306A and/or 306B) and the audio elements (as defined by the proximity distances discussed above) (864). As shown in FIG. 8C, the audio elements may be ranked or otherwise associated with different access rights. The stream selection unit 44 may iterate, based on the listener position (which again is another way to refer to the "virtual location" or "device location" discussed above) represented by the DLI 45B, and the audio element positions represented by the ALI 45A, in the manner described above to identify whether a larger subset of the audio streams 27 or a reduced subset of the audio streams 27 is required (866, 868).

When a larger subset of the audio streams 27 is required, the stream selection unit 44 may add audio element(s), or in other words, additional audio stream(s) to the audio data 19' (such as when the user is closer to the audio source in the example of FIG. 3A) (870). When a reduced subset of the audio streams 27 is required, the stream selection unit 44 may remove audio element(s) or in other words existing audio stream(s) from the audio data 19' (such as when the user is farther from the audio source in the example of FIG. 3A) (872).

In some examples, the stream selection unit 44 may determine that the current constellation of audio elements is an optimal set (or, in other words, that the existing audio data 19' is to remain the same as the selection process described herein results in the same audio data 19') (864), and the process may return to 862. However, when audio streams are added or removed from the audio data 19', the stream selection unit 44 may update the CM 47 (874), generating a constellation history (875).

The stream selection unit 44 may iterate in this fashion and update various inputs according to any given frequency. For example, the stream selection unit 44, may update positions at sensor rate (meaning that as positions are changed through movement of the audio element). The stream selection unit 44 may further update the energy maps at an audio frame rate (meaning that the energy maps are updated each frame).

Figure 9:
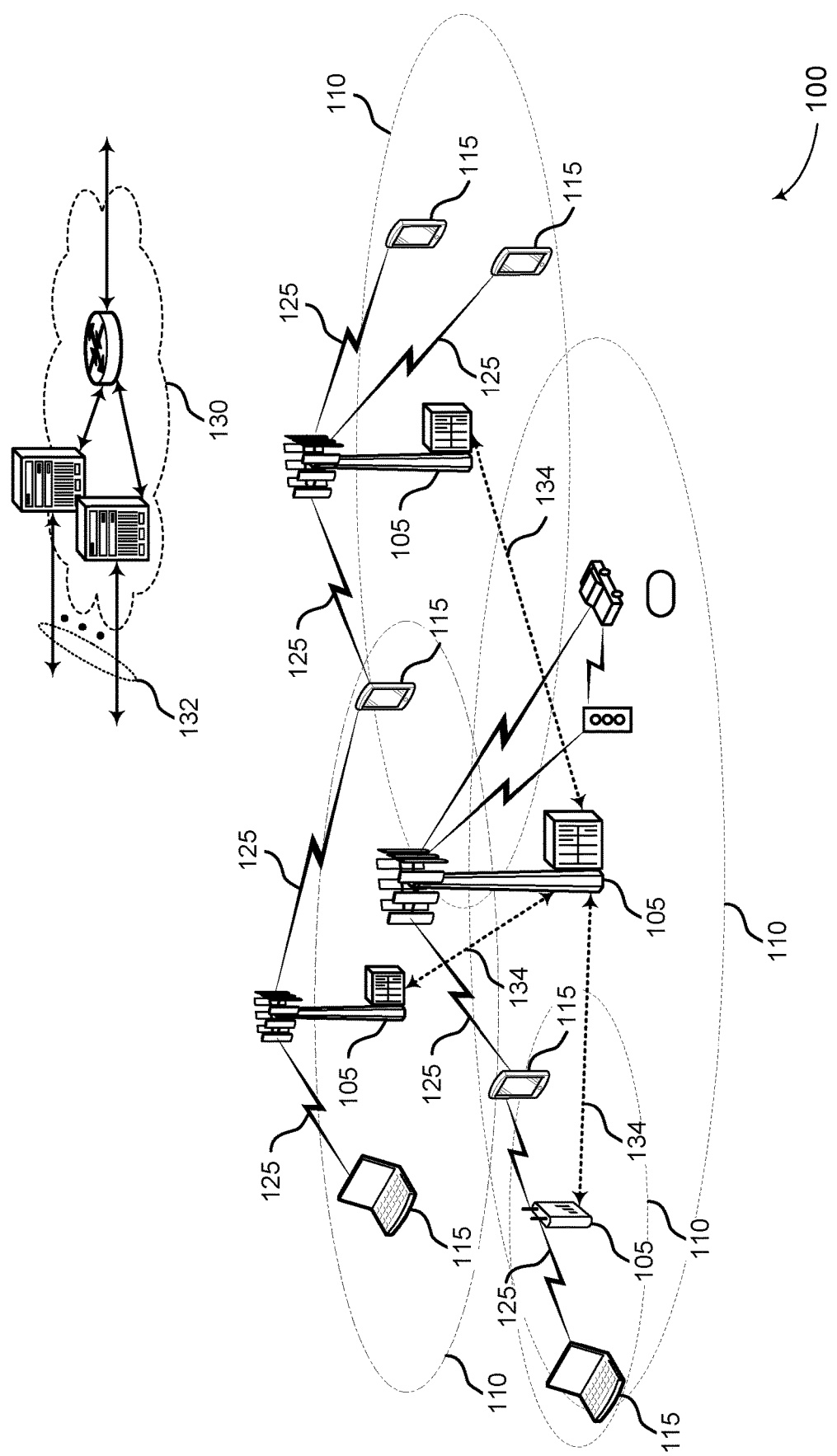
FIG. 9 is a conceptual diagram illustrating an example of a wireless communications system in accordance with aspects of the present disclosure.

FIG. 9 illustrates an example of a wireless communications system 100 in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, a $5^{th}$ generation cellular network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 are supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro, $5^{th}$ generation, or NR network in which different types of base stations 105 provide coverage for various geographic coverage areas 110.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In examples of this disclosure, a UE 115 may be any of the audio sources described in this disclosure, including a VR headset, an XR headset, an AR headset, a vehicle, a smartphone, a microphone, an array of microphones, or any other device including a microphone or is able to transmit a captured and/or synthesized audio stream. In some examples, a synthesized audio stream may be an audio stream that that was stored in memory or was previously created or synthesized. In some examples, a UE 115 may also refer to a wireless local loop (WLL) station, an Internet of Things (IoT) device, an Internet of Everything (IoE) device, or a machine-type communication (MTC) device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that exchange and/or use audio metadata that may include timing metadata used to affect audio streams and/or audio sources.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz Industrial, Scientific, Medical (ISM) band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

According to the techniques of this disclosure, individual audio streams may be restricted from rendering or may be rendered on a temporary basis based on timing information, such as a time or a duration. Certain individual audio streams or clusters of audio streams may be enabled or disabled for a fixed duration for better audio interpolation. Accordingly, the techniques of this disclosure provide for a flexible manner of controlling access to audio streams based on time.

It should be noted that the methods described herein describe possible implementations, and that the operations and the steps may be rearranged or otherwise modified and that other implementations are possible. Further, aspects from two or more of the methods may be combined.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In some examples, the VR device (or the streaming device) may communicate, using a network interface coupled to a memory of the VR/streaming device, exchange messages to an external device, where the exchange messages are associated with the multiple available representations of the soundfield. In some examples, the VR device may receive, using an antenna coupled to the network interface, wireless signals including data packets, audio packets, video pacts, or transport protocol data associated with the multiple available representations of the soundfield. In some examples, one or more microphone arrays may capture the soundfield.

In some examples, the multiple available representations of the soundfield stored to the memory device may include a plurality of object-based representations of the soundfield, higher order ambisonic representations of the soundfield, mixed order ambisonic representations of the soundfield, a combination of object-based representations of the soundfield with higher order ambisonic representations of the soundfield, a combination of object-based representations of the soundfield with mixed order ambisonic representations of the soundfield, or a combination of mixed order representations of the soundfield with higher order ambisonic representations of the soundfield.

In some examples, one or more of the soundfield representations of the multiple available representations of the soundfield may include at least one high-resolution region and at least one lower-resolution region, and wherein the selected presentation based on the steering angle provides a greater spatial precision with respect to the at least one high-resolution region and a lesser spatial precision with respect to the lower-resolution region.

This disclosure includes the following examples.

Example 1. A device configured to play one or more of a plurality of audio streams comprising: a memory configured to store timing metadata, the plurality of audio streams and corresponding audio metadata, and location information associated with coordinates of an acoustical space in which the corresponding one of the plurality of audio streams was captured; and one or more processors coupled to the memory, and configured to: select, based on the timing metadata and the location information, a subset of the plurality of audio streams, the subset of the plurality of audio streams excluding at least one of the plurality of audio streams.

Example 2. The device of example 1, wherein the one or more processors are further configured to obtain the location information.

Example 3. The device of example 2, wherein excluded streams are associated with one or more privacy zones and the one or more processors obtain the location information by determining the location information.

Example 4. The device of example 2, wherein the one or more processors obtain the location information by reading the location information from the memory.

Example 5. The device of any combination of examples 1-4, wherein the one or more processors are further configured to combine at least two of the subset of the plurality of audio streams.

Example 6. The device of example 5, wherein the one or more processors combine the at least two of the subset of the plurality of audio streams by at least one of mixing or interpolation.

Example 7. The device of any combination of examples 1-6, wherein the one or more processors are further configured to change a gain of one or more of the subset of the plurality of audio streams.

Example 8. The device of any combination of examples 1-7, wherein the timing metadata comprises a start time of when at least one of the plurality of audio streams includes audio content.

Example 9. The device of example 8, wherein the one or more processors are configured to: compare the start time to a current time; and select, when the start time is equal to or greater than the current time, the subset of the plurality of audio streams.

Example 10. The device of any combination of examples 1-9, wherein the timing metadata comprises a duration of at least one of the plurality of audio streams.

Example 11. The device of example 10, wherein the one or more processors are configured to: compare the duration to a timer; and select, when the duration is equal or greater than the timer, the subset of the plurality of audio streams.

Example 12. The device of example 10, wherein the one or more processors are further configured to: select, based on the location information, a second subset of the plurality of audio streams, the second subset of the plurality of audio streams excluding at least one of the plurality of audio streams; and interpolate between the subset of the plurality of audio streams and the second subset of the plurality of audio streams through the duration.

Example 13. The device of any combination of examples 1-12, wherein the one or more processors are further configured to: obtain from a user a request to select the subset of the plurality of audio streams; and based upon the user request, the location information, and the timing metadata, select the subset of the plurality of audio streams.

Example 14. The device of any combination of examples 1-13, wherein the timing metadata is received from a source device.

Example 15. The device of example 1-13, wherein the one or more processors are further configured to generate the timing metadata.

Example 16. The device of example 1-15, wherein the one or more processors are configured to: obtain from a user a request for one of a plurality of ambisonic soundfield types; and reproduce corresponding soundfields, based on the request for the one of a plurality of ambisonic soundfield types, and the plurality of audio streams or the subset of the plurality of audio streams, Example 17. The device of example 16, wherein the plurality of ambisonic soundfield types comprises at least two of first order ambisonic soundfield (FOA), higher order ambisonic soundfield (HOA), and mixed order ambisonic soundfield (MOA).

Example 18. The device of any combination of examples 1-17, further comprising a display device.

Example 19. The device of example 18, further comprising a microphone, wherein the one or more processors are further configured to receive a voice command from the microphone and control the display device based on the voice command.

Example 20. The device of any combination of examples 1-19, further comprising one or more speakers.

Example 21. The device of any combination of examples 1-20, wherein the device comprises an extended reality headset, and wherein the acoustical space comprises a scene represented by video data captured by a camera.

Example 22. The device of any combination of example 1-20, wherein the device comprises an extended reality headset, and wherein the acoustical space comprises a virtual world.

Example 23. The device of any combination of examples 1-22, further comprising a head-mounted display configured to present the acoustical space.

Example 24. The device of any combination of examples 1-20, wherein the device comprises a mobile handset.

Example 25. The device of any combination of examples 1-24, further comprising a wireless transceiver, the wireless transceiver being coupled to the one or more processors and being configured to receive a wireless signal.

Example 26. The device of example 25, wherein the wireless signal is Bluetooth.

Example 27. The device of example 25, wherein the wireless signal is 5G.

Example 28. The device of any combination of examples 1-27, wherein the device comprises a vehicle.

Example 29. The device of any combination of examples 1-25, wherein the timing metadata comprises a delay and wherein the one or more processors are further configured to: detect a trigger; compare the delay to a timer; and wait until the delay is equal or greater than the timer to select the subset of the plurality of audio streams.

Example 30. A method of playing one or more of a plurality of audio streams comprising: storing, by a memory, timing metadata, the plurality of audio streams and corresponding audio metadata, and location information associated with coordinates of an acoustical space in which the corresponding one of the plurality of audio streams was captured; and selecting, by the one or more processors and based on the timing metadata and the location information, a subset of the plurality of audio streams, the subset of the plurality of audio streams excluding at least one of the plurality of audio streams.

Example 31. The method of example 30, further comprising obtaining, by the one or more processors, the location information.

Example 32. The method of example 31, wherein excluded streams are associated with one or more privacy zones and the obtaining the location information is by determining the location information.

Example 33. The method of example 31, wherein the obtaining the location information is by reading the location information from the memory.

Example 34. The method of any combination of examples 31-33, further comprising combining, by the one or more processors, at least two of the subset of the plurality of audio streams.

Example 35. The method of example 34, wherein the combining the at least two of the subset of the plurality of audio streams is by at least one of mixing or interpolation.

Example 36. The method of any combination of examples 30-35, further comprising changing, by the one or more processors, a gain of one or more of the subset of the plurality of audio streams.

Example 37. The method of any combination of examples 30-36, wherein the timing metadata comprises a start time of when at least one of the plurality of audio streams includes audio content.

Example 38. The method of example 37, further comprising: comparing, by the one or more processors, the start time to a current time; and selecting, by the one or more processors, when the start time is equal to or greater than the current time, the subset of the plurality of audio streams.

Example 39. The method of any combination of examples 30-38, wherein the timing metadata comprises a duration of at least one of the plurality of audio streams.

Example 40. The method of example 39, further comprising: comparing, by the one or more processors, the duration to a timer; and selecting, by the one or more processors, when the duration is equal or greater than the timer, the subset of the plurality of audio streams.

Example 41. The method of example 39, further comprising: selecting, by the one or more processors, based on the location information, a second subset of the plurality of audio streams, the second subset of the plurality of audio streams excluding at least one of the plurality of audio streams; and interpolating, by the one or more processors, between the subset of the plurality of audio streams and the second subset of the plurality of audio streams through the duration.

Example 42. The method of any combination of examples 30-41, further comprising: obtaining from a user a request to select the subset of the plurality of audio streams; and based upon the user request, the location information, and the timing metadata, selecting, by the one or more processors, the subset of the plurality of audio streams.

Example 43. The method of any combination of examples 30-42, wherein the timing metadata is received from a source device.

Example 44. The method of any combination of examples 30-42, further comprising generating, by the one or more processors, the timing metadata.

Example 45. The method of any combination of examples 30-44, further comprising: obtaining from a user a request for one of a plurality of ambisonic soundfield types; and reproducing, by the one or more processors, corresponding soundfields based on the request for the one of a plurality of ambisonic soundfield types, and the plurality of audio streams or the subset of the plurality of audio streams.

Example 46. The method of example 45, wherein the plurality of ambisonic soundfield types comprises at least two of first order ambisonic soundfield (FOA), higher order ambisonic soundfield (HOA), and mixed order ambisonic soundfield (MOA).

Example 47. The method of any combination of examples 30-46, further comprising a microphone, receiving a voice command and controlling, by the one or more processors, a display device based on the voice command.

Example 48. The method of any combination of examples 30-47, further comprising outputting the subset of the plurality of audio streams to one or more speakers.

Example 49. The method of any combination of examples 30-48, wherein the acoustical space comprises a scene represented by video data captured by a camera.

Example 50. The method of any combination of examples 30-48, wherein the acoustical space comprises a virtual world.

Example 51. The method of any combination of examples 30-50, further comprising presenting, by the one or more processors, the acoustical space on a head-mounted device.

Example 52. The method of any combination of examples 30-51, further comprising presenting, by the one or more processors, the acoustical space on a mobile handset.

Example 53. The method of any combination of examples 30-52, further comprising receiving a wireless signal.

Example 54. The method of example 53, wherein the wireless signal is Bluetooth.

Example 55. The method of example 53, wherein the wireless signal is 5G.

Example 56. The method of any combination of examples 30-55, further comprising presenting, by the one or more processors, the acoustical space in a vehicle.

Example 57. The method of any combination of examples 30-56, wherein the timing metadata comprises a delay and wherein the method further comprises: detecting, by the one or more processors, a trigger; comparing, by the one or more processors, the delay to a timer; and waiting until the delay is equal or greater than the timer to select the subset of the plurality of audio streams.

Example 58. A device configured to play one or more of a plurality of audio streams, the device comprising: means for storing timing metadata, the plurality of audio streams and corresponding audio metadata, and location information associated with coordinates of an acoustical space in which the corresponding one of the plurality of audio streams was captured; and means for selecting, based on the timing metadata and the location information, a subset of the plurality of audio streams, the subset of the plurality of audio streams excluding at least one of the plurality of audio streams.

Example 59. The device of example 58, further comprising means for obtaining the location information.

Example 60. The device of example 59, wherein excluded streams are associated with one or more privacy zones and the obtaining the location information is by determining the location information.

Example 61. The device of example 59, wherein the obtaining the location information is by reading the location information from the memory.

Example 62. The device of any combination of examples 58-60, further comprising means for combining at least two of the subset of the plurality of audio streams.

Example 63. The device of example 62, wherein the combining the at least two of the subset of the plurality of audio streams is by at least one of mixing or interpolation.

Example 64. The device of any combination of examples 58-63, further comprising means for changing a gain of one or more of the subset of the plurality of audio streams.

Example 65. The device of any combination of examples 58-64, wherein the timing metadata comprises a start time of when at least one of the plurality of audio streams includes audio content.

Example 66. The device of example 65, further comprising: means for comparing the start time to a current time; and means for selecting when the start time is equal to or greater than the current time, the subset of the plurality of audio streams.

Example 67. The device of any combination of examples 58-66, wherein the timing metadata comprises a duration of at least one of the plurality of audio streams.

Example 68. The device of example 67, further comprising: means for comparing the duration to a timer; and means for selecting when the duration is equal or greater than the timer, the subset of the plurality of audio streams.

Example 69. The device of example 67, further comprising: means for selecting, based on the location information, a second subset of the plurality of audio streams, the second subset of the plurality of audio streams excluding at least one of the plurality of audio streams; and means for interpolating between the subset of the plurality of audio streams and the second subset of the plurality of audio streams through the duration.

Example 70. The device of any combination of examples 58-69, further comprising: means for obtaining from a user a request to select the subset of the plurality of audio streams; and means for selecting, based upon the user request, the location information, and the timing metadata, the subset of the plurality of audio streams.

Example 71. The device of any combination of examples 58-70, wherein the timing metadata is received from a source device.

Example 72. The device of any combination of examples 58-70, further comprising means for generating the timing metadata.

Example 73. The device of any combination of examples 58-72, further comprising: means for obtaining from a user a request for one of a plurality of ambisonic soundfield types; and means for reproducing corresponding soundfields, based on the request for the one of a plurality of ambisonic soundfield types, and the plurality of audio streams or the subset of the plurality of audio streams.

Example 74. The device of example 73, wherein the plurality of ambisonic soundfield types comprises at least two of first order ambisonic soundfield (FOA), higher order ambisonic soundfield (HOA), and mixed order ambisonic soundfield (MOA).

Example 75. The device of any combination of examples 58-74, further comprising means for receiving a voice command and means for controlling a display device based on the voice command.

Example 76. The device of any combination of examples 58-75, further comprising means for outputting the subset of the plurality of audio streams to one or more speakers.

Example 77. The device of any combination of examples 58-76, wherein the acoustical space comprises a scene represented by video data captured by a camera.

Example 78. The device of any combination of examples 58-76, wherein the acoustical space comprises a virtual world.

Example 79. The device of any combination of examples 58-78, further comprising means for presenting the acoustical space on a head-mounted device.

Example 80. The device of any combination of examples 58-78, further comprising means for presenting the acoustical space on a mobile handset.

Example 81. The device of any combination of examples 58-80, further comprising means for receiving a wireless signal.

Example 82. The device of example 81, wherein the wireless signal is Bluetooth.

Example 83. The device of example 81, wherein the wireless signal is 5G.

Example 84. The device of any combination of examples 58-83, further comprising means for presenting the acoustical space in a vehicle.

Example 85. The device of any combination of examples 58-84, wherein the timing metadata comprises a delay and wherein the device further comprises: means for detecting a trigger; means for comparing the delay to a timer; and means for waiting until the delay is equal or greater than the timer to select the subset of the plurality of audio streams.

Example 86. A non-transitory computer-readable storage medium having stored thereon instructions that, when executed, cause one or more processors to: store timing metadata, the plurality of audio streams and corresponding audio metadata, and location information associated with coordinates of an acoustical space in which the corresponding one of the plurality of audio streams was captured; and select, based on the timing metadata and the location information, a subset of the plurality of audio streams, the subset of the plurality of audio streams excluding at least one of the plurality of audio streams.

Example 87. The non-transitory computer-readable storage medium of example 86, further comprising instructions that, when executed, cause one or more processors to obtain the location information.

Example 88. The non-transitory computer-readable storage medium of example 87, wherein excluded streams are associated with one or more privacy zones and the one or more processors obtain the location information by determining the location information.

Example 89. The non-transitory computer-readable storage medium of example 87, wherein the one or more processors obtain the location information by reading the location information from the memory.

Example 90. The non-transitory computer-readable storage medium of any combination of examples 86-89, further comprising instructions that, when executed, cause one or more processors to combine at least two of the subset of the plurality of audio streams.

Example 91. The non-transitory computer-readable storage medium of example 90, wherein the combining the at least two of the subset of the plurality of audio streams is by at least one of mixing or interpolation.

Example 92. The non-transitory computer-readable storage medium of any combination of examples 86-91, further comprising instructions that, when executed, cause one or more processors to change a gain of one or more of the subset of the plurality of audio streams.

Example 93. The non-transitory computer-readable storage medium of any combination of examples 86-92, wherein the timing metadata comprises a start time of when at least one of the plurality of audio streams includes audio content.

Example 94. The non-transitory computer-readable storage medium of example 93, further comprising instructions that, when executed, cause one or more processors to: compare the start time to a current time; and select, when the start time is equal to or greater than the current time, the subset of the plurality of audio streams.

Example 95. The non-transitory computer-readable storage medium of any combination of examples 86-94, wherein the timing metadata comprises a duration of at least one of the plurality of audio streams.

Example 96. The non-transitory computer-readable storage medium of example 95, further comprising instructions that, when executed, cause one or more processors to: compare the duration to a timer; and select, when the duration is equal or greater than the timer, the subset of the plurality of audio streams.

Example 97. The non-transitory computer-readable storage medium of example 95, further comprising instructions that, when executed, cause one or more processors to: select, based on the location information, a second subset of the plurality of audio streams, the second subset of the plurality of audio streams excluding at least one of the plurality of audio streams; and interpolate between the subset of the plurality of audio streams and the second subset of the plurality of audio streams through the duration.

Example 98. The non-transitory computer-readable storage medium of any combination of examples 86-97, further comprising instructions that, when executed, cause one or more processors to: obtain from a user a request to select the subset of the plurality of audio streams; and based upon the user request, the location information, and the timing metadata, select the subset of the plurality of audio streams.

Example 99. The non-transitory computer-readable storage medium of any combination of examples 86-98, wherein the timing metadata is received from a source device.

Example 100. The non-transitory computer-readable storage medium of examples 86-99, further comprising instructions that, when executed, cause one or more processors to generate the timing metadata.

Example 101. The non-transitory computer-readable storage medium of examples 86-100, further comprising instructions that, when executed, cause one or more processors to:
obtain from a user a request for one of a plurality of ambisonic soundfield types; and reproduce corresponding soundfields, based on the request for the one of a plurality of ambisonic soundfield types, and the plurality of audio streams or the subset of the plurality of audio streams.

Example 102. The non-transitory computer-readable storage medium of example 101, wherein the plurality of ambisonic soundfield types comprises at least two of first order ambisonic soundfield (FOA), higher order ambisonic soundfield (HOA), and mixed order ambisonic soundfield (MOA).

Example 103. The non-transitory computer-readable storage medium of any combination of examples 86-102, further comprising instructions that, when executed, cause one or more processors to receive a voice command from the microphone and control a display device based on the voice command.

Example 104. The non-transitory computer-readable storage medium of any combination of examples 86-103, further comprising instructions that, when executed, cause one or more processors to output the subset of the plurality of audio streams to one or more speakers.

Example 105. The non-transitory computer-readable storage medium of any combination of examples 86-104, wherein the acoustical space comprises a scene represented by video data captured by a camera.

Example 106. The non-transitory computer-readable storage medium of any combination of examples 86-104, wherein the acoustical space comprises a virtual world.

Example 107. The non-transitory computer-readable storage medium of any combination of examples 86-106, further comprising instructions that, when executed, cause one or more processors to present the acoustical space on a head-mounted display.

Example 108. The non-transitory computer-readable storage medium of any combination of examples 86-107, further comprising instructions that, when executed, cause one or more processors to present the acoustical space on a mobile handset.

Example 109. The non-transitory computer-readable storage medium of any combination of examples 86-108, further comprising instructions that, when executed, cause one or more processors to receive a wireless signal.

Example 110. The non-transitory computer-readable storage medium of example 109, wherein the wireless signal is Bluetooth.

Example 111. The non-transitory computer-readable storage medium of example 109, wherein the wireless signal is 5G.

Example 112. The non-transitory computer-readable storage medium of any combination of examples 86-111, further comprising instructions that, when executed, cause one or more processors to present the acoustical space in a vehicle.

Example 113. The non-transitory computer-readable storage medium of any combination of examples 86-112, wherein the timing metadata comprises a delay and the non-transitory computer-readable storage medium further comprises instructions that, when executed, cause one or more processors to: detect a trigger; compare the delay to a timer; and wait until the delay is equal or greater than the timer to select the subset of the plurality of audio streams.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device configured to play one or more of a plurality of audio streams comprising:
   a memory configured to store timing information and the plurality of audio streams, wherein the timing information comprises a delay; and
   one or more processors coupled to the memory, and configured to:
   control access to at least one of the plurality of audio streams based on the timing information;
   detect a trigger;
   compare the delay to a timer; and
   wait until the delay is equal to or greater than the timer to select a subset of the plurality of audio streams.

2. The device of claim 1, wherein the memory is further configured to store location information associated with coordinates of an acoustical space in which a corresponding one of the plurality of audio streams was captured or synthesized.

3. The device of claim 1, wherein the one or more processors are further configured to combine at least two of the plurality of audio streams by at least one of mixing or interpolation or another variant of soundfield manipulation.

4. The device of claim 1, wherein the one or more processors are further configured to change a gain of one or more of the plurality of audio streams.

5. The device of claim 1, further comprising a display device.

6. The device of claim 5, further comprising a microphone, wherein the one or more processors are further configured to receive a voice command from the microphone and control the display device based on the voice command.

7. The device of claim 1, further comprising one or more speakers.

8. The device of claim 1, wherein the device comprises an extended reality headset, and
wherein an acoustical space comprises a scene represented by video data captured by a camera.

9. The device of claim 1, wherein the device comprises an extended reality headset, and wherein an acoustical space comprises a virtual world.

10. The device of claim 1, further comprising a head-mounted display configured to present an acoustical space.

11. The device of claim 1, wherein the device comprises one of a mobile handset or a vehicle.

12. The device of claim 1, further comprising a wireless transceiver, the wireless transceiver being coupled to the one or more processors and being configured to receive a wireless signal.

13. A device configured to play one or more of a plurality of audio streams comprising:
a memory configured to store timing information and the plurality of audio streams; and
one or more processors coupled to the memory, and configured to:
control access to at least one of the plurality of audio streams based on the timing information by selecting a subset of the plurality of audio streams, the subset of the plurality of audio streams excluding at least one of the plurality of audio streams;
obtain, from a user, an override request to add at least one excluded audio stream of the plurality of audio streams; and
based upon the override request, add the at least one excluded audio stream for a limited time period.

14. The device of claim 13, wherein the excluded streams are associated with one or more privacy zones.

15. The device of claim 14, wherein the one or more processors are further configured to:
determine an authorization level for a user;
compare the authorization level for the user to an authorization level of the one or more privacy zones; and
select the subset of the plurality of audio streams based on the comparison.

16. The device of claim 13, wherein the one or more processors are configured to control access to the at least one of the plurality of audio streams by not downloading or receiving at least one of the plurality of audio streams based on the timing information.

17. The device of claim 13, wherein the timing information comprises a start time of when at least one of the plurality of audio streams includes audio content.

18. The device of claim 17, wherein the one or more processors are configured to:
compare the start time to a current time; and
select, when the start time is equal to or greater than the current time, a subset of the plurality of audio streams.

19. The device of claim 13, wherein the timing information comprises a duration of at least one of the plurality of audio streams.

20. The device of claim 19, wherein the one or more processors are configured to:
compare the duration to a timer; and
select, when the duration is equal or greater than the timer, a subset of the plurality of audio streams.

21. The device of claim 13, wherein the one or more processors are configured to:
obtain from a user a request for one of a plurality of ambisonic soundfield types; and
reproduce corresponding soundfields, based on the request for the one of a plurality of ambisonic soundfield types, and the plurality of audio streams or a subset of the plurality of audio streams,
wherein the plurality of ambisonic soundfield types comprises at least two of first order ambisonic soundfield (FOA), higher order ambisonic soundfield (HOA), and mixed order ambisonic soundfield (MOA).

22. A method of playing one or more of a plurality of audio streams comprising:
storing, by a memory, timing information and the plurality of audio streams, wherein the timing information comprises a delay;
controlling access to at least one of the plurality of audio streams based on the timing information;
detecting a trigger;
comparing the delay to a timer; and
waiting until the delay is equal to or greater than the timer to select a subset of the plurality of audio streams.

23. The method of claim 22, further comprising storing location information associated with coordinates of an acoustical space in which a corresponding one of the plurality of audio streams was captured or synthesized.

24. The method of claim 22, further comprising combining at least two of the plurality of audio streams by at least one of mixing or interpolation or another variant of soundfield manipulation.

25. The method of claim 22, further comprising changing a gain of one or more of the plurality of audio streams.

26. The method of claim 22, further comprising receiving, by a microphone, a voice command and controlling a display device based on the voice command.

27. The method of claim 22, further comprising outputting at least one of the plurality of audio streams to one or more speakers.

28. The method of claim 22, wherein an acoustical space comprises a scene represented by video data captured by a camera.

29. The method of claim 22, wherein an acoustical space comprises a virtual world.

30. The method of claim 22, further comprising presenting an acoustical space on a head-mounted device.

31. The method of claim 22, further comprising presenting an acoustical space on a mobile handset or in a vehicle.

32. The method of claim 22, further comprising receiving a wireless signal.

33. A method of playing one or more of a plurality of audio streams comprising:
storing, by a memory, timing information and the plurality of audio streams;
controlling access to at least one of the plurality of audio streams based on the timing information, wherein the controlling access to the at least one of the plurality of audio streams comprises selecting a subset of the plurality of audio streams, the subset of the plurality of audio streams excluding at least one of the plurality of audio streams;

obtaining, from a user, an override request to add at least one excluded audio stream of the plurality of audio streams; and based upon the override request, adding the at least one excluded audio stream for a limited time period.

34. The method of claim 33, wherein the excluded streams are associated with one or more privacy zones.

35. The method of claim 34, further comprising:
determining an authorization level for a user;
comparing the authorization level for the user to an authorization level of the one or more privacy zones; and
selecting the subset of the plurality of audio streams based on the comparison.

36. The method of claim 33, wherein the controlling access to the at least one of the plurality of audio streams comprises not downloading or receiving at least one of the plurality of audio streams based on the timing information.

37. The method of claim 33, wherein the timing information comprises a start time of when at least one of the plurality of audio streams includes audio content.

38. The method of claim 37, further comprising:
comparing the start time to a current time; and
selecting, when the start time is equal to or greater than the current time, a subset of the plurality of audio streams.

39. The method of claim 33, wherein the timing information comprises a duration of at least one of the plurality of audio streams.

40. The method of claim 39, further comprising:
comparing the duration to a timer; and
selecting, when the duration is equal or greater than the timer, a subset of the plurality of audio streams.

41. The method of claim 33, further comprising:
obtaining, from a user, a request for one of a plurality of ambisonic soundfield types; and
reproducing corresponding soundfields, based on the request for the one of a plurality of ambisonic soundfield types, and the plurality of audio streams or a subset of the plurality of audio streams,
wherein the plurality of ambisonic soundfield types comprises at least two of first order ambisonic soundfield (FOA), higher order ambisonic soundfield (HOA), and mixed order ambisonic soundfield (MOA).

* * * * *